(12) United States Patent
Myers et al.

(10) Patent No.: US 12,499,454 B2
(45) Date of Patent: Dec. 16, 2025

(54) ROBUST ARTIFACTS MAPPING AND AUTHORIZATION SYSTEMS AND METHODS FOR OPERATING THE SAME

(71) Applicant: Citibank, N.A., New York, NY (US)

(72) Inventors: James Myers, Tampa, FL (US); William Franklin Cameron, Jacksonville, FL (US); Ryan Bergeron, New York, NY (US); Alex Michael Eng, New York, NY (US); Subramanian Sankaran, Flushing, NY (US); Joshua Goldman, Merrick, NY (US); Matthew Ryan Mitsui, New York, NY (US); Wei Jie Ng, Jersey City, NJ (US); Cameron Paul Lim, Union City, NJ (US); John E. Ortega, New York, NY (US); Alberto Cetoli, London (GB); Minjeong Cho, London (GB); Jason Ryan Engelbrecht, London (GB); Ines Teixeira, London (GB); Yael Man, Tel Aviv (IL); Ganesh Prasad Bhat, West Orange, NJ (US); Ramee S. Karthikeyan, Monmouth Junction, NJ (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/185,195

(22) Filed: Apr. 21, 2025

(65) Prior Publication Data

US 2025/0378453 A1    Dec. 11, 2025

Related U.S. Application Data

(63) Continuation-in-part of application No. 19/182,588, filed on Apr. 18, 2025, which is a continuation-in-part
(Continued)

(51) Int. Cl.
*G06Q 30/018* (2023.01)

(52) U.S. Cl.
CPC .................. *G06Q 30/018* (2013.01)

(58) Field of Classification Search
CPC .................................... G06Q 30/018
See application file for complete search history.

(56) References Cited

U.S. PATENT DOCUMENTS

| 6,272,468 B1 | 8/2001 | Melrose |
| 7,322,024 B2 | 1/2008 | Carlson et al. |

(Continued)

FOREIGN PATENT DOCUMENTS

| EP | 1889153 A1 | 2/2008 |
| WO | 0184506 A2 | 11/2001 |
| WO | 0195266 A2 | 12/2001 |

*Primary Examiner* — Jessica Lemieux
*Assistant Examiner* — Emily M. Kraisinger
(74) *Attorney, Agent, or Firm* — Perkins Coie LLP

(57) ABSTRACT

Systems and methods are disclosed comprising instructions to receive a request to evaluate authorization of a development service that comprises a digital artifact set, each digital artifact in the digital artifact set, access an authorization schema set available for the development service, identify an applicable authorization schema from the authorization schema set via comparing the content embeddings of the digital artifacts and the reference embeddings of the authorization schemas, retrieve a historical artifact attribute set representing tracked development actions for prior development services authorized via the applicable authorization schema, predict an authorization status for the development service using the historical artifact attribute set and the artifact attribute set, configure for display a visual representation of the applicable authorization schema and the mapped at least one digital artifact of the development service.

20 Claims, 25 Drawing Sheets

Related U.S. Application Data of application No. 19/050,084, filed on Feb. 10, 2025, now Pat. No. 12,430,308, which is a continuation-in-part of application No. 18/736,407, filed on Jun. 6, 2024.

(56) References Cited

U.S. PATENT DOCUMENTS

| | | |
|---|---|---|
| 8,412,813 B2 | 4/2013 | Carlson et al. |
| 9,712,576 B1 | 7/2017 | Gill |
| 9,836,664 B1 | 12/2017 | Ramaswamy et al. |
| 11,509,730 B1 | 11/2022 | Peebles et al. |
| 11,922,357 B2 | 3/2024 | Niyazov et al. |
| 11,972,223 B1 * | 4/2024 | DeFoor ................ G06N 20/00 |
| 2002/0143692 A1 | 10/2002 | Heimermann et al. |
| 2002/0178039 A1 | 11/2002 | Kennedy |
| 2003/0009355 A1 | 1/2003 | Gupta |
| 2003/0033191 A1 | 2/2003 | Davies et al. |
| 2003/0139907 A1 | 7/2003 | Mccarthy |
| 2003/0171657 A1 | 9/2003 | Ralph et al. |
| 2006/0165040 A1 | 7/2006 | Rathod et al. |
| 2006/0248121 A1 | 11/2006 | Cacenco et al. |
| 2010/0324951 A1 | 12/2010 | Northover |
| 2018/0083825 A1 | 3/2018 | Prabhakara et al. |
| 2019/0257979 A1 | 8/2019 | Hyland |
| 2020/0192906 A1 | 6/2020 | Visscher |
| 2021/0103580 A1 | 4/2021 | Schierz et al. |
| 2022/0253592 A1 * | 8/2022 | Rao ..................... G16H 30/20 |
| 2023/0077289 A1 * | 3/2023 | Sloane .................. G06F 9/547 |
| 2023/0105021 A1 | 4/2023 | Shah et al. |
| 2023/0229738 A1 | 7/2023 | Cleere et al. |

\* cited by examiner

Association Rules Anomalies

1202 → IF V_1 = 97 AND V_2 = 8811 AND V_3 = 4 AND V_4 = INDO

1204 → THEN V_5 = 26 AND V_6 = 814110

| ID | V_1 | V_2 | V_3 | V_4 | V_5 | V_6 | V_7 |
|---|---|---|---|---|---|---|---|
| 00000002 | 97.0 | 8811 | 4 | INDO | 26 | 814110 | 0 |
| 00035006 | 97.0 | 8811 | 4 | INDO | 26 | 814110 | 0 |
| 00036614 | 97.0 | 8811 | 4 | INDO | 26 | 814110 | 0 |
| 00037008 | 97.0 | 8811 | 4 | INDO | 26 | 814110 | 0 |

IF V_8 = L AND V_3 = 4 AND V_1 = 97 AND V_9 = "RETAIL" AND V_10 = 99999999.0 AND V_11 = 99999999.0

THEN V_12 = 9930

| ID | ACCOUNT_TYPE | SUPER_GROUP_CODE | NACE1 | FR20SA_CPARTY_CLASS | ONE | NMEC | SIC_1 |
|---|---|---|---|---|---|---|---|
| 00003003 | L | | 4 | 97.0 | RETAIL | 99999999.0 | 99999999.0 | 9930 |
| 00007056 | L | | 4 | 97.0 | RETAIL | 99999999.0 | 99999999.0 | 9930 |
| 00007007 | L | | 4 | 97.0 | RETAIL | 99999999.0 | 99999999.0 | 9930 |
| 00007443 | L | | 4 | 97.0 | RETAIL | 99999999.0 | 99999999.0 | 9930 |

ROBUST ARTIFACTS MAPPING AND AUTHORIZATION SYSTEMS AND METHODS FOR OPERATING THE SAME

CROSS-REFERENCE TO RELATED APPLICATION(S)

This application is a continuation-in-part of U.S. patent application Ser. No. 19/182,588 entitled "REMEDIATION OF UNSTRUCTURED DATA USING ARTIFICIAL INTELLIGENCE" and filed Apr. 18, 2025, which is a continuation-in-part of U.S. patent application Ser. No. 19/050,084 entitled "DETECTING DATA ANOMALIES USING ARTIFICIAL INTELLIGENCE" and filed Feb. 10, 2025, which is a continuation-in-part of U.S. patent application Ser. No. 18/736,407 entitled "OUT-OF-DISTRIBUTION PREDICTION" and filed Jun. 6, 2024. The content of the foregoing applications is incorporated herein by reference in their entirety.

BACKGROUND

In response to widespread concerns that the economic performance of the United States had significantly underperformed its potential, Congress enacted the Economic Recovery Tax Act (ERTA) of 1981. The ERTA was designed to function as an economic stimulus to promote investment within the United States. Congress recognized that declines in research spending had adversely affected the nation's economic growth, productivity gains, and competitiveness in the global marketplace, as evidenced by the decline of the U.S. automotive industry. The ERTA included a provision known as the 'Credit for Increasing Research Activities' (the Credit), which aimed to reverse the decline in U.S. research spending by incentivizing year-over-year increases in research expenditures.

Initially articulated in House Report No. 97-201 (H.R. 4242) and subsequently codified by the Tax Reform Act of 1986, 'Qualified Research' generally refers to private sector or commercially driven development efforts intended to foster innovation within scientific or technological fields. However, administrative challenges and divergent interpretations by the Internal Revenue Service (IRS) and taxpayers have necessitated numerous revisions to the relevant Code Section and associated Treasury Regulations.

In practice, 'Qualified Research' is frequently distilled into a "Four Part Test" to provide a reference framework. However, this simplification can be misleading due to the numerous requirements or elements within each "Test" and the extensive Regulations that supplement certain parts of Section 41 with examples. This convention underscores the necessity for detailed evaluations and documentation of taxpayer research efforts over time at the business component level. This evaluation is further complicated by a substantial body of case law and the need to reconcile research activities with allowable expenditures.

BRIEF DESCRIPTION OF THE DRAWINGS

Detailed descriptions of implementations of the present invention will be described and explained through the use of the accompanying drawings.

FIG. 12 illustrates an example environment of a root cause evaluation engine of the data management engine of FIG. 2 for identifying root causes of the anomalies of the dataset.

Figure 1:
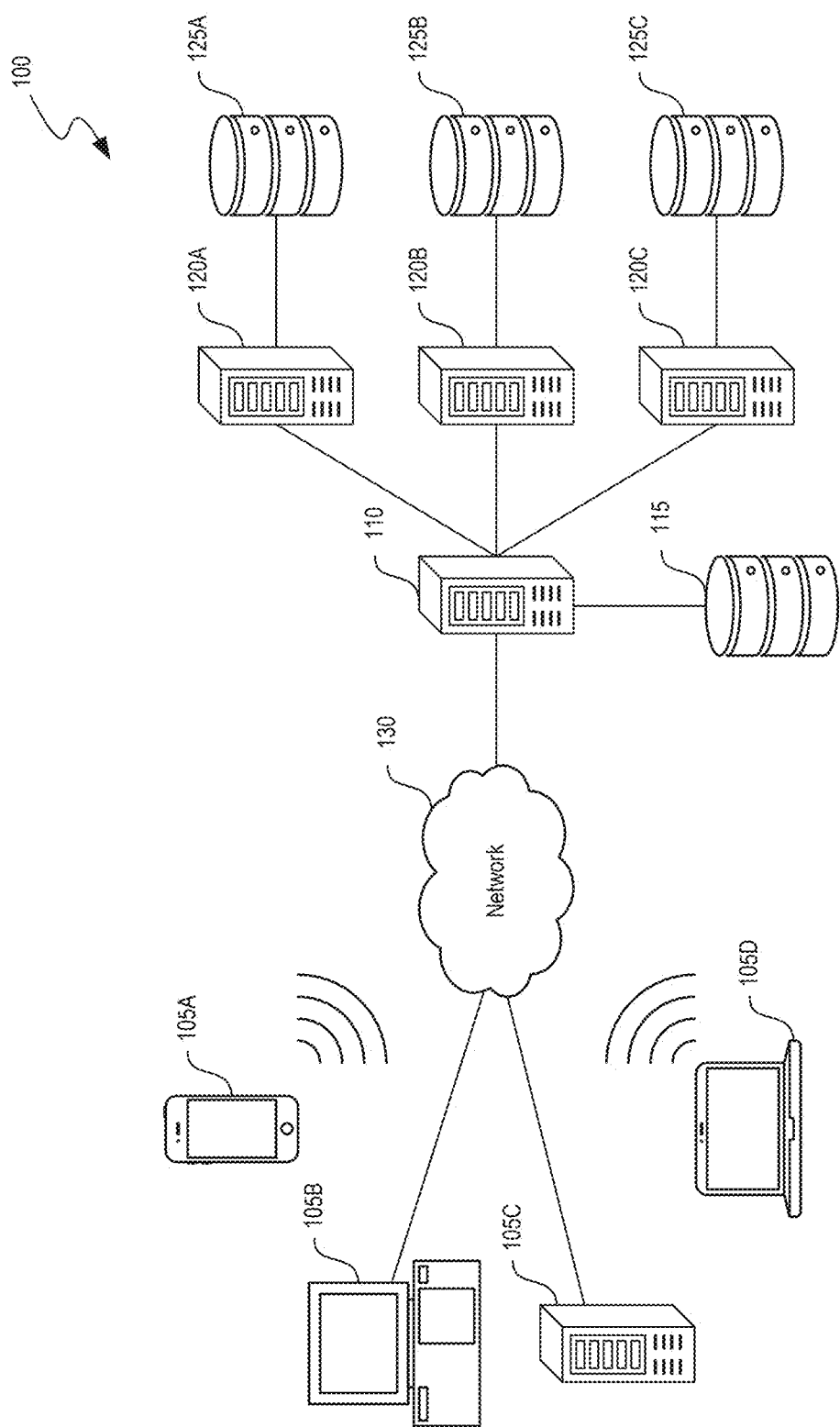
FIG. 1 is a system diagram illustrating an example of a computing environment in which the disclosed system operates in some implementations.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Experimental projects (e.g., research studies) and/or development inclined services ("development services" or "development service) are often eligible for exclusive material benefits (e.g., discounted resource costs, fiscal deductions, and/or the like) offered by large institutions (e.g., a national government, a private enterprise, a taxation authority and/or the like) to promote collective innovation and discovery. Sponsors of such exclusive benefits (e.g., tax credits) typically restrict distributions to select projects and/or services that satisfy a narrow set of qualifications (e.g., a high threshold of innovation, an extensive process of experimentation, and/or the like). Accordingly, proper accreditation and/or authorization of such material benefits requires candidates to submit comprehensive and/or extensive evidence (e.g., development documentation, experimental reports, design plans, and/or the like) indicating that a select development service exhibits these target qualifications. Additionally, these experimental projects and/or development services (e.g., firmware research and/or innovations) are often eligible for refactoring their reported assets and/or expenses as amortized entities that are distributed across multiple time intervals (e.g., capitalization of software development expenditures). Similarly, regulatory institutions validating these reported assets and/or expenses (e.g., a federal revenue service and/or administration) typically require candidates to submit meticulous and consistent documentation of the appropriated capitalization (e.g., software development cost amortization under Section 174 of the Internal Revenue Code (IRC) of the United States of America) for each consecutive time interval (e.g., a fiscal year).

However, conventional methods typically rely on manual vetting process (e.g., performed by a human analyst) to identify and submit relevant artifacts (e.g., digital documentation) that demonstrate eligibility of the development service (e.g., for a material benefit and/or amortization of assets and expenditures). Manual selection of the necessary supporting documentation is a time- and resource-expensive process that often requires several hours, or days, to complete, and is also subject to vagaries and error of human collection activities, storage activities, and analysis. As a result, existing systems are typically slow, inefficient, lacking appropriate and available data, and often inaccurate/insufficient at submitting large volumes of authorization requests (e.g., applications for benefit distribution). To further compound this issue, development projects and/or services (e.g., improvements to computing devices) can naturally generate numerous artifacts (e.g., administrative documentation) that may be inconsequential and/or irrelevant with respect to eligibility for a specific material benefit (e.g., fiscal deductions for development of novel firmware) or amortization of assets and/or expenditures. Accordingly, manual review of excessively large quantities of information may result in oversight of critical documentation and/or artifacts that would otherwise qualify a development service for a specific benefit. As a result, these and other problems of inefficient manual preparation of development service artifacts can significantly diminish the overall amount of entitled benefits, place undue burden on staff support teams, and so forth.

Attempting to create a system that automates management and preparation of documentation supporting authorization (e.g., accreditation of exclusive material benefits and/or amortized entities) for development services presented significant technical challenges. Developing such a system required addressing several limitations in conventional approaches to data management, such as the difficulty in selectively identifying supporting digital artifacts that enable qualification of a select development service. As described herein, traditional data management systems rely on manual vetting processes (e.g., via a human analyst) to identify supporting documentation, which can result in extended manual review periods, oversight of supporting resources (e.g., an applicable digital artifact), and/or erroneous identification of ineligible resources (e.g., a digital artifact incompatible with qualification criteria for select material benefits and/or amortization of assets) for projects and/or services that correspond to large quantities of data records. As a result, conventional methods often lead to inefficient or insufficient resource utilization and inaccuracies (e.g., failure to identify eligible/ineligible digital artifacts) when managing and preparing supporting documentation.

To address these technical challenges, multiple design approaches were evaluated. With respect to generating qualification criteria, one approach included directly inputting unstructured eligibility criterion data (e.g., natural language documents describing qualifications for specified material benefits and/or asset amortization requirements) into an AI model as training data without normalization or additional pre-processing, thus passively relying on the AI model's ability to extract comparative signals (e.g., eligibility rules, qualification thresholds, and/or the like) for evaluating digital artifact contents. However, implicit determination of the eligibility criteria would lead to inconsistent, and often inaccurate, predictions that reduce the overall accuracy and reliability of the AI model, since the AI model maintains a fluid characterization of the eligibility criteria (e.g., new criterions determined for each subsequent evaluation). With respect to evaluating qualification of the development services, a similar approach included direct input of digital artifact contents (e.g., project documentation, recorded experimental results, and/or the like) into the AI model and relying on the AI model's ability to accurately map supporting digital artifacts to eligible benefits (e.g., tax credits, fiscal expenditure capitalization, and/or the like). Although this method streamlined the process for identifying digital artifacts with relevance to qualification criteria for select material benefits, the lack of additional supervisory oversight for the AI model resulted in inaccurate assessments of whether the identified artifacts satisfied the qualification criteria and supported eligibility of the corresponding development service to receive such material benefits and/or amortization of assets. Further, this approach entailed indiscriminate and direct input of all digital artifact contents associated with individual projects into the AI model, resulting in significant resource inefficiencies and incremental cost associated with the use of the AI model.

As such, the inventors have developed hybrid systems, methods, and computer-readable media for automatically and/or semi-automatically evaluating authorization of development services (e.g., experimental projects). For example, the system can evaluate an approximate authorization status (e.g., eligibility likelihood) for a development service (e.g., an experimental project) to claim a material benefit (e.g., a fiscal deduction) and/or valid amortization of assets and expenditures based on digital artifacts (e.g., associated project documentation) and/or artifact attributes that track development actions (e.g., experimentation results, design version control, and/or the like) of the development service. The system can identify and/or associate applicable authorization schemas (e.g., relevant fiscal credit policies and/or guidelines) for the development service by comparing embeddings associated with the digital artifacts and the authorization schemas. Accordingly, the system can evaluate digital artifact attributes (e.g., development narratives, financial records, and/or the like) via statistical inference models (e.g., machine learning models, small language models, large language models, and/or the like) to predict the approximate authorization status for the development service. In some implementations, the system can configure a user interface to display detailed contents of the authorization schemas and corresponding digital artifacts via visual representations displayed at a user interface of an authorized user (e.g., an accountant or auditor for benefit claims). In some implementations, the system can first provide a detailed analysis (e.g., via a dashboard within the user interface) as to the likelihood of successfully obtaining a material benefit and/or validation of asset amortization based on the authorization schemas and corresponding digital artifacts. In some implementations, the detailed analysis can evaluate, and present, an individualized likelihood of obtaining a material benefit and/or validation of asset amortization from specific sponsors and/or institutions, which can be based on data provided from sources external to the party seeking the material benefit and/or based prior submissions for material benefits (e.g., submissions based on the same or similar authorization schemas and the same or similar digital artifacts to those under consideration). In some implementations, the system can provide an interactive chatbot (e.g., enabled via generative machine learning models) to enable and respond to user inquiries for information associated with the authorization schemas, corresponding digital artifacts, or detailed analysis. In response to positive user validation (e.g., receiving accountant or auditor approval that the authorization schemas and corresponding digital artifacts are appropriate and desired for submission to a material benefit provider and/or asset amortization validator), the system can automatically generate an export digital artifact (e.g., a fiscal reporting document) that incorporates necessary digital artifact contents to satisfy attribute thresholds associated with the authorization schemas.

For illustrative purposes, examples are described herein in the context of computer systems for evaluating authorization of requested development services (e.g., assessed eligibility of satisfying a benefit claim). However, a person skilled in the art will appreciate that the disclosed system can be applied in other contexts. For example, the disclosed system can be used within a healthcare-related environment to identify (e.g., via a user initiated prompt for a generative machine learning model or an automatic execution) an applicable diagnosis for a given medical condition based on reference sources (e.g., Gray's Anatomy: The Anatomical Basis of Clinical Practice, Mosby's Dictionary of Medicine, and/or the like) in combination with relevant evidence (e.g., for the body of a given patient, from an environment to which the patient is or was exposed, and/or the like) that supports the identified diagnosis.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, environment 100 includes one or more client computing devices 105A-D, examples of which can host the service authorization system 200 of FIG. 2. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, server computing devices 110 and 120 comprise computing systems, such as the service authorization system 200 of FIG. 2. Though each server computing device 110 and 120 is displayed logically as a single server, server computing devices can each be a distributed computing environment encompassing multiple computing devices located at the same or at geographically disparate physical locations. In some implementations, each server 120 corresponds to a group of servers.

Client computing devices 105 and server computing devices 110 and 120 can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Service Authorization System

Figure 2:
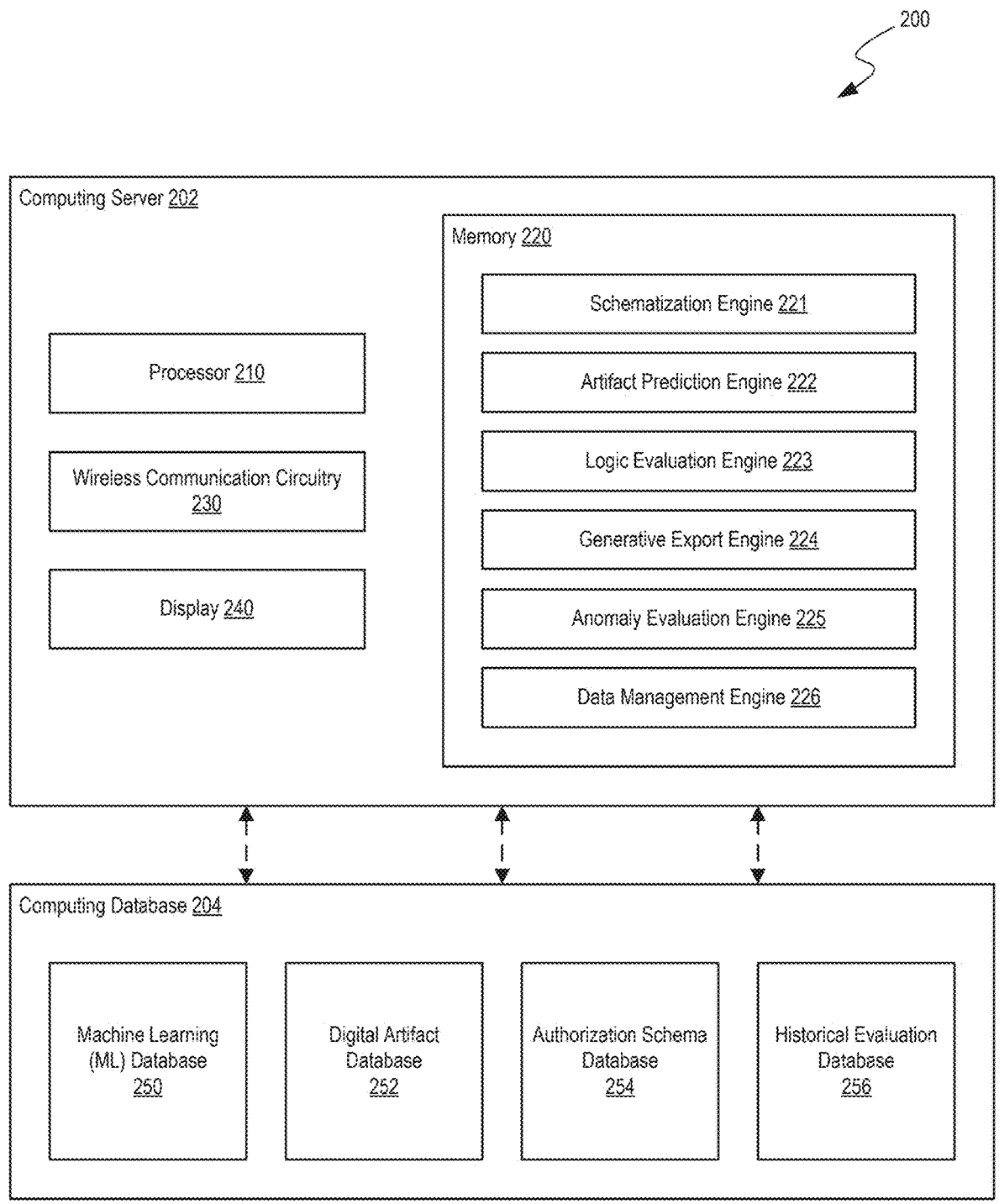
FIG. 2 is a block diagram that illustrates a service authorization system that can implement aspects of the present technology.

FIG. 2 is a block diagram that illustrates a service authorization system 200 ("system 200") that can implement aspects of the present technology. The components shown in FIG. 2 are merely illustrative, and well-known components are omitted for brevity. As shown, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 106 described in reference to FIG. 1. As shown, the computing database 204 can include a machine learning (ML) database 250, a digital artifact database 252, an authorization schema database 254, and a historical evaluation database 256.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, implementations, the processor 210 can store temporary information onto the memory 220 and store long-term data onto the computing database 204. The memory 220 is merely an abstract representation of a storage environment. Hence, in some implementations, the memory 220 comprises one or more actual memory chips or modules.

As shown in FIG. 2, modules of the memory 220 can include a schematization engine 221, an artifact prediction engine 222, a logic evaluation engine 223, a generative export engine 224, an anomaly evaluation engine 225, and a data management engine 226. Other implementations of the computing server 202 include additional, fewer, or different modules, or distribute functionality differently between the modules. As used herein, the term "module" and/or "engine" refers broadly to software components, firmware components, and/or hardware components. Accordingly, the engines 221, 222, 223, 224, 225, and 226 could each comprise software, firmware, and/or hardware components implemented in, or accessible to, the computing server 202.

The system 200 can be configured to evaluate authorization and/or qualification of candidate development services (e.g., experimental projects, research inquiries, and/or the like) to obtain a limited material benefit (e.g., a fiscal expense reduction) and/or amortize select assets, or expenditures (e.g., capitalization of project development costs of multiple fiscal years). For example, the system 200 can evaluate digital artifacts of a candidate development service (e.g., a service pending, or intended for, authorization) to identify supporting documentation and/or historical records that qualify the service for the specified material benefits and/or amortization of assets, or expenditures. In a non-limiting manner, examples of a digital artifact (e.g., of a development service) can include a progression report (e.g., tracked development activities), an experimentation result (e.g., a tested hypothesis), a fiscal expenditure record, and/or a combination thereof. The system 200 can identify and/or designate individual digital artifacts associated with a development service as supporting documentation to a claim for a material benefit, an amortization of entities (e.g., assets and/or expenditures), or both. In some implementations, the system 200 can be configured receive digital artifacts for a select development service from participant users (e.g., inventors, researchers, project managers, and/or individuals of similar roles) via a user interface. For example, the system 200 can periodically transmit a digital form to participant users to request updated information regarding progression and/or current state of the development service. The transmitted digital form can be configured to include one or more queries (e.g., text-based questions) and corresponding input components (e.g., modifiable text boxes) enabling participant users to provide the requested information. Accordingly, the system 200 can receive, and record, a digital response form (e.g., a completed version of the digital form) as a new digital artifact for the development service. In some implementations, the system 200 can be configured to extract, and reformat, information received from the participant users into a standardized data structure format for the stored digital artifacts. The system 200 can store the received digital artifacts in the digital artifact database 252.

In some implementations, the system 200 can be configured to store digital artifacts designated for supporting claims to a material benefit (e.g., a tax credit) within a separate database from digital artifacts designated for supporting claims for amortization of assets and/or expenditures (e.g., capitalization of software development costs). As an illustrative example, the digital artifact database 252 can include two discrete partitions, such that the first partition corresponds to stored digital artifacts for supporting a material benefit claim and the second partition corresponds to stored digital artifacts for supporting an entity amortization claim. In additional or alternative implementations, the system 200 can be configured to store classification labels (e.g., metadata tags) for each digital artifact, such that the classification label indicates whether the digital artifact is eligible for supporting a material benefit claim and/or an asset amortization claim (e.g., while storing the digital artifacts within a consolidated digital artifact database 252).

The schematization engine 221 can be configured to generate authorization schemas available for evaluating qualifications of development services (e.g., for a restricted processes, an entitlement to material benefits, an eligibility for amortization of assets or expenditures, and/or the like). An authorization schema represents data structures that define required evaluation criteria (e.g., mandatory attribute-based thresholds for satisfaction by supporting digital artifacts) to authorize a candidate development service (e.g., for a restricted process, a limited material benefit, an asset/expenditure capitalization and/or the like). For example, the schematization engine 221 can generate an authorization schema that comprises functional evaluation criteria for determining eligible entitlement of a development service to a limited material benefit (e.g., a fiscal expense reduction), or amortization of select assets and/or expenditures over specified time intervals (e.g., a plurality of fiscal years). In some implementations, an individual authorization schema can correspond to an entitlement to a single material benefit (e.g., an individual tax credit claim) or a grouped plurality of material benefits (e.g., an enumerated list of tax credit claims).

Authorization schemas can include predetermined rules (e.g., a binary criterion, a set of value based conditions, etc.) that are required to be fulfilled by digital artifacts for authorization. For example, an authorization schema can include a logical condition that requires digital artifacts of a candidate development service to include attributes specifying a jurisdiction, a recordation date, an authentication (e.g., an official notarization), a specified format type (e.g., a standardized template), and/or the like. An authorization schema can include preferred sources of data such as specific databases, report types, metadata (e.g., project tracking systems, slide decks seeking approval to initiate projects, progress reports on technical developments). Authorization schemas can include embedded content requirements of supporting digital artifacts that correspond to additional context information that are represented via non-standardized rules and/or qualifications (e.g., non-conforming to strict logic-based criteria). For example, an authorization schema can include a text-based rule (e.g., a tax credit policy, an internal enterprise statute) that requires associated digital artifacts to include media contents (e.g., text data, images, audio, and/or the like) that indicate and/or describe a pertinent relationship between the development service and a specified field of interest (e.g., applicability of a software application project for a firmware focused tax credit policy). In another example, an authorization schema can include a narrative guideline that describes qualifying criteria and/or additional context information of digital artifacts that enables the corresponding development service to be eligible under a text-based rule (e.g., an historical advisory opinion of regulatory institutions, lawyers or accountants on eligibility for candidate development services based on prior digital artifacts and their contents). In another example, an authorization schema can include a prior digital artifact that includes exemplary contextual information (e.g., project descriptions, experimental reports, financial documentation, and/or the like) and/or formatting that resulted in a positive (e.g., or negative) evaluation result indicating eligibility of a previous development service under a text-based rule. Accordingly, authorization schemas can represent unified data structures that incorporates both standardized (e.g., predetermined rules) and non-standardized (e.g., regulatory policies, narrative guidelines, fiscal procedures, and/or the like) requirements of digital artifact contents to qualify a development service (e.g., for a restricted process, entitled benefit, and/or the like).

The schematization engine 221 can be configured to receive an input corpus (e.g., regulatory policies, narrative guidelines, and/or the like) of qualification criteria that define eligibility requirements of supporting digital artifacts (e.g., project development reports, experimental results, fiscal documentation, and/or the like) for a candidate development service. In a non-limiting manner, examples of the input corpus can include text-based statutes of regulatory policies (e.g., an institutional tax code), predetermined logic-based rules (e.g., required properties of supporting digital artifacts), narrative guidelines (e.g., an advisory opinion of qualified individuals and/or institutions), and/or additional context information pertinent to qualifying the development service (e.g., internal procedural rules for a private entity). For simplicity of illustration, the input corpus of the qualification criteria is described herein in the form of text-based data sources (e.g., written documentation, alphanumeric data structures, and/or the like). However, an ordinary person skilled in the art will appreciate the input corpus can include alternative forms and/or media for representing eligibility details for a development service, such as an image (e.g., visual examples of eligibility requirements), an audio (e.g., recorded conversations of eligibility requirements), and/or the like.

Using the input corpus, the schematization engine 221 can generate an authorization schema data structure that comprises functional evaluation criteria for determining qualification of the candidate development service. For example, the schematization engine 221 can configure the authorization schema to include attribute-based thresholds (e.g., a binary value condition, a content similarity threshold, and/or the like) that are used to assess satisfaction of the defined qualification parameters by supporting digital artifacts of the candidate development service. In some implementations, the schematization engine 221 can analyze a subset of the input corpus to generate standardized evaluation criteria for assessing candidate development services. As an illustrative example, the schematization engine 221 can input portions of the corpus associated with structured and/or quantitative eligibility requirements (e.g., an enumerated legal statute of limited qualifying conditions) to a machine learning model (e.g., a semantic natural language model, a generative machine learning model, and/or the like) to reduce the qualification criteria to simplified logic-based rules for identifying and assessing target attributes (e.g., legal jurisdiction, record datetime, identifiable information, summative variable values, structured metadata, and/or the like) of the supporting digital artifacts. As another example, the schematization engine 221 can receive (e.g., via a user interface) an external user input that specifies additional standardized evaluation criteria (e.g., logic-based rules, procedural analysis scripts, and/or the like) for assessing the candidate development service.

In other implementations, the schematization engine 221 can analyze a subset of the input corpus to generate non-standardized evaluation criteria for assessing candidate development services. The schematization engine 221 can use a machine learning model (e.g., a semantic natural language model, a generative machine learning model, and/or the like) to embed portions of the corpus associated with qualitative eligibility requirements to determine a reference identifier (e.g., a uniform embedding vector) that represents the corpus subset. For example, the schematization engine 221 can be configured to embed portions of the corpus corresponding to abstract regulatory policies (e.g., a requirement for narrative contents of data artifacts relating to a specific field of development), narrative guidelines, historical evaluation results (e.g., positive and/or negative examples of data artifact attributes enabling and/or preventing qualification of the candidate development service), and/or similarly qualitative eligibility criteria to determine the reference identifier. Accordingly, the system 200 can compare the reference identifier to content identifiers of data artifact attributes (e.g., via cosine similarity, Euclidean distance, model-based inference, and/or the like) to evaluate content similarities between portions of the corpus and the supporting data artifacts for the development service. In some implementations, the schematization engine 221 can embed (e.g., via a machine learning model) contents of the authorization schema to determine a summative identifier (e.g., a uniform embedding vector) for the generated authorization schema. The schematization engine 221 can be configured to store generated authorization schemas in the authorization schema database 254.

The system 200 can evaluate authorization (e.g., eligibility and/or qualification) of a candidate development service (e.g., to claim entitlement to a restricted process, a material benefit, an asset amortization, and/or the like) based on a corresponding set of supporting digital artifacts. For example, the system 200 can receive a user request (e.g., via a user interface) to evaluate eligibility of a candidate development service for one or more entitled benefits (e.g., a fiscal expense reduction) and/or valid amortization of assets, or expenditures. In some implementations, the system 200 can be configured to receive a customized user request that specifies a set of candidate development services to be evaluated for eligibility. For example, the system 200 can display (e.g., at the user interface) a set of filtering options that enable the external user (e.g., an authorized user, a licensed auditor, and/or the like) to specify evaluation of a custom selection development service (e.g., an individual development service, all development services, development services pertaining to a specific category, and/or the like).

The artifact prediction engine 222 can be configured to identify applicable authorization schemas (e.g., available material benefits, eligible asset amortization conditions, and/or the like) for a candidate development service specified in the user request. For example, the artifact prediction engine 222 can retrieve a set of digital artifacts (e.g., project development reports, experimental results, fiscal expense documentation, and/or the like) associated with the candidate development service from the digital artifact database 252 and a set of available authorization schemas (e.g., accessible benefits and/or asset amortization at time of evaluation request) from the authorization schema database 254. Accordingly, the artifact prediction engine 222 can assess the set of digital artifacts using the evaluation criteria of each available authorization schema to identify a subset of applicable authorization schemas (e.g., possible qualification for select benefits and/or asset amortization) for the candidate development service. For example, the artifact prediction engine 222 can evaluate compliance of concrete digital artifact attributes (e.g., recorded datetime, applied jurisdiction, fiscal expenses accrued, and/or the like) for predetermined logic-based rules (e.g., limited and/or quantitative eligibility conditions) of each authorization schema to determine an initial set of applicable authorization schemas for the candidate development service. In some implementations, the artifact prediction engine 222 can compare content similarities between the set of data artifacts and the set of available authorization schemas to identify the subset of applicable authorization schemas. For example, the artifact prediction engine 222 can generate (e.g., via a machine learning model) a content identifier (e.g., an embedding vector) for a data artifact of the candidate development service. Accordingly, the artifact prediction engine 222 can compare the content identifier of each data artifact to the reference identifier of each authorization schema. As an example, the artifact prediction engine 222 can input pairs of the content identifiers (e.g., of the set of data artifacts) and the reference identifiers (e.g., of the set of authorization schemas) into a machine learning model (e.g., a statistical inference algorithm, a generative machine learning model, a semantic natural language model, and/or the like) to determine an approximate content similarity score between the corresponding data artifacts and the evaluation criteria (e.g., or components thereof) of the authorization schemas. As a result, the artifact prediction engine 222 can identify a subset of applicable authorization schemas that correspond to a content similarity score exceeding a predefined threshold. In some implementations, the artifact prediction engine 222 can be configured to evaluate compliance of the digital artifacts to predetermined logic-based rules prior to evaluating content similarities between the digital artifacts and the authorization schemas.

In some implementations, the artifact prediction engine 222 can be configured to generate a mapping that correlates data artifacts (e.g., of a development service) that to the applicable authorization schemas. For example, the artifact prediction engine 222 can dynamically create a stored mapping (e.g., a reference table, a hash map, and/or the like) that links a select data artifact (e.g., of the candidate development service) to an authorization schema when a determined content similarity score (e.g., via comparison of the content and reference identifiers) exceeds the predetermined threshold. In another example, the artifact prediction engine 222 can create a stored mapping that links the select data artifact to an authorization schema when a predetermined logic-based evaluation rule for the schema is satisfied by content attributes of the data artifact. Accordingly, the artifact prediction engine 222 can identify, for each applicable authorization schema for the candidate development service, a subset of digital artifacts (e.g., of the development service) that shares high content similarities to the eligibility requirements of the authorization schema (e.g., and thus supports qualification of the candidate development service). In some implementations, the artifact prediction engine 222 can be configured to generate a granular mapping that further correlates individual attributes of each data artifact (e.g., select paragraphs of narrative text, fiscal documentation for an expense category, and/or the like) to specific evaluation criteria (e.g., a legal statute, an individual qualification condition, and/or the like) of the applicable authorization schema. In additional or alternative implementations, the artifact prediction engine 222 can generate a plurality of stored mappings that correlate different categories of data artifact attributes to component evaluation criteria of the applicable authorization schemas. As an illustrative example, the artifact prediction engine 222 can generate a first stored mapping that correlates attributes of a data artifact to evaluation criteria (e.g., of an authorization schema) relating to a technical qualification (e.g., eligible jurisdiction, datetime, and/or the like) of the candidate development service. In the above example, the artifact prediction engine 222 can also generate a second stored mapping that corelates attributes of the data artifact to evaluation criteria relating to itemized fiscal qualifications (e.g., individual tax credit claims) of the candidate development service.

The artifact prediction engine 222 can be configured to determine an approximate authorization status (e.g., a categorical likelihood and/or confidence score) for each identified applicable authorization schema for the candidate development service. For each applicable authorization schema, the artifact prediction engine 222 can identify data artifacts of the candidate development service that correlates to the evaluation criteria of the schema. For example, the artifact prediction engine 222 can use the stored mapping between data artifacts (e.g., or attributes thereof) and applicable authorization schemas (e.g., or component evaluation criteria thereof) to identify a subset of data artifacts (e.g., of the candidate development service) pertinent to the applicable authorization schema. Accordingly, the artifact prediction engine 222 can evaluate the attributes of the data artifacts to predict an authorization score, or status, that indicates relative compliance strength (e.g., a probability score, a categorical label, a confidence range, and/or the like) of the data artifacts for the evaluation criteria of the applicable authorization schema. For example, the artifact prediction engine 222 can input the data artifact attributes into a machine learning model (e.g., a semantic natural language model, a generative machine learning model) to determine a categorical label (e.g., "fully compliant," "likely compliant," "partially compliant," "not compliant," and/or the like) indicating relative compliance strength for the evaluation criteria. In some implementations, the artifact prediction engine 222 can use historical data artifacts (e.g., of tracked development actions for prior development services) and/or evaluation results (e.g., authorization/denial of claimed benefit and/or asset amortization) to further qualify the compliance assessment of data artifact attributes of the candidate development service. For example, the artifact prediction engine 222 can access (e.g., from the historical evaluation database 256), a set of historical artifact attributes corresponding to previous data artifacts used to support an authorization request for a prior development service. Accordingly, the artifact prediction engine 222 can input attributes of the data artifact set (e.g., of the candidate development service) and attributes of historical data artifact set into the machine learning model to determine the categorical label and/or compliance score.

The system 200 can be configured to generate, and display, a custom visual interface that presents the identified set of applicable authorization schemas (e.g., possible claims to fiscal benefits and/or asset amortization) for the candidate development service and indicates the corresponding data artifacts (e.g., or component attributes thereof) that support eligibility of the development service for each authorization schema. For example, the system 200 can generate a custom dashboard view that provides a structured visual representation (e.g., an enumerated list, a tabular widget, and/or the like) of the identified applicable authorization schemas. Additionally, the system 200 can configure the structured visual representation to display alongside each applicable authorization schema a subset of data artifacts that support qualification of the candidate development service for that schema. The system 200 can also configure the visual representation to further display the approximated authorization status (e.g., categorization label, likelihood probability, and/or the like) for each schema, indicating estimated compliance and/or qualification strength of the candidate development service for the authorization schema based on attributes of the supporting subset of data artifacts.

In some implementations, the system 200 can configure the structured visual representation to include a comparative diagram (e.g., a column-wise table, a tree network, and/or the like) that visually maps and/or connects attributes of data artifacts (e.g., of the candidate development service) to correlated (e.g., high content similarities) evaluation criteria for each applicable authorization schema (e.g., or component criteria thereof). In other implementations, the system 200 can further configure the structured visual representation to include a secondary comparative diagram that visually maps and/or connects attributes of historical data artifacts (e.g., of previously evaluated development services) to correlated evaluation criteria of the authorization schemas. Likewise, the structured visual representation can also be configured to identify, and map, content similarities between attributes of the data artifacts (e.g., of the candidate development service) and the historical data artifacts (e.g., of the previous development services).

In some implementations, the system 200 can configure the custom visual interface to include a notification component that alerts users (e.g., authorized reviewers, licensed auditors, and/or the like) to portions of the evaluation results that may require further attention and/or review. The system can identify and highlight evaluation criteria for which the system has not identified any relevant digital artifacts (e.g., no project technology identified, no purpose related to the enterprise's commercial objectives). For example, the system 200 can review historical usage records (e.g., from the historical evaluation database 256) for the presented digital artifacts (e.g., for supporting qualification of the candidate development service) to determine a subset of overlapping digital artifacts and/or overlapping attributes of overlapping digital artifacts that were previously used to qualify other development services. Accordingly, the system 200 can display a visual indicator (e.g., an icon) within vicinity of each overlapping digital artifact displayed.

The logic evaluation engine 223 can be configured to generate human-readable narratives that summarize logical processes performed by the system 200 to obtain intermediate results during evaluation of the candidate development service. For example, the logic evaluation engine 223 can actively monitor (e.g., in real-time) intermediary logic operations executed during operation of a machine learning model to identify applicable authorization schemas and/or approximate authorization statuses for the candidate development service. The intermediary logic operations can define an intermediary input data (e.g., data retrieved from prior logic operation), an intermediary model (e.g., a component layer of the complete machine learning model), and an intermediary output data (e.g., data generated via inputting the intermediary input data into the intermediate model layer). The logic evaluation engine 223 can further cause a generative machine learning model (e.g., a large language model, a semantic natural language algorithm, and/or the like) to create a human-readable narrative (e.g., a text-based paragraph) that explains how the incremental logic of the intermediary logic operations results in the intermediary results (e.g., identified authorization schemas, approximated authorization statuses, and/or the like). Accordingly, the system 200 can further configure the custom visual interface to display the generated human-readable narrative to provide additional context information on the resulting evaluation results for the candidate development service.

In some implementations, the logic evaluation engine 223 can be configured to iteratively cause the generative machine learning model to create the human-readable narrative explaining the intermediary logic operations (e.g., performing a chain-of-thought evaluation via generative models). For example, the system 200 can input the monitored intermediary logic operations alongside a first prompt (e.g., request for high-level abstract details) into the generative model to create a first response comprising a human-readable explanation of the incremental logic for the intermediary logic conditions. Further, the system 200 can input the monitored intermediary logic operations alongside a second prompt (e.g., request for low-level specific details) and the first response into the generative model to create a second response comprising a modified human-readable explanation of the incremental logic. The system 200 can further configure the custom visual interface to display the intermediary results from the iterative generation of the human-readable narrative, including the intermediate prompts (e.g., the first and/or the second prompts) and/or responses (e.g., the first and/or the second responses).

In some implementations, the system 200 can be configured to perform additional operations in response to user feedback via the custom visual interface. For example, an authorized user (e.g., an accountant or auditor) can submit a positive validation signal (e.g., via the custom interface) indicating vetted approval to submit an authorization request for the candidate development service under the identified applicable authorization schemas using the evaluated supporting digital artifacts. In response to the positive validation signal, the generative export engine 224 can automatically generate an export digital artifact (e.g., a fiscal expense reduction request) for each applicable authorization schema based on an artifact template (e.g., a tax credit request form) that comprises a required set of field queries (e.g., claims for entitled material benefit or amortization of assets/expenditures, claimed amount of material benefit or amortization of assets/expenditures, and/or the like). The generative export engine 224 can further cause a generative machine learning model (e.g., a large language model) to generate human-readable entries for each required field query (e.g., of the artifact template) based on information stored in the identified supporting digital artifacts for the applicable authorization schemas.

In other examples, the system 200 can receive a negative validation signal (e.g., via the custom interface) indicating disapproval of using the displayed digital artifacts (e.g., or components thereof) to support qualification of the candidate development service for the identified applicable authorization schemas. In another example, the system can indicate missing or incomplete qualification documentation for use by the AI model and/or human reviewers. In response, the anomaly evaluation engine 225 can perform an automatic update to one or more machine learning models used during evaluation and identification of the supporting digital artifacts. For example, the anomaly evaluation engine 225 can generate a model prediction training sample comprising an input data based on attributes of the presented digital artifacts, the contextual historical digital artifacts, and/or the contextual information from the user feedback response, and an output label based on the predicted authorization status of applicable authorization schema using the presented digital artifacts. In some implementations, the anomaly detection engine can further augment the prediction training sample using a stored model prediction training sample set that corresponds to predicted authorization statuses of prior applicable authorization schemas. Accordingly, the anomaly evaluation engine 225 can use the combined prediction training samples to retrain the machine learning models used to generate intermediary results during evaluation of candidate development services.

In some implementations, the system 200 can receive (e.g., via the custom visual interface) a user feedback response that can include contextual information for the negative validation signal, such as explanatory narratives (e.g., embedded commentary), visual indicators (e.g., manual identification of abnormal mappings between digital artifacts and authorization schemas), and/or the like. The system 200 can use the additional context information provided via the user feedback response to modify and/or update one or more attributes of the digital contents for the candidate development service. For example, the system 200 can cause a generative machine learning model (e.g., a semantic natural language processing model, a large language model, and/or the like) to generate an adjustment to contents and/or attributes of the supporting digital artifacts (e.g., an augmented text-based narrative and/or description) based on the user feedback information. Accordingly, the system 200 can iteratively re-evaluate the authorization of the candidate development service (e.g., via one or more processes described herein) using the adjusted digital artifact attributes until a positive validation signal is received from the authorized user. In additional or alternative implementations, the system 200 can be configured to display contents of the user feedback response to a second user interface corresponding to one or more participant users associated with the candidate development service. The system 200 can also receive (e.g., via the second interface) a secondary user feedback response that can include manual adjustments to the supporting digital artifacts (e.g., modifications to text-based descriptions) submitted by a participant user. As a result, the system 200 can incorporate both the manual adjustments (e.g., of the participant user) and generative adjustments to re-evaluate authorization of the candidate development service. Such adjustments can be delivered by any of multiple methods including text, icons, buttons, voice input, or predetermined templates.

Figure 3A:
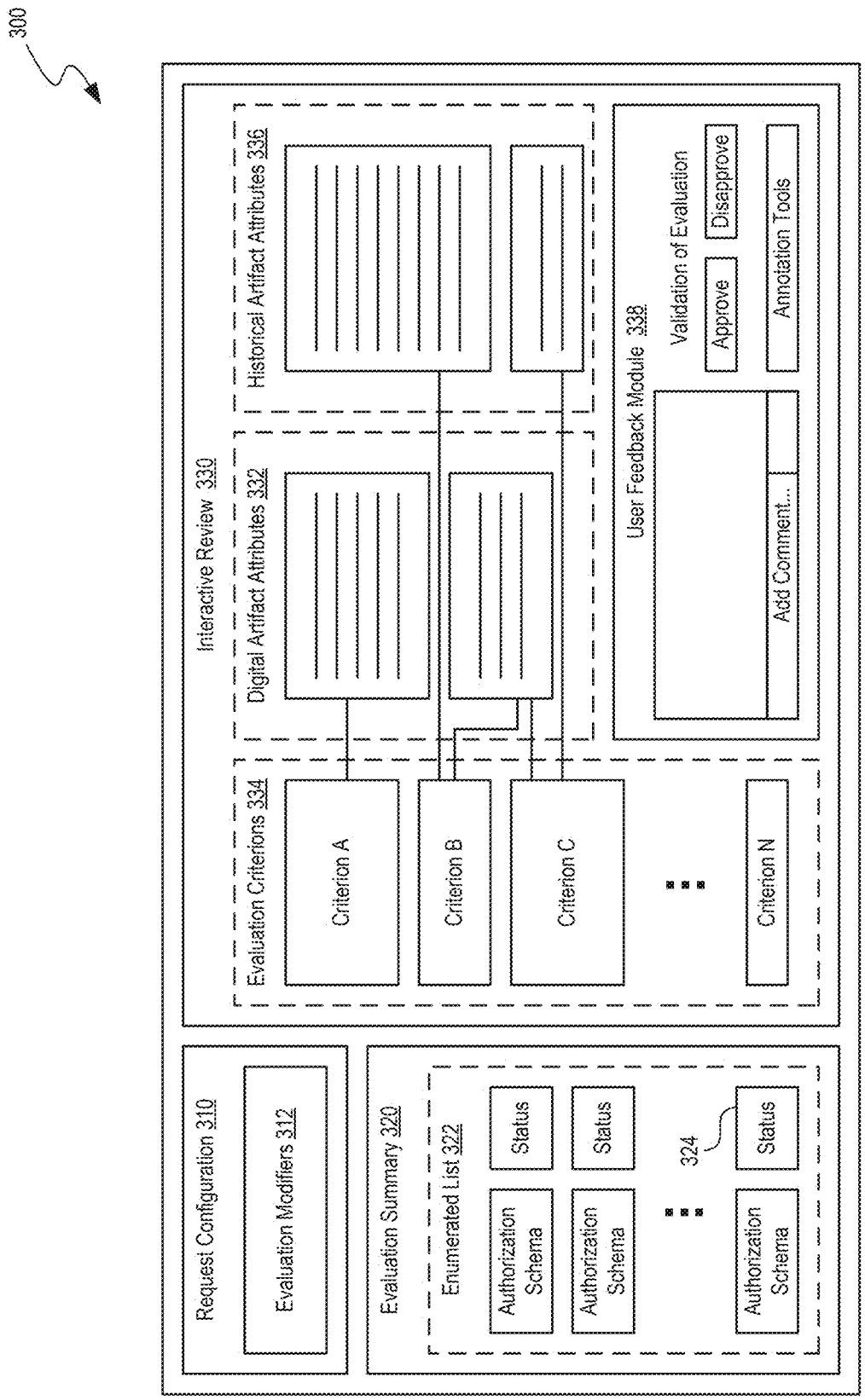
FIG. 3A is a block diagram illustrating an example configuration of an evaluation interface of the service authorization system of FIG. 2 in accordance with some implementations of the present technology.

FIG. 3A is a block diagram illustrating an example configuration of an evaluation interface 300 of the service authorization system 200 of FIG. 2 in accordance with some implementations of the present technology. The evaluation interface 300 ("interface 300") is implemented using components of the example computer system 100 illustrated and described in more detail with reference to FIG. 1. Likewise, implementations of interface 300 can include different and/or additional components or can be connected in different ways. Interface 300 is a visual interface that allows users (e.g., an authorized user, a participant user, and/or the like) to interact with electronic devices using graphical elements (e.g., windows, icons, buttons, and/or the like) rather than text-based commands. As shown in FIG. 3A, the interface 300 includes a request configuration component 310, an evaluation summary component 320, and an interactive review component 330.

The system 200 can be configured to transmit instructions (e.g., for the interface 300) to generate and/or display content via interactive graphical user interface (GUI) components. As shown in FIG. 3A, the interface 300 can be configured to display a request configuration component 310 that comprises one or more user-adjustable evaluation modifiers 312 enabling an authorized user (e.g., an accountant or auditor) to create customized service authorization evaluation requests. For example, the evaluation modifiers 312 can include service type filtering options (e.g., assigned technical field, fiscal expenditure quantities, and/or the like) that enable the authorized user to request authorization evaluation for a subset of available candidate development services. In another example, the evaluation modifiers 312 can include a service quantity modifier that enables the authorized user to specify the total number of services that are evaluated for authorization (e.g., an individual service, a group of selected services, all available services, and/or the like).

In some implementations, the interface 300 can be configured to display an evaluation summary component 320 that comprises an aggregated view of authorization evaluation results for a candidate development service. For example, the evaluation summary component 320 can display an enumerated list 322 of identified applicable authorization schemas (e.g., possible authorization claims with supporting digital artifacts) for the candidate development service. As shown in FIG. 3A, each applicable authorization schema within the enumerated list 322 can include a visible authorization status 324 that indicates an approximate compliance strength of the supporting digital artifact attributes in qualifying the candidate development service. The system can compare and display the application of multiple approaches to documentation and qualification. The system can permit a user to select between such multiple approaches.

In some implementations, the interface 300 can be configured to display an interactive review component 330 that comprises a detailed visualization of the correlative relationships (e.g., connective links representing relational mappings) between supporting digital artifact attributes 332 (e.g., of the candidate development service) and evaluation criterions 334 of the select applicable authorization schema. As shown in FIG. 3A, the interactive review component 330 can include a secondary view of exemplary historical digital artifact attributes 336 that correspond to digital artifacts previously used to successfully (e.g., or unsuccessfully) authorize prior development services under the same applicable authorization schema. Additionally, the interactive review component 330 can be configured to include a user feedback module 338 that enables the authorized user to transmit a positive (e.g., or negative) validation signal indicating approval (e.g., or disapproval) of using the presented supporting digital artifacts to submit an authorization request for the candidate development service under the applicable authorization schema. The user feedback module 338 can also include custom interface tools that allow authorized users to submit additional context information (e.g., commentary narratives, custom annotations, and/or the like) that further explains the transmitted positive (e.g., or negative) validation signal.

Figure 3B:
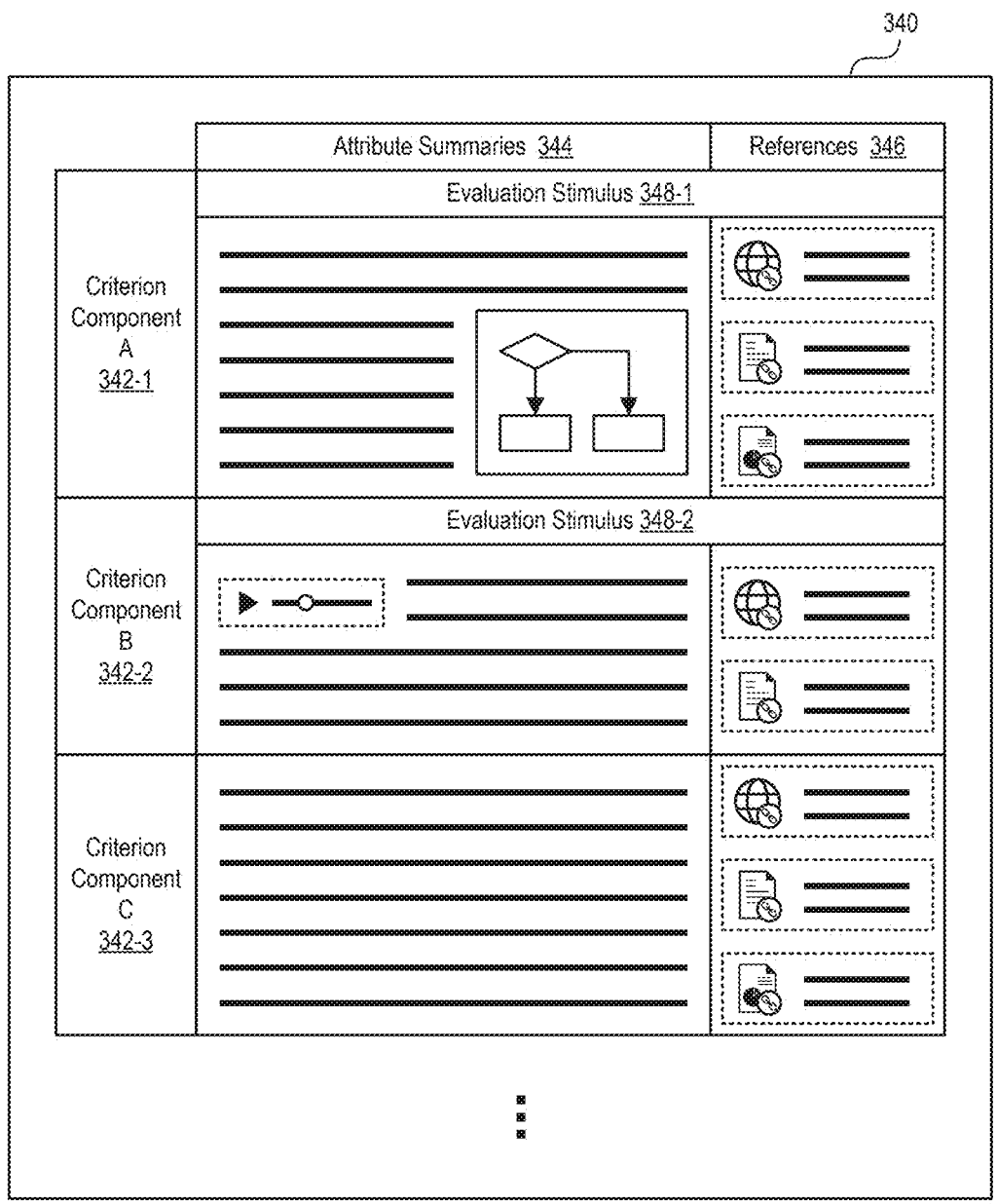
FIG. 3B is a block diagram illustrating an example visual representation of the service authorization system of FIG. 2 in accordance with some implementations of the present technology.

FIG. 3B is a block diagram illustrating an example visual representation 340 produced by the service authorization system 200 of FIG. 2 in accordance with some implementations of the present technology. For example, the system 200 can generate a digital visualization (e.g., a webpage, an application window, a report, and/or the like) that captures and/or summarizes detailed results of a service authorization evaluation request. In some implementations, the system 200 can be configured to dynamically update, or re-generate, the visual representation 340 in response to additional modifications to material and/or contextual contents of the service authorization evaluation (e.g., adjustment of digital artifact attributes, user commentary on evaluation logic, user edits (additions, deletions or revisions) to such evaluation, and/or the like).

As shown in FIG. 3B, the visual representation 340 can include one or more criterion components 342, attribute summaries 344 (e.g., narrative text descriptions, visual images, embedded audio files, and/or the like), references 346, and/or evaluation stimuli 348. In some implementations, the system 200 can be configured to generate a portable export of the visual representation 340 (e.g., a plaintext file, a PDF, and/or the like). For purposes of illustration, the visual representation 340 of FIG. 3B is depicted as a tabular data structure. However, an ordinary person skilled in the art will appreciate that the visual representation 340 can be customized in both format and medium to seamlessly integrate into existing digital interfaces (e.g., touchscreens, monitors, and/or the like), applications (e.g., website, desktop program, internal portals, and/or the like), and/or data processing pipelines. In one example, the system 200 can configure the visual representation 340 as a modifiable digital asset (e.g., a collaborative user interface) that is shared between two or more users. In another example, the system 200 can export the visual representation 340 as a formatted document (e.g., a PDF) as an output result of evaluating the user request for service authorization, as described herein.

In some implementations, the visual representation 340 can be configured to present results of evaluating authorization of development services (e.g., with respect to authorization schemas) in a modular format. For example, the visual representation 340 can include discrete information modules associated with individual evaluation criterions (e.g., identifiable service features, observed challenges of development service, and/or the like) associated with an authorization schema (e.g., qualification criteria for financial benefits and/or asset amortization). As shown in FIG. 3B, the visual representation 340 includes row-wise tabular cell groups corresponding to a criterion component A 342-1, a criterion component B 342-2, and a criterion component C 342-3. In some implementations, the visual representation 340 can group a plurality of criterion components 342 into a single representation unit, such as the criterion component B 342-2 and component C 342-3, as shown in FIG. 3B. Although FIG. 3B presents three criterion components 342, an ordinary person skilled in the art will appreciate that the visual representation 340 can be extended to include an arbitrary number of components 342.

In some implementations, the visual representation 340 can be configured to present results within an individual criterion component 342 via a modular format. For example, the visual representation 340 can configure the individual criterion components 342 to include discrete information modules corresponding to an attribute summary 344, one or more references 346, and/or a guiding evaluation stimulus 348. As shown in FIG. 3B, the visual representation 340 can include column-wise tabular cell groups corresponding to attribute summaries 344 and references 346. The visual representation 340 of FIG. 3B also includes a header component within each criterion component 342 for the evaluation stimulus 348.

In some implementations, an attribute summary 344 of a criterion component 342 can include human-readable (e.g., alphanumeric text, visual images, and/or the like) and/or interactable elements (e.g., embedded audio recordings) based on attributes of digital artifacts (e.g., documentation files, graphic figures, video and/or audio recordings) indicating tracked development actions for a monitored development service. For example, the system 200 can configure the attribute summary 344 to present one or more pertinent digital artifact attributes used to predict an authorization status of the development service for a specified evaluation criterion (e.g., satisfaction of required artifact attribute thresholds of an authorization schema). In some implementations, the system 200 can be configured to use a machine learning model (e.g., a large language model, a natural language processing algorithm, and/or the like) to generate the content information (e.g., human-readable narratives) presented in the attribute summaries 344.

In some implementations, the references 346 of a criterion component 342 can include navigational and/or executable components (e.g., redirect links, file/system shortcuts, embedded attachment executable, and/or the like) that are configured to retrieve, or redirect, the end user to a digital artifact associated with the development service and/or attribute summary 344. For example, the system 200 can configure the references 345 of a criterion component 342 to include a web-based hyperlink, an embedded text document, and/or an embedded graphical element, as shown in FIG. 3B.

In some implementations, the evaluation stimulus 348 of a criterion component 342 can include human-readable elements that characterize an evaluation criterion of an authorization schema (e.g., criterion corresponding to component 342). For example, the system 200 can configure the criterion component 342 to present a narrative prompt (e.g., an instructional text description, a clarification query, and/or the like) for the evaluation criterion that is answered via content presented in the attribute summary 344 and/or references 346. In some implementations, the system 200 can be configured to use a machine learning model (e.g., a large language model, a natural language processing algorithm, and/or the like) to generate the narrative prompt for the evaluation stimulus 348 based on contents of the authorization schema.

Figure 4:
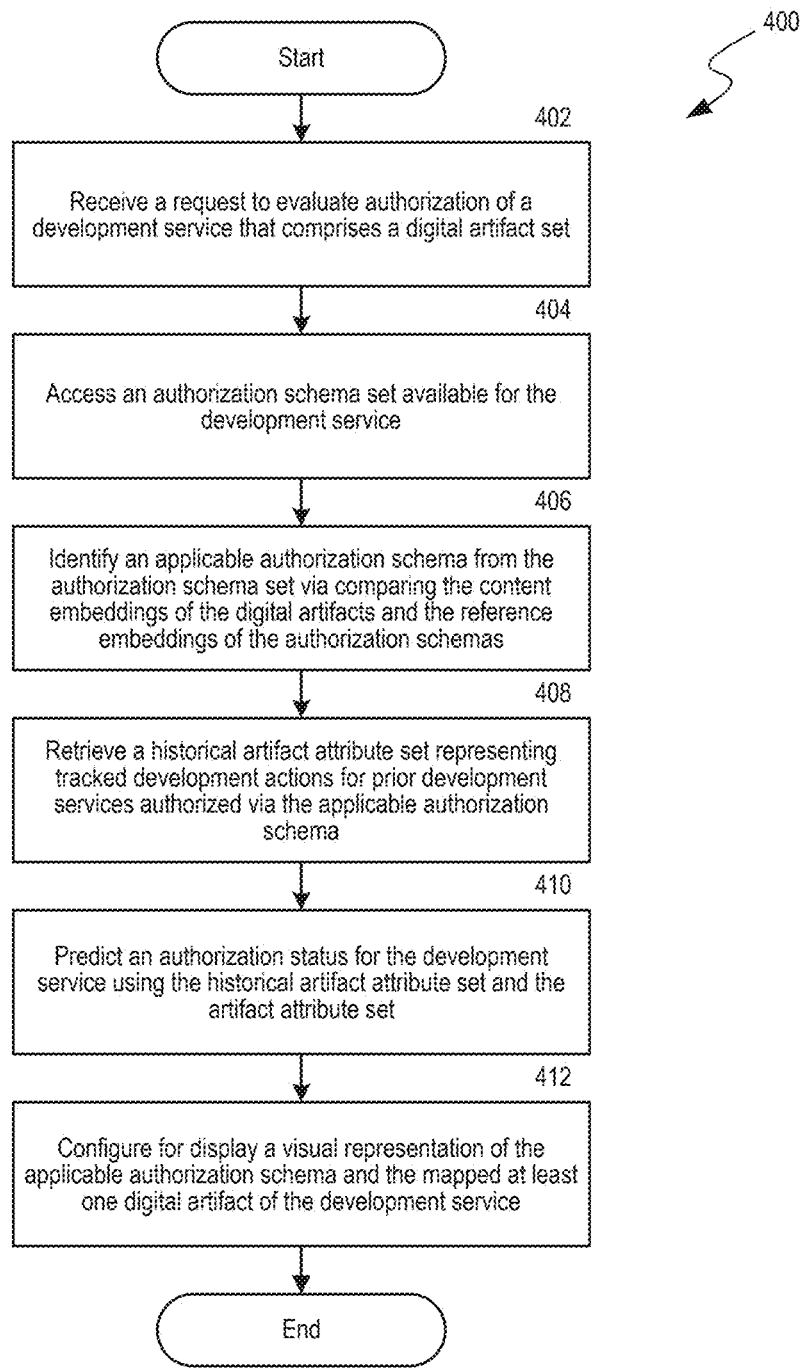
FIG. 4 is a flow diagram that illustrates an example process for evaluating authorization of development services in accordance with some implementations of the disclosed technology.

FIG. 4 is a flow diagram that illustrates an example process 400 (e.g., a computer-implemented method) for evaluating authorization of development services in accordance with some implementations of the disclosed technology. The process 400 can be performed by a system (e.g., service authorization system 200) configured to identify and report applicable authorization schemas for a development service and the corresponding digital artifacts to support the authorization. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At block 402, the system can receive (e.g., via a user interface) a request to evaluate authorization of at least one development service that comprises a digital artifact set. For example, the system can receive a request to evaluate authorization of at least one development service such that each corresponding digital artifact in the digital artifact set comprises a content embedding for an artifact attribute set representing tracked development actions of the at least one development service. A content embedding for a digital artifact (e.g., a natural language document) can include a quantitative, and often standardized, representation (e.g., a normalized vector of numerical features in a high-dimensional vector space) of contents and/or attributes associated with the digital artifact (e.g., alphanumeric text, rasterized image data, recorded audio signals, and/or the like). The content embeddings of each digital artifact enable the system and/or components thereof (e.g., machine learning models, natural language processing algorithms, and/or the like) to numerically compare, and identify similar (or disparate) content attributes between multiple digital artifacts. As an illustrative example, the system can use a semantic encoder (e.g., a natural language model) to convert contents of a digital artifact (e.g., alphanumeric text strings) into a formatted numerical identifier (e.g., a vector array) comprising one or more feature attributes (e.g., numerical values of the vector array) corresponding to embedded attributes of the digital artifact. In some implementations, the system can be configured to generate the content embeddings for each digital artifact corresponding to the at least one development service. In other implementations, the system can generate and/or retrieve content embeddings for digital artifacts as a component function of a broader knowledge base and/or framework (e.g., a Retrieval-Augmented Generation framework for large language models).

At block 404, access an authorization schema set available for the at least one development service. For example, the system can access an authorization schema such that each authorization schema in the authorization schema set comprises a reference embedding (e.g., a numerical vector identifier) for required qualitative evaluation criterions to authorize the at least one development service. Each authorization schema in the authorization schema set for the at least one development service can comprise required artifact attribute thresholds representative of the evaluation criterions, such as regulatory policies (e.g., natural language rules), predetermined evaluation rulesets (e.g., conditional criterion mappings), narrative guidelines (e.g., alphanumeric descriptions), fiscal procedures, and/or a combination thereof. In some implementations, the system can generate the reference embedding for an authorization schema via converting contents of the qualitative evaluation criterions into one or more comparative numerical features. For example, the system can use a semantic encoder (e.g., a natural language model) to convert natural language rules and/or criterions of text-based regulatory policies into a set of formatted numerical identifiers (e.g., a vector matrix, or a set of vector arrays), such that each identifier comprises feature attributes (e.g., numerical values of the array) corresponding to individual policy rules. By converting the qualitative evaluation criterions into the numerical identifiers, the system can quantitatively compare (e.g., via cosine similarity, Euclidean distance, and/or the like) the content embedding of a digital artifact (e.g., representation of artifact contents) and the reference embedding of the evaluation criterion to determine an approximate content similarity score (e.g., a likelihood indicating satisfaction of the evaluation criterion by the digital artifact contents). In some implementations, the system can configure each required artifact attribute threshold of the authorization schema as a required content similarity threshold (e.g., a static, or dynamic, numerical value) between content embeddings of digital artifacts and reference embeddings of the evaluation criterions.

At block 406, the system can identify an applicable authorization schema subset from the authorization schema set via comparing the content embeddings of the digital artifacts and the reference embeddings of the authorization schemas. For example, the system can input into a first machine learning model, the content embeddings of the digital artifacts and the reference embeddings of the authorization schemas to output a content correlation score (e.g., a likelihood measure indicating digital artifact content satisfaction of evaluation criterion). In some implementations, the system can compare the content embeddings of the digital artifacts and the reference embeddings of the authorization schemas such that each applicable authorization schema in the subset is mapped to at least one digital artifact of the at least one development service and the reference embedding of the applicable authorization schema and the content embedding of the at least one digital artifact satisfies a similarity threshold.

At block 408, the system can retrieve one or more historical artifact attribute sets representing tracked development actions for prior development services authorized via the applicable authorization schema. For example, the system can, for each applicable authorization schema in the applicable authorization schema subset, retrieve from a remote database a historical artifact attribute set representing tracked development actions for prior development services authorized via the applicable authorization schema.

At block 410, the system can predict an authorization status for the at least one development service using the historical artifact attribute set and the artifact attribute set. For example, the system can input into a second machine learning model, the historical artifact attribute set, and the artifact attribute set to predict an authorization status for the at least one development service. In some implementations, the authorization status indicates whether the required artifact attribute thresholds of the applicable authorization schema are satisfied.

At block 412, the system can configure for display a visual representation of at least one applicable authorization schema and the mapped at least one digital artifact of the at least one development service (for example, as illustrated in FIG. 3B). For example, the system can configure for display (e.g., at a user interface) a visual representation of at least one applicable authorization schema and the mapped at least one digital artifact such that the authorization status of the at least one applicable authorization schema indicates satisfaction of the required artifact attribute thresholds. In some implementations, the system can configure the visual representation to display the artifact attribute set of the at least one digital artifact that represent the tracked development actions of the at least one development service. In other implementations, the system can configure the visual representation of the at least one applicable authorization schema to display a comparative diagram that maps a first mapping of content similarities between the historical artifact attribute set and the artifact attribute set and a second mapping of content differences between the historical attribute set and the artifact attribute set.

In some implementations, the system configures for display (e.g., at the user interface) a distinct visual marking over an artifact attribute subset that corresponds to artifact attributes satisfying the required artifact attribute thresholds of the applicable authorization schema. In other implementations, the authorization status further indicates whether the required artifact attribute thresholds of the applicable authorization schema are partially satisfied. Accordingly, the system can configure for display (e.g., at the user interface) a distinct visual marking over an artifact attribute subset that corresponds to artifact attributes partially satisfying the required artifact attribute thresholds of the applicable authorization schema.

In some implementations, the system causes the generative machine learning model to generate a human-readable recommendation for adjusting at least one artifact attribute from the displayed artifact attribute subset to satisfy the required artifact attribute thresholds of the applicable authorization schema. Accordingly, the system can configure for display (e.g., at the user interface) the generated human-readable recommendation.

In some implementations, the system obtains a first sequence of intermediary logic operations executed during operation of the first machine learning model and a second sequence of intermediary logic operations executed during operation of the second machine learning model. The system can further cause the generative machine learning model to generate, using the first and the second sequence of intermediary logic operations, a human-readable narrative explaining a logical sequence resulting in the authorization status of the displayed at least one applicable authorization schema. Accordingly, the system can configure for display (e.g., at the user interface) the generated human-readable narrative alongside the visual representation of the at least one applicable authorization schema and the mapped at least one digital artifact.

In some implementations, the system automatically generates an export digital artifact in response to receiving (e.g., via the user interface) a positive user indication for the at least one applicable authorization schema. For example, the system can generate an export digital artifact based on an artifact template (e.g., stored in a database or obtained from a third-party service) that comprises a required field query set. In additional or alternative implementations, the system can cause a generative machine learning model to generate human-readable narratives for each required field query using the artifact attribute set and the historical artifact attribute set associated for the at least one digital artifact mapped to the at least one applicable authorization schema. As an illustrative example, the system can generate, and populate, a digital form (e.g., a fillable PDF, a formatted text document, and/or the like) that indicates an eligibility claim to one or more material benefits (e.g., tax credits, fiscal rewards, and/or the like) for the at least development service (e.g., experimental research project). Further, the system can generate the digital form based on a pre-defined template (e.g., an unfilled PDF) obtained from a third-party service (e.g., a government institution, a private organization, an internal assessment group, and/or the like) associated with the provisioning of the one or more material benefits and/or the evaluation of the at least one development service for claim eligibility. The digital form can include separate input fields (e.g., fillable text boxes) that indicate required and/or applicable information for evaluating qualification of the development service (e.g., attributes associated with the authorization schema). Examples of applicable information can include qualifying fiscal expenses, such as third-party software contracts, costs of qualifying tools, software expenses, software services, and/or other related expenditures eligible for inclusion with respect to the authorization schema of the material benefit and/or asset amortization. Accordingly, the system can be configured to automatically populate each available input field of the digital form using content attributes of the retrieved digital artifacts and/or human-readable narratives generated via the generative model. In another example, the system can generate a digital form that include input fields that correspond to cumulative information (e.g., qualifying fiscal expenses for a selected group of development services, total contract wages for digital artifacts corresponding to a pre-determined category, and/or the like) across multiple digital artifacts (e.g., of an individual development service) and/or multiple development services.

In some implementations, the system automatically generates a model prediction training sample comprising an input data in response to receiving (e.g., via the user interface) a negative and/or positive user indication for the at least one applicable authorization schema. For example, the system can generate a model prediction training sample comprising an input data based on the historical artifact attribute set and the artifact attribute set of the at least one digital artifact and an output label based on the authorization status of the at least one applicable authorization schema. In additional or alternative implementations, the system can access (e.g., from the remote database) a stored model prediction training sample set such that each model prediction training sample corresponding to predicted authorization statuses of prior applicable authorization schemas. Accordingly, the system can use the stored model prediction training sample set and the generated model prediction training sample to retrain the first machine learning model, the second machine learning model, the generative machine learning model, and/or a combination thereof.

In some implementations, the user interface can be a first user interface, and the system can be configured to generate an adjusted artifact attribute set for the at least one digital artifact in response receiving (e.g., via the first user interface) a negative user indication for the at least one applicable authorization schema. For example, the system can receive a negative user indication that identifies a required artifact attribute threshold subset not satisfied by the artifact attribute set. The system can input into a third machine learning model the historical artifact attribute set, the artifact attribute set, and the required artifact attribute threshold subset to generate an adjusted artifact attribute set for the at least one digital artifact that satisfies the required artifact attribute threshold subset. Accordingly, the system can configure for display (e.g., at a second user interface) the identified required artifact attribute threshold subset and the adjusted artifact attribute set such that the second user interface corresponding to an authorized editor of the at least one digital artifact.

Overview of Data Management Engine

Figure 5:
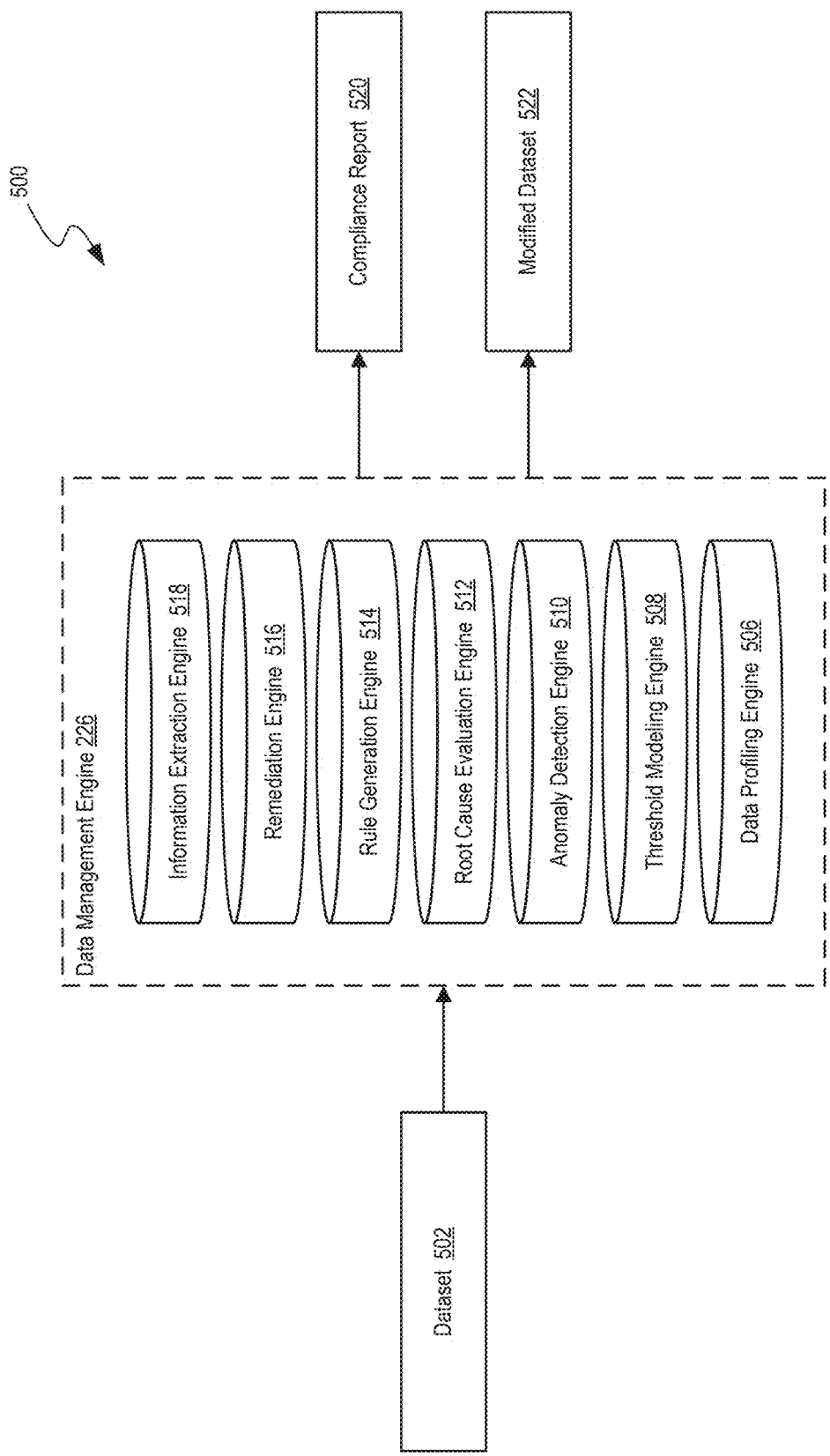
FIG. 5 illustrates an example environment of a data management engine of FIG. 2 for improving data quality of a dataset.

FIG. 5 illustrates an example environment 500 of a data management engine 226 for improving data quality of a dataset. Environment 500 includes dataset 502, data management engine 226, compliance report 520, and modified dataset 522. Implementations of example environment 500 can include different and/or additional components or can be connected in different ways.

The dataset 502 can include structured and/or unstructured data. Structured data refers to data organized in a predefined manner, such as databases or spreadsheets (e.g., in rows and columns, in a graph, and so forth), while unstructured data refers to data without a predefined data model, such as emails, multimedia files, and other free-form documents. For example, a company's customer database can include structured data, such as customer identifiers and transaction records, while unstructured data includes customer feedback emails. The data management engine 226 ingests the dataset 502 and performs one or more validation checks on the dataset 502. The data management engine 226 can be cloud-based or stored on a local server. The validation actions performed by the data management engine 226 in FIGS. 2 and 5 can be executed by data profiling engine 506, threshold modeling engine 508, anomaly detection engine 510, root cause evaluation engine 512, rule generation engine 514, remediation engine 516, and/or information extraction engine 518.

The data profiling engine 506 can identify dataset's 502 structure, data types, and/or indicate one or more attributes/features of the dataset 502 (e.g., typos, wrong format, out of range values). The data profiling engine 506 can, using the variables and observations within dataset 502, automatically identify attributes of the dataset 502, such as the number of records, field types (e.g., integers, floats, strings), variables, variable values, and/or frequency distributions. In some implementations, the data profiling engine 506 determines the features of each variable (i.e., univariate). For numerical data, the data profiling engine 506 can calculate mean, median, standard deviation, interquartile range, and so forth. For categorical data, the data profiling engine 506 can calculate the number of categories, the number of observations in each category, and so forth. Using the identified features, the data profiling engine 506 can, in some implementations, identify one or more anomalies of the dataset 502 in one or more variables. For example, the data profiling engine 506 can identify values beyond a certain SD from the mean. The thresholds used in determining anomalies can be configurable by a user (e.g., by defining the threshold SD, threshold variance, combination threshold that requires satisfying both the threshold SD and the threshold variance, etc.). For example, the data profiling engine 506 can detect that customer birth dates are missing in a certain percentage of records.

In some implementations, data profiling engine 506 can identify metadata within dataset 502 associated with data lineage and/or versioning to monitor transformations of data within dataset 502. Further methods of identifying attributes/features of the dataset are discussed with reference to FIG. 15. In some implementations, the data profiling engine 506 can generate an output file (e.g., text, image, audio, video, multi-modal) indicating the identified structure, data types, and/or one or more features of the dataset 502 (e.g., on a graphical user interface). The data profiling engine 506 can be data agnostic, meaning that the data profiling engine 506 does not use prior context or knowledge about the dataset 502 to identify the dataset's 502 features. In some alternative implementations, the data profiling engine 506 could be data discerning whereby the data profiling engine applies prior context or knowledge about the dataset 502 to more rapidly identify the dataset's features.

The threshold modeling engine 508 can identify one or more anomalies by dynamically generating thresholds and/or setting static thresholds for particular data attributes (e.g., variable values, means, SD, interquartile range, and so forth) determined by the data profiling engine 506. For example, the threshold modeling engine 508 can identify anomalies in seasonal attributes based on historical data using univariate analysis by determining thresholds (e.g., ranges of variable values) during different times. The threshold modeling engine 508 can use historical data to establish baseline patterns (e.g., using an autoregressive integrated moving average (ARIMA) model) and continuously update the thresholds at various intervals, e.g., as new data (e.g., dataset 502) is ingested, at preset time intervals, or at preset data quantities. By using historical data, the threshold modeling engine 508 can account for expected variations and seasonal trends, reducing the likelihood of false positives.

The anomaly detection engine 510 can detect univariate and/or multivariate anomalies within dataset 502. The anomaly detection engine 510 can flag transactions that deviate significantly from established thresholds or exhibit unusual correlations (e.g., indicating potential errors) using methods discussed with reference to FIG. 15. The anomaly detection engine 510 can use one or more anomaly detection modeling techniques, such as clustering, regression analysis, anomaly score computation, and so forth, to identify outliers. The anomaly detection engine 510 can assign one or more anomaly scores for each data point in dataset 502 and compare the score against the established thresholds to determine if an anomaly exists. In some implementations, the anomaly detection engine 510 uses a majority vote between multiple models to assign the anomaly score. Methods of detecting anomalies within unstructured data are discussed in further reference to FIGS. 6-8. Methods of using an out-of-distribution prediction engine within the anomaly detection engine 510 that trains a machine learning model to identify whether a data object is out-of-distribution is discussed in further reference to FIGS. 15-19.

In some implementations, anomalies detected by the anomaly detection engine 510 can use predefined context or knowledge bases. The context or knowledge bases can be tailored to the specific use case or application of dataset 502, such as appending dataset 502 to another dataset. A use case refers to a specific situation or scenario in which the dataset 502 is applied to achieve a particular goal (e.g., resolving missing values) or solve a specific problem (e.g., whether two datasets belong to the same corpus). For instance, an anomaly in dataset 502 can be identified if the data of dataset 502 exceeds a certain standard deviation threshold value from a reference dataset, indicating that the dataset 502 potentially fails to belong to the same corpus (e.g., group of artifacts, group of documents) as the reference dataset. In some implementations, the threshold value is configurable by a user of the data management engine 226. For example, the user can select how many degrees of standard deviation should be allowed when determining if an observed set of values belongs to the same corpus as another set of values. If the standard deviation of both the observed set of values and the other set of values exceeds the user-defined standard deviation threshold, the observed values can be raised as an anomaly.

The root cause evaluation engine 512 can identify one or more events associated with (e.g., causing, linked to, mapped to) the anomalies using correlations between or among values of different data variables in the dataset 502 and identifying sequence patterns that precede anomalies. For instance, the root cause evaluation engine 512 can identify that a particular system error during data entry leads to inconsistencies in the dataset 502. The root cause evaluation engine 512 can use techniques such as causal inference, dependency analysis, and/or sequence mining to trace the anomaly back to its source. The source of an anomaly can be a specific variable or multiple variables within the dataset. For instance, an anomaly can be traced back to a single variable that is significantly higher or lower than the expected range. Alternatively, the source can include multiple variables that together form a pattern indicative of, for example, data entry errors, system errors, hardware malfunctions, and so forth.

In some implementations, the rule generation engine 514 can automatically generate/formulate association rules based on historical data patterns and observations. The association rules define expected data behaviors and relationships of dataset 502. For example, an association rule can state that if a value of a variable exceeds a certain threshold, the value of a different variable is of a certain category. Further methods of determining root causes of detected anomalies are discussed with reference to FIG. 12 and FIG. 15.

The remediation engine 516 can generate one or more actions (e.g., workflows, computer-executable tasks) to remediate anomalies. The actions can include data correction, alert generation, or perform one or more computer-executable tasks to rectify data inconsistencies. For instance, the remediation engine 516 can automatically correct data mismatches by referencing a master data source or filling in missing values of a dataset using predicted values. In conjunction or alternatively, the remediation engine 516 can use one or more predefined rules, machine learning models, and so forth to recommend and/or implement remediation actions upon user authorization. In some implementations, remediation engine 516 can integrate with external workflow management systems to automate remediation processes involving multiple tasks.

The modified dataset 522 refers to the dataset 502 after the remediation actions are performed on the dataset 502. In some implementations, modified dataset 522 can include enriched data, where missing values are imputed, or additional context is added based on reference data sources. The data management engine 226 can track changes to maintain a history of data modifications for audit purposes. The compliance report 520 can be generated by the data management engine 226 to document the compliance status of dataset 502 with specified data quality standards/guidelines/regulations. The compliance report 520 can include identified anomalies, remediation actions, data quality metrics, version, and so forth.

In some implementations, the information extraction engine 518 can extract data from unstructured sources and use dataset 502 to determine anomalies within the unstructured source and/or the dataset 502. For example, the information extraction engine 518 can use natural language processing (NLP) techniques and other methods discussed with reference to FIG. 15 to parse text, recognize entities, and transform unstructured data into a structured format. In some implementations, information extraction engine 518 can ingest text, audio, images, videos, and so forth.

Remediating Unstructured Data Using the Data Management Engine

Figure 6:
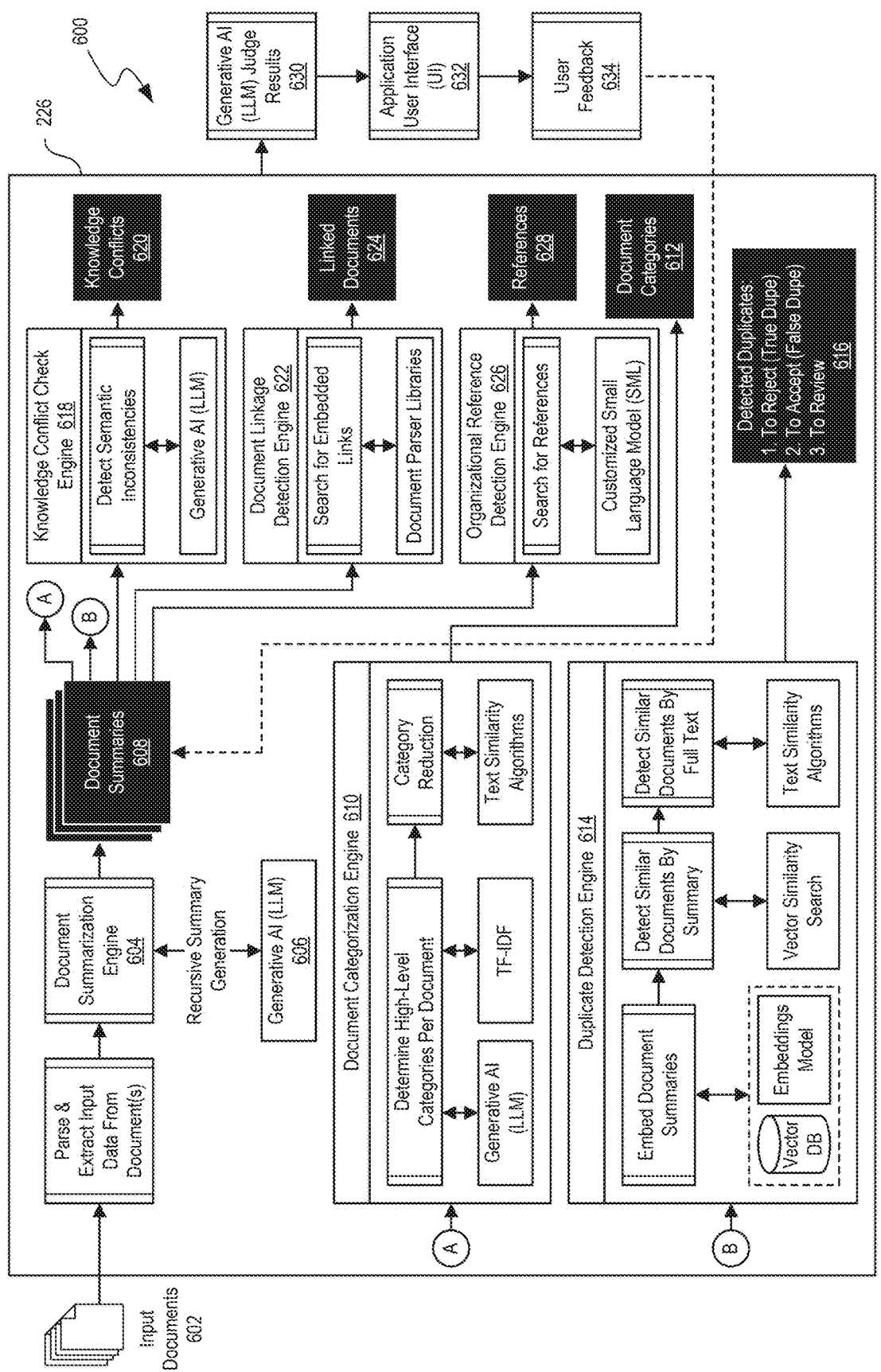
FIG. 6 illustrates an example environment of the data management engine of FIG. 2 for remediating unstructured data.

FIG. 6 illustrates an example environment 600 of the data management engine 226 of FIG. 2 for remediating unstructured data. Environment 600 includes input documents 602, a summarization engine 604 that uses an AI model 606 to output summaries 608, a categorization engine 610 that outputs categories 612, a duplicate detection engine 614 that outputs duplicates 616, a knowledge conflict check engine 618 that outputs knowledge conflicts 620, a linkage detection engine 622 that outputs linked documents 624, an organizational reference engine 626 that outputs organizational references 628, results 630, a user interface 632, and user feedback 634. Implementations of example environment 600 can include different and/or additional components or can be connected in different ways. The different engines of environment 600 can be performed in parallel by, for example, separate AI models (e.g., agentic models). Though example environment 600 describes remediating unstructured documents, the data management engine 226 can similarly remediate unstructured data of any sort, including, but not limited to, audio data, image data, video data, and so forth. Methods of remediating unstructured data of different modalities are discussed in further detail with reference to FIG. 8.

The input documents 602 can represent a collection of unstructured data (or a mix of structured and unstructured data) that the data management engine 226 ingests via, for example, a user interface (e.g., the user interface 632). In some implementations, the input documents 602 are received from a computer system separate from one associated with the user interface 632. The input documents 602 can include various types of data such as text files, emails, chat logs, images, voice recordings, and so forth. In some implementations, the input documents 602 can include multimedia files and other free-form documents that lack a predefined data model.

The summarization engine 604 within the data management engine 226 uses an AI model 606 (e.g., a non-generative AI model, a generative AI model, a machine learning model, an LLM, and so forth) to generate summaries 608 of the input documents 602. The summarization engine 604 can, for example, categorize the input documents 602 into clusters based on vector comparisons of content within the documents. Methods of summarizing the documents are discussed in further detail with reference to FIG. 8. The summaries 608 provide a condensed version of the content to enable the data management engine 226 to remediate or otherwise process large volumes of unstructured data. In some implementations, the summarization engine 604 can use different AI models for different types of documents (e.g., a text-based model for text documents, an image-based model for images, and so forth).

The categorization engine 610 within the data management engine 226 can use the summaries 608 generated by the summarization engine 604 and categorize the summaries 608 into categories 612. The categorization engine 610 can group the summaries 608 based on their respective content. In some implementations, the categorization engine 610 uses predefined categories. In other implementations, the categorization engine 610 dynamically generates categories that reflect the themes present in the documents. The categorization engine 610 uses, for example, one or more AI models (e.g., ML models) to identify patterns and similarities in the documents (e.g., by determining a distance between vector representations of the documents) and group related summaries 608 together.

The categorization engine 610 can use one or more generative AI models (e.g., large language models (LLMs)) and/or term frequency-inverse document frequency (TF-IDF) algorithms to categorize the documents. Generative AI models can identify, for the input documents 602, concepts, entities, and the relationships between them and thus suggest categories based on the context and content of the documents. The data management engine 226 can additionally or alternatively determine the term frequency (TF)—the number of times a term appears in a document, weighted against the inverse document frequency (IDF)—which measures how common or rare a term is across the entire dataset. By multiplying these two metrics, TF-IDF identifies terms that are particularly "important" within individual documents while diminishing the weight of common terms that appear frequently across multiple documents.

The data management engine 226 can further perform category reduction (e.g., using text similarity algorithms) to ensure that the categories are not overly granular. In some implementations, the categorization engine 610 can create hierarchical categories, where a particular document is assigned to multiple categories. This hierarchical categorization allows for more nuanced organization and retrieval of documents based on multiple facets of their content. Methods of categorizing input documents 602 are discussed in further detail with reference to FIG. 8.

The duplicate detection engine 614 within the data management engine 226 identifies duplicates 616 within the unstructured data by generating intermediate and overall similarity values for pairs of summaries 608 and setting thresholds to detect duplicates. The duplicate detection engine 614 can compare the content of each summary to identify documents that contain similar or identical information. The duplicate detection engine 614 can, for example, determine vector similarities and apply predefined thresholds to determine if two summaries are duplicates. The data management engine 226 can embed document summaries into a vector database and use an embeddings model to detect similar documents by summary and full text through vector similarity search and text similarity algorithms. In some implementations, the results of the duplicate detection process can be classified into three actions: reject (true duplicate), accept (false duplicate), or review. In some implementations, the duplicate detection engine 614 can identify duplicates in different languages or a mix of languages by, for example, converting all documents to a common language. Methods of detecting duplicates are discussed in further detail with reference to FIG. 8.

The knowledge conflict check engine 618 within the data management engine 226 detects knowledge conflicts 620 between pairs of summaries 608. For example, the engine maps summaries 608 to topics and information sets and compares vector representations of information sets that share a common topic to identify contradictions. For example, one document that suggests a different action than another creates a knowledge conflict. The knowledge conflict check engine 618 can use one or more AI models to extract the semantic context to detect inconsistencies. Additionally, once knowledge conflicts 620 are identified, the knowledge conflict check engine 618 can resolve it by flagging the knowledge conflicts 620 for human review (human in the loop), suggesting potential resolutions based on predefined rules, or automatically resolving the conflict if the predefined rules or AI confidence thresholds are met. The knowledge conflict check engine 618 can, for example, update the conflicting summaries, reorganize the affected document categories, and/or provide additional context to resolve the contradiction. The knowledge conflict check engine 618 can identify and resolve the knowledge conflicts 620 using methods discussed with further reference to FIG. 4. In some implementations, the knowledge conflict check engine 618 can automatically resolve conflicts by automatically executing one or more computer-executable instructions on one or more applications associated with the input documents 602 based on subsequently received user input (e.g., clicking an "approve" button, turning on a setting to enable the data management engine 226 to automatically correct the input documents 602, and so forth).

Thresholds used in the environment 600 can be dynamically determined using, for example, a separate AI model that identifies a degree of satisfaction of the threshold against a set of criteria or performance metrics. For example, if the threshold uses computing resources above a certain threshold, the model can automatically increase/decrease the threshold to reduce the amount of computing resources used. In some implementations, the thresholds are determined using a panel of AI models (e.g., LLMs) by, for example, taking a majority vote of the models.

The linkage detection engine 622 within the data management engine 226 indicates the evolution and/or lineage of documents defined by the linked documents 624. The linkage detection engine 622 can use document parser libraries to search for embedded links within the documents. The linkage detection engine 622 can track changes and updates across different versions of documents to provide a history of modifications, parent-child relationships, and so forth. In some implementations, the engine can generate visual representations of document linkages in the form of, for example, a knowledge graph, a tree structure, a table, or another data structure. In some implementations, the linkage detection engine 622 can dynamically update the visual representations as new versions of documents are created or existing documents are modified. Thus, users are enabled access to the most current depiction of document relationships. The linkage detection engine 622 can associate and display metadata for each linkage, including timestamps of changes, the author of modifications, the nature of the changes made, and so forth.

The organizational reference engine 626 within the data management engine 226 outputs organizational references 628 by mapping documents back into an organizational system of an organization. The organizational reference engine 626 can parse data within the organizational system to identify corresponding reference numbers or other metadata associated with the documents. In some implementations, the organizational reference engine 626 uses a customized small language model (SML) to use domain-specific data (e.g., organizational-specific data) to search for the organizational references 628. In some implementations, the organizational reference engine 626 can integrate with external systems to fetch additional metadata (e.g., references from regulatory authorities).

The results 630 can indicate the outputs of the data management engine 226 in the form of a report, a graphical representation, an image, a video, an audio file, and so forth. The data management engine 226 can compile the input documents 602, the summaries 608, the categories 612, the duplicates 616, the knowledge conflicts 620, the linked documents 624, and/or the organizational references 628 into a dataset that can be, in some implementations, exported to downstream systems through application programming interfaces.

The user interface 632 can display or otherwise indicate the results 630 and enables users to interact with the data management engine 226. The user interface 632 can provide different views and filters to aid users in navigating the data. Users can view summaries, categories, duplicates, knowledge conflicts, document linkages, and/or organizational references through the user interface 632. In some implementations, the user interface 632 can enable the input of the user feedback 634. The data management engine 226 can use the user feedback 634 to improve the accuracy and relevance of the summaries, categories, duplicates, knowledge conflicts, document linkages, and/or organizational references using methods discussed with further reference to FIG. 8. In some implementations, the user feedback 634 can be used to train the AI models within the platform. For example, if the user continuously re-uploads the same unstructured data, the data management engine 226 can modify one or more elements of environment 600 based on evaluating the user feedback 634 using, for example, the root cause evaluation engine 512 in FIG. 5.

Figure 7A:
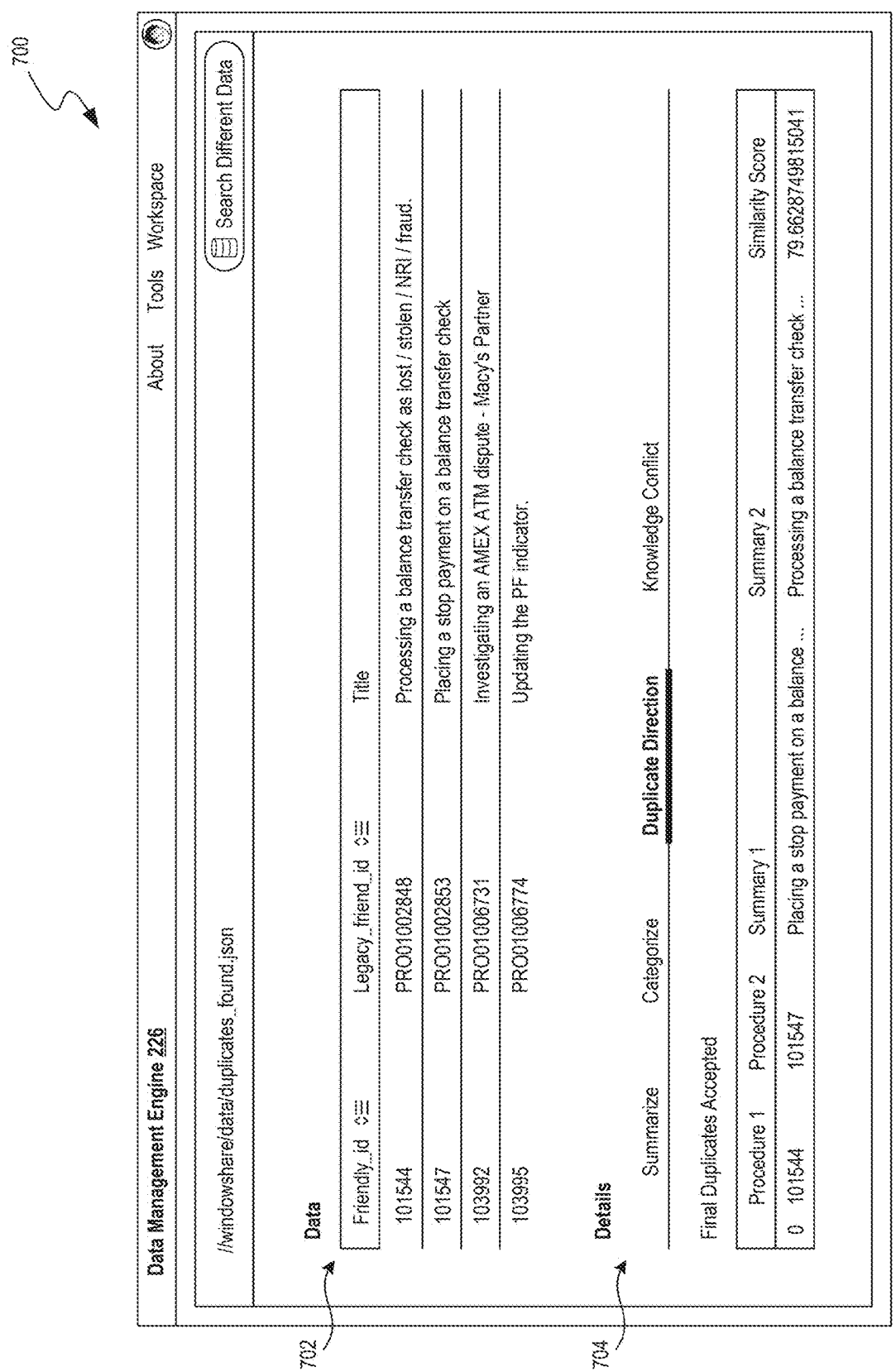
FIG. 7A illustrates a snapshot of a user interface of the data management engine of FIG. 2 for displaying detected duplicates of the unstructured data.

FIG. 7A illustrates a snapshot of a user interface 700 of the data management engine 226 for displaying detected duplicates 704 of the unstructured data. The user interface 700 includes data 702 (e.g., input documents 602). The user interface 700 of the data management engine 226 can include a navigation menu providing options, such as "About," "Tools," and "Workspace," to enable users to access various functionalities and additional information of the data management engine 226. The user interface 700 can include one or more indicators of an originating location of the data 702 (e.g., a file path input field displays the path to the current dataset illustrated as "//windowshare/data/duplicates_found.json" in FIG. 7A).

The data 702 can include a visual representation of the input documents 602 in FIG. 6. The user interface 700 can present the data as, for example, a table organized into columns for different variables (e.g., "Friendly_id," "Legacy_friend_id," "Title" in FIG. 7A). The user interface 700 can include listed entries (e.g., within the table) that indicate the values of the variables. Duplicates 704 in the user interface 700 of the data management engine 226 refer to a section that identifies duplicate entries (e.g., detected by the duplicate detection engine 614 in FIG. 6) within the dataset. The user interface 700 can indicate a similarity score of the duplicates 704, which can quantitatively express the degree of similarity to identify procedural overlaps or redundancies. For example, FIG. 7A illustrates a similarity score of 79.6628749815041 between two procedures both associated with balance transfer checks. In some implementations, the user interface 700 indicates the degree of similarity using a binary indicator, a categorical indicator, multiple indicators, a hierarchical indicator, and so forth.

Figure 7B:
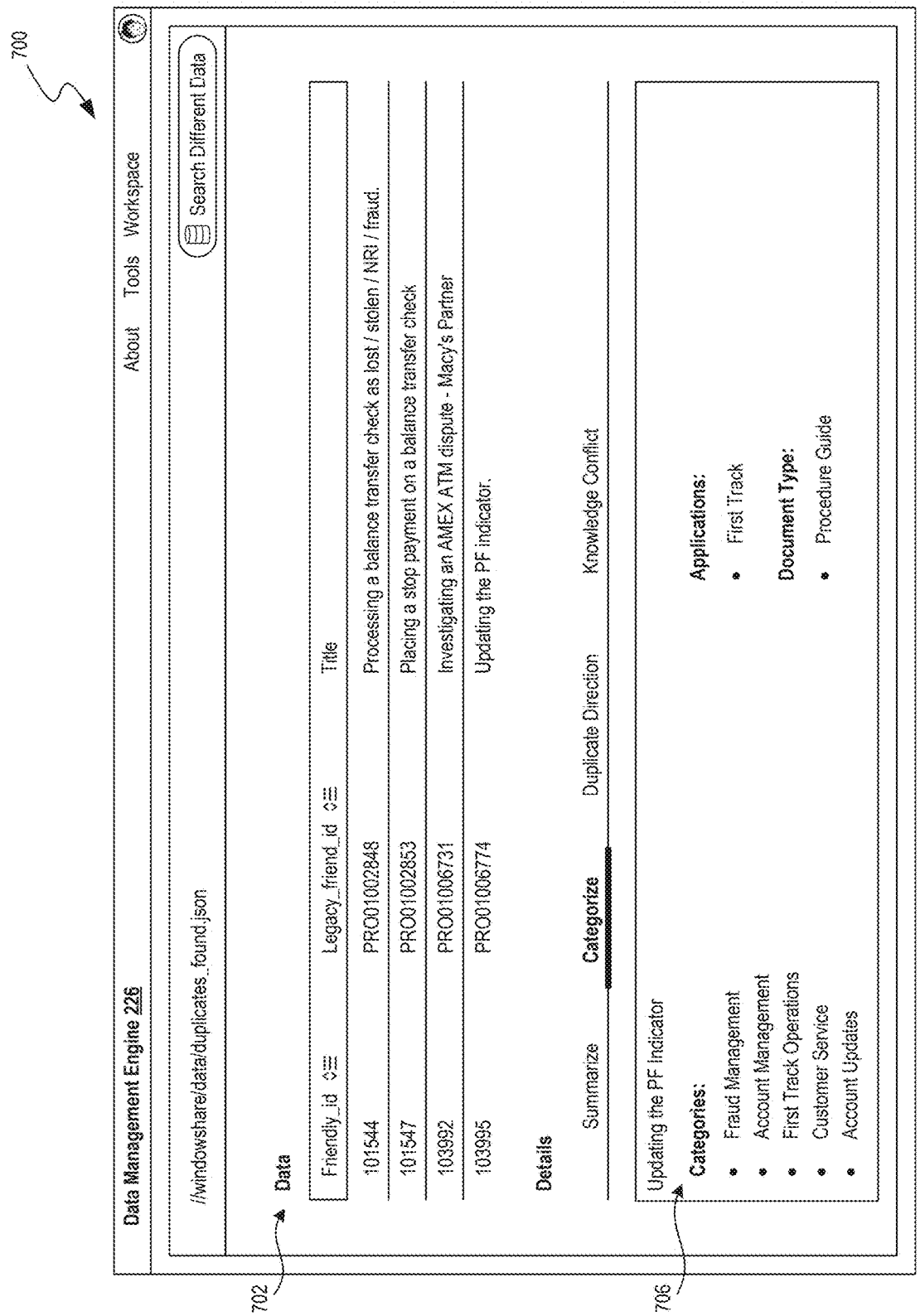
FIG. 7B illustrates a snapshot of the user interface of the data management engine of FIG. 2 for displaying identified categories of the unstructured data.

FIG. 7B illustrates a snapshot of the user interface 700 of the data management engine 226 for displaying identified categories 706 of the unstructured data. Categories 706 in the user interface 700 of the data management engine 226 represent the classified groups that organize and manage the unstructured data (e.g., generated by the categorization engine 610 of FIG. 6). For example, categories 706 in FIG. 7B include different operational areas such as Fraud Management, Account Management, First Track Operations, Customer Service, Account Updates, and so forth. Each category can be mapped to procedures and documents sharing common activities.

Figure 8:
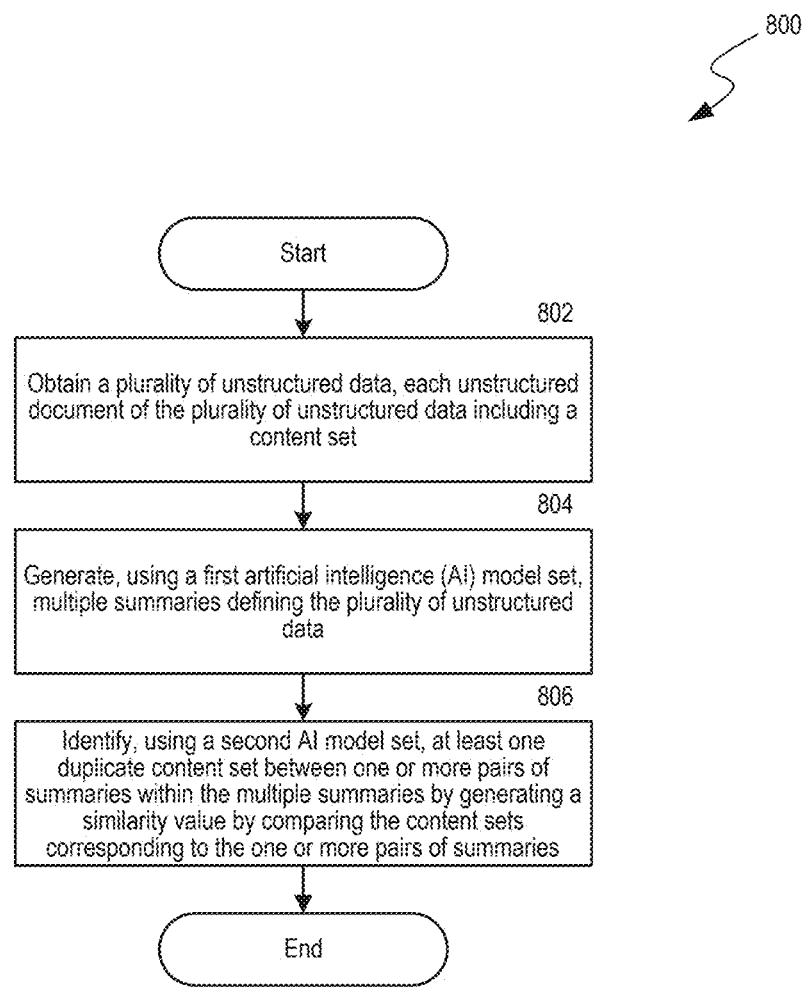
FIG. 8 is a flow diagram illustrating an example process of remediating anomalies using the data management engine of FIG. 2.

FIG. 8 is a flow diagram illustrating an example process 800 of remediating anomalies using the data management engine 226 of FIG. 2. In some implementations, the process 800 is performed by components of example devices 2300 illustrated and described in more detail with reference to FIG. 23. Particular entities, for example, the AI model(s), are illustrated and described in more detail with reference to AI system 2100 in FIG. 21. Implementations of process 800 can include different and/or additional operations or can perform the operations in different orders.

In operation 802, the data management engine 226 can obtain (e.g., receive via a user input to a user interface) a plurality of unstructured data (e.g., documents, images, video, audio, emails, chat logs, and so forth). For example, a user interface can enable users to upload various types of unstructured data. The unstructured data can be obtained using features such as drag-and-drop interfaces, file selection dialogs, and/or direct integrations with cloud storage services. One or more unstructured data of the plurality of unstructured data can include a content set. Each uploaded file can be parsed to extract the actual (e.g., existing) content within the document, which can be in various formats.

In operation 804, the data management engine 226 can generate, using a first AI model set, multiple summaries defining the plurality of unstructured data. For example, the data management engine 226 can categorize each unstructured document of the plurality of unstructured data into one or more clusters by comparing respective vector representations of content sets of pairs of unstructured data within the plurality of unstructured data. Each unstructured document can be converted into a vector representation that captures its semantic content. Techniques like Word2Vec, GloVe, or transformer-based models such as BERT can be used to produce these vector representations. A first distance set between vector representations corresponding to pairs of unstructured data categorized into a common cluster can be less than a second distance between vector representations corresponding to pairs of unstructured data categorized into different clusters (i.e., similar documents are grouped together).

For each particular cluster, the data management engine 226 can summarize the content set corresponding to respective unstructured data of the particular cluster. For example, within each cluster, the data management engine 226 generates summaries by identifying and selecting the most representative sentences or documents that capture the main ideas of that cluster's content. This selection is made by ranking sentences, portions of sentences, or documents based on their importance, such as the frequency of particular terms, the presence of phrases where the vector representation of the phrases is the closest in distance to the vector representation of the topic, and so forth. For example, the data management engine 226 can select and extract sentences directly from the original data or generate new sentences that encapsulate the highest-ranked terms of the original data.

In some implementations, the data management engine 226 detects knowledge conflicts. For example, the second AI model set can identify at least one content conflict between the one or more pairs of summaries within the multiple summaries by mapping a first summary of the multiple summaries to (1) a topic and (2) a first information set and mapping a second summary of the multiple summaries to (1) the topic and (2) a second information set. The data management engine 226 can determine an associated topic by using one or more NLP techniques to identify themes within the summary. The data management engine 226 can use, for example, the frequency and distribution of terms to detect particular keywords and phrases to highlight terms that characterize the document's content. The identified keywords and phrases are mapped to predefined or dynamically generated topics. The data management engine 226 can, for example, compare the terms in the summary to a database of topic models (which can be curated using domain-specific data). The data management engine 226 can assign the summary to the most relevant topic based on the highest similarity scores with these models.

The data management engine 226 can extract the information set by defining the entities and their relationships within the summary. The data management engine 226 can identify and categorize entities such as names, dates, organizations, and other elements within the summary. The extracted information sets and topics can be transformed into vector representations to numerically encode the semantic content of the summary. If the first and second information sets are different (e.g., by comparing vector representations corresponding to the first and second summaries and determining that a degree of similarity between the vector representations fails a predefined threshold), the data management engine 226 can identify the content as a knowledge conflict. For example, the data management engine 226 compares these vector representations of summaries that share the same topic. The cosine similarity measure can be used to quantify how similar or different these vectors are. If the similarity between the vectors falls below a predefined threshold (i.e., the information sets are determined to be dissimilar despite sharing a similar topic), the data management engine 226 flags the information sets as a knowledge conflict.

In some implementations, the data management engine 226 categorizes the unstructured data by generating an intermediate category set. For example, the data management engine 226 can categorize each summary in the set of summaries into one or more categories using a respective content set of the summary. To refine the intermediate categories further, the data management engine 226 can generate vector representations of each category. The data management engine 226 can calculate a degree of similarity between the vector representations of different categories and thus generate an overall category set by combining one or more categories in the intermediate category set using the degree of similarity between vector representations of the one or more categories. Categories with high similarity scores can be grouped together since this indicates a semantic similarity between the categories.

In operation 806, the data management engine 226 can identify, using a second AI model set (same as or different from the first set of AI models), at least one duplicate content set between one or more pairs of summaries within the multiple summaries. For example, the data management engine 226 can detect similar documents (or other modalities of data) using the summaries (e.g., vector similarity search). The data management engine 226 can perform a vector similarity search to detect similar documents by comparing vector representations of the one or more pairs of summaries by measuring the distance between their corresponding vector representations. Distance metrics such as cosine similarity, Euclidean distance, and the like can be used to quantify these distances. If the intermediate similarity value for a pair of summaries satisfies (e.g., meets or exceeds) a first predefined threshold, the data management engine 226 can detect similar documents using the full text (e.g., text similarity algorithms). For example, the data management engine 226 generates an overall similarity value by comparing the content sets corresponding to the pairs of summaries. The data management engine 226 can compare the full text of the documents corresponding to the pairs of summaries. Techniques such as TF-IDF or other NLP methods can be used to compare the content sets of the documents and generate the overall similarity value based on this detailed full-text comparison. Duplicative content can be identified by determining that the overall similarity value of the one or more pairs of summaries satisfies a second predefined threshold. If the overall similarity value meets or exceeds this threshold, the documents are flagged as duplicates.

In some implementations, the data management engine 226 generates, using a third AI model set (same as or different from the first and second sets of AI models), a reconfiguration command set configured to remove the at least one duplicate content set and/or content sets associated with knowledge conflicts from the content sets within the plurality of unstructured documents. For example, the data management engine 226 can identify one or more unstructured documents within the unstructured document set that corresponds to the at least one duplicate content and/or knowledge conflict and select a portion of the one or more unstructured documents by mapping the one or more unstructured documents to a predefined ranked rule set. The predefined ranked rule set can rank the one or more unstructured documents using a timestamp of a corresponding document, an author of a corresponding document, a version of a corresponding document, a status of a corresponding document, and so forth. For example, the data management engine 226 can select the most recent version of a document (determined by the timestamp), select documents authored by recognized experts, or select documents marked as the latest version.

In some implementations, the AI model assigns a priority score to each document. Subsequently, the data management engine 226 can generate a command set that defines the actions used to remove the duplicate content. The actions can include deleting the duplicate sections, merging information from multiple versions, or consolidating data into a single authoritative document. The data management engine 226 can, in some implementations, automatically execute the reconfiguration command set on the plurality of unstructured documents to modify the portion of the one or more unstructured documents to remove the at least one duplicate content from the content sets within the plurality of unstructured documents.

The reconfiguration commands can include computer-executable instructions to perform an automatic execution of one or more workflows for a first type of duplicate content and/or trigger a notification of one or more alerts for a second type of duplicate content. For instance, the data management engine 226 can identify the specific sections of documents that contain duplicate content, and the reconfiguration commands can instruct the data management engine 226 to either merge or delete these sections based on predefined rules. Additionally, the data management engine 226 can trigger alerts for duplicates that require user review. The modified data can be automatically displayed on a user interface.

In some implementations, the data management engine 226 generates and displays, on the user interface, a compliance report indicating (i) the identified at least one duplicate content and (ii) the reconfiguration command set. The compliance report can be generated automatically after the execution of the reconfiguration commands and provides a summary of the actions taken. The report can include, for example, information such as the document IDs, the sections affected, the nature of the duplicate content, the specific modifications made, and so forth.

Improving Data Quality Using the Data Management Engine

Figure 9:
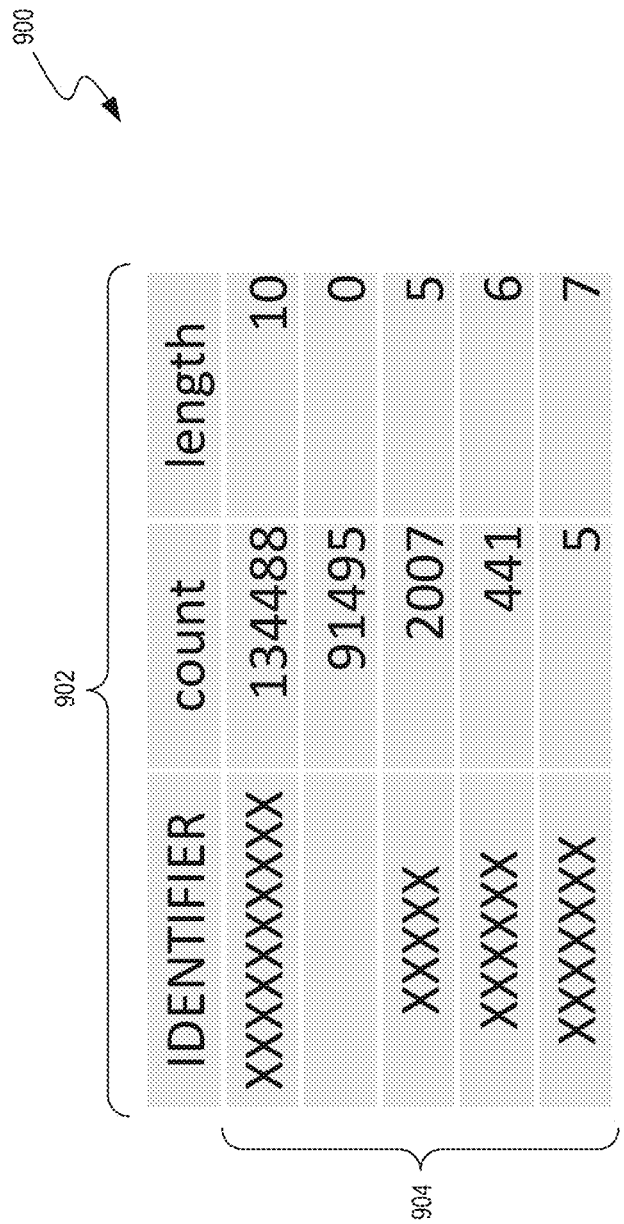
FIG. 9 illustrates an example environment of the data profiling engine of the data management engine of FIG. 2 for automatically detecting features of an ingested dataset.

FIG. 9 illustrates an example environment 900 of the data profiling engine 506 of the data management engine 226 of FIG. 2 for automatically detecting features of an ingested dataset. Environment 900 includes variables 902 and observations 904. Implementations of example environment 900 can include different and/or additional components or can be connected in different ways.

The data profiling engine 506 can identify variables 902, which represent the different attributes or fields within the dataset (e.g., dataset 502 in FIG. 5). For example, in FIG. 9, the attributes can include "Identifier," "count," and "length." The variables 902 can include numerical data, categorical data, dates, and other types of data points that define the structure of the dataset. For example, in a customer database, variables 902 can include customer ID, name, birth date, transaction amount, and product category. In some implementations, variables 902 can include derived attributes, such as calculated fields or aggregated metrics.

Further, the data profiling engine 506 can identify observations 904, which refer to the individual records or entries within the dataset that contain values for each of the variables 902. Each observation 904 represents a single instance of data, such as a row in a database table. Observations 904 can be a single value or multiple values. For example, in a sales dataset, an observation 904 can represent a single transaction, including details such as the transaction ID, date, customer ID, and amount. In some implementations, observations 904 can include time-series data, where each observation represents a data point in a sequence over time.

Figure 10:
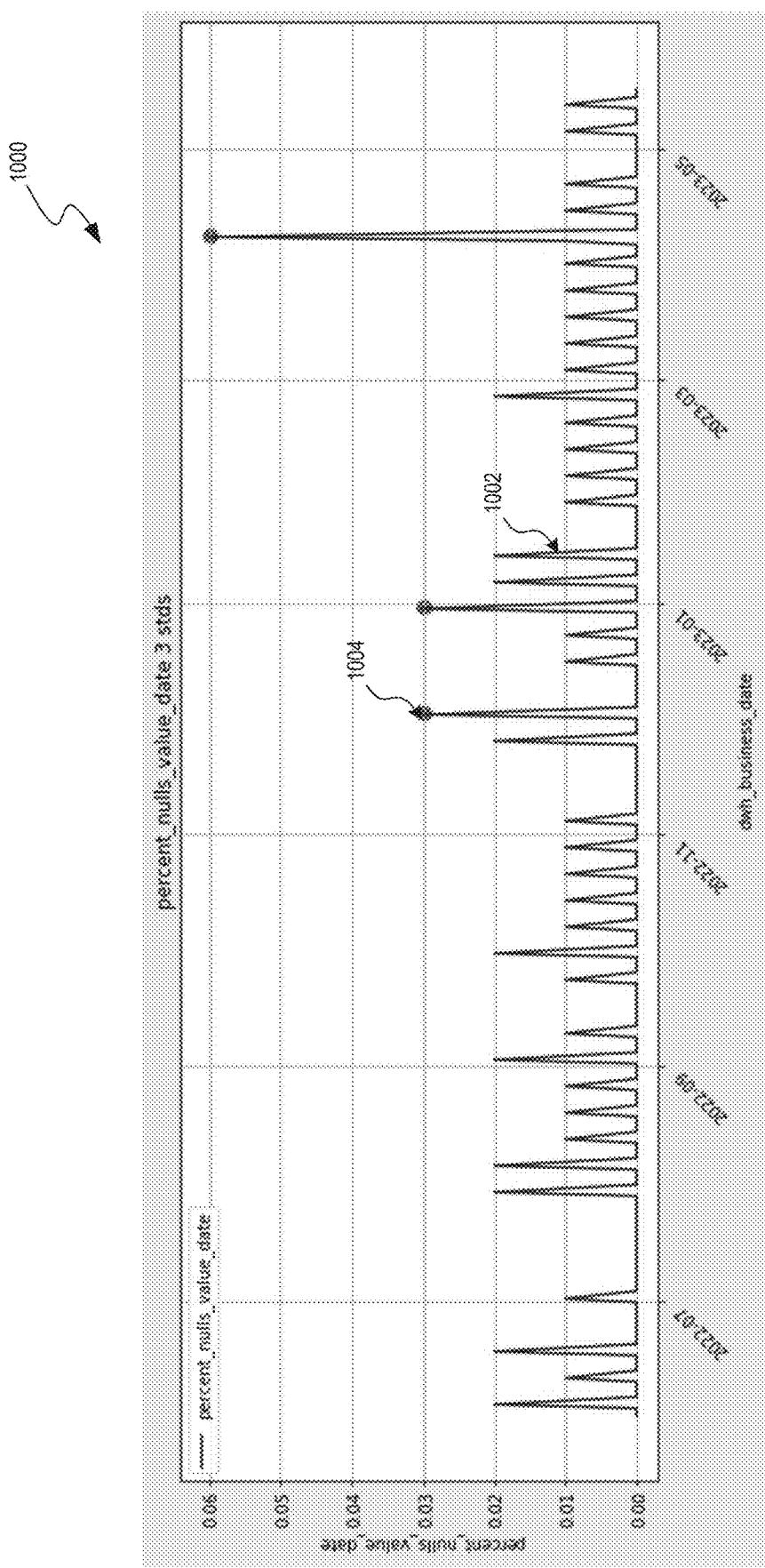
FIG. 10 illustrates an example chart of a threshold modeling engine of the data management engine of FIG. 2 for dynamically detecting univariate anomalies of the dataset.

FIG. 10 illustrates an example chart 1000 of a threshold modeling engine 508 of the data management engine 226 of FIG. 2 for dynamically detecting univariate anomalies of the dataset. Chart 1000 includes observations 1002 and anomalies 1004. Implementations of example chart 1000 can include different and/or additional components or can be connected in different ways.

The observations 1002 can be the same as or similar to observations 904. The observations 1002 can refer to the individual data points or records within the dataset that are analyzed to detect anomalies. Each observation contains values for one or more variables, representing a single instance of data. The anomalies 1004 are a subset of the observations 1002 that deviate significantly from the expected patterns or thresholds established by the threshold modeling engine 508. The deviations can indicate potential errors or other unusual activities. The threshold modeling engine 508 can operate within chart 1000 to dynamically detect univariate anomalies by identifying the distribution and variability of observations 1002. The threshold modeling engine 508 can establish dynamic thresholds that adapt to changes in the data over time. For instance, the threshold modeling engine 508 can adjust the threshold for acceptable observation values based on historical data, accounting for seasonal variations. In some implementations, the threshold modeling engine 508 can use autoregressive integrated moving average (ARIMA) models to forecast future values and detect anomalies based on predicted trends.

Figure 11:
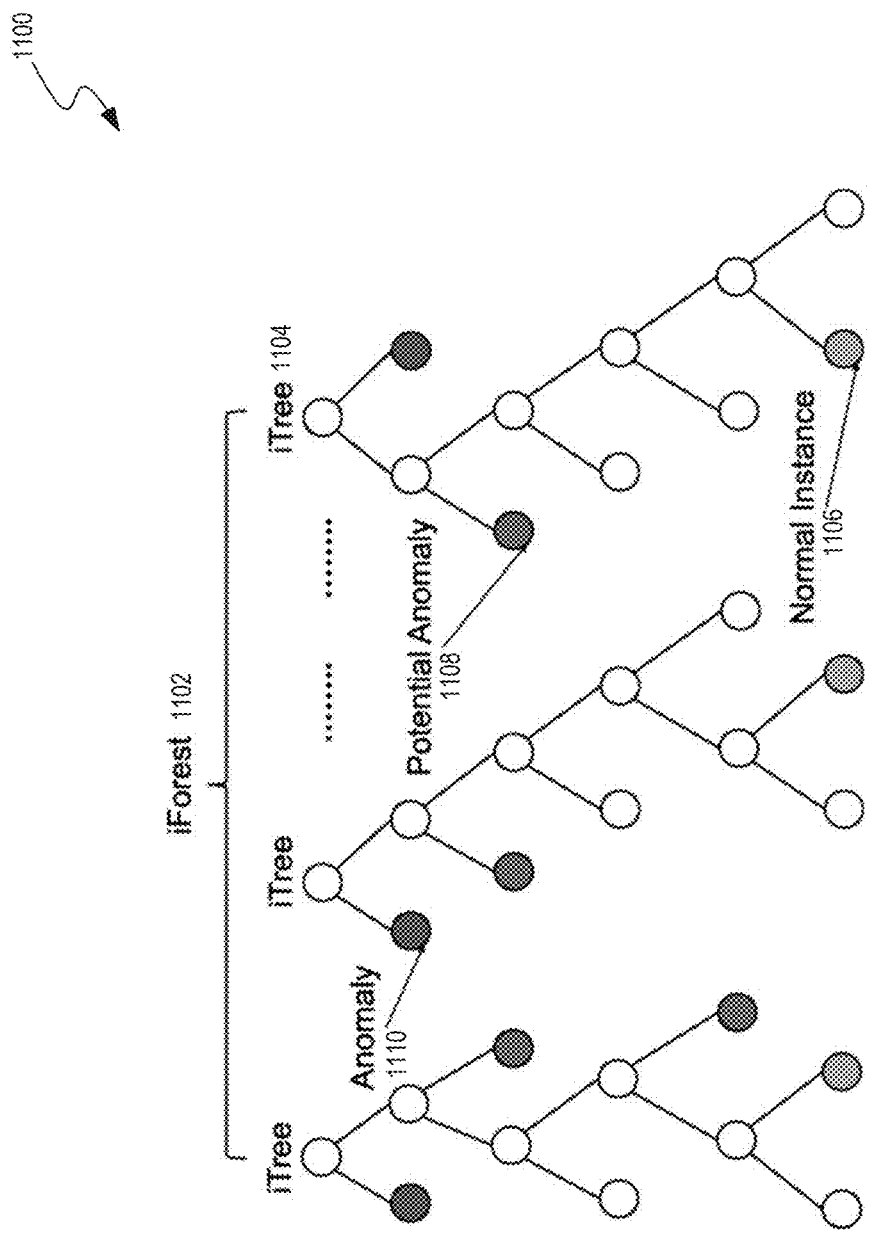
FIG. 11 illustrates an example environment of an anomaly detection engine of the data management engine of FIG. 2 for dynamically detecting multivariate anomalies of the dataset.

FIG. 11 illustrates an example environment 1100 of an anomaly detection engine 510 of the data management engine 226 of FIG. 2 for dynamically detecting multivariate anomalies of the dataset. Environment 1100 includes anomaly detection model 1102, binary tree 1104, non-flagged observation 1106, flagged observation 1108, and anomaly 1110. Implementations of example environment 1100 can include different and/or additional components or can be connected in different ways.

The anomaly detection model 1102, such as an isolation forest, can be used to identify anomalies within a dataset by isolating observations that deviate significantly from the norm. The anomaly detection model 1102 can, for example, construct multiple binary trees (isolation trees) to partition the data. Observations that require fewer splits to isolate can be considered anomalies. In some implementations, anomaly detection model 1102 can use other techniques such as clustering-based methods (e.g., DBSCAN), statistical methods (e.g., Z-score), or neural networks (e.g., autoencoders) to detect anomalies. The binary tree 1104 within the anomaly detection model 1102 is a data structure that can be used by the anomaly detection model 1102 to recursively partition the dataset into smaller subsets. Each node in the binary tree can represent a decision based on a feature value, and the branches can represent the possible outcomes of the decision. The partitioning continues until each observation is isolated in a leaf node. In some implementations, binary tree 1104 can be replaced with other non-tree or tree-based structures, such as decision trees or random forests, which can also be used for anomaly detection by evaluating the depth of the nodes where observations are isolated.

The non-flagged observation 1106 refers to data points within the dataset that are not identified as anomalies by the anomaly detection model 1102. These observations fall within the expected range of values and patterns established by the model. The flagged observation 1108 refers to data points that are identified as potential anomalies by the anomaly detection model 1102. The flagged observation 1108 exhibits unusual patterns or values that deviate from the norm and are flagged for further investigation. The degree of deviation can be customizable by a user. In some implementations, flagged observation 1108 can be prioritized based on the severity of the deviation or other user-provided context (e.g., type of deviation, extent of deviation). The anomaly 1110 can refer to a specific type of flagged observation 1108 that has been confirmed as an anomaly. Anomalies 1110 represent significant deviations (e.g., above a certain threshold) from the expected patterns and can indicate errors or other unusual activities.

FIG. 12 illustrates an example environment 1200 of a root cause evaluation engine 512 of the data management engine 226 of FIG. 2 for identifying root causes of the anomalies of the dataset. Environment 1200 includes antecedent 1202 and consequent 1204. Implementations of example environment 1200 can include different and/or additional components or can be connected in different ways.

The antecedent 1202 refers to the condition or set of conditions that precede and potentially cause an observed anomaly in the dataset. For an association rule, the antecedent is the "if" portion of the rule, representing the combination of factors that lead to a particular outcome. On the other hand, the consequent 1204 is the outcome or result that follows from the antecedent 1202 in an association rule. The consequent 1204 represents the "then" portion of the rule, indicating the effect or anomaly that occurs when the antecedent conditions are met. The root cause evaluation engine 512 operates within environment 1200 to identify the antecedent 1202 and consequent 1204 relationships that explain the root causes of anomalies in the dataset. The root cause evaluation engine 512 can use association rule mining to discover patterns and correlations between different variables. Further methods of determining the root cause are discussed with reference to FIG. 10.

Figure 13:
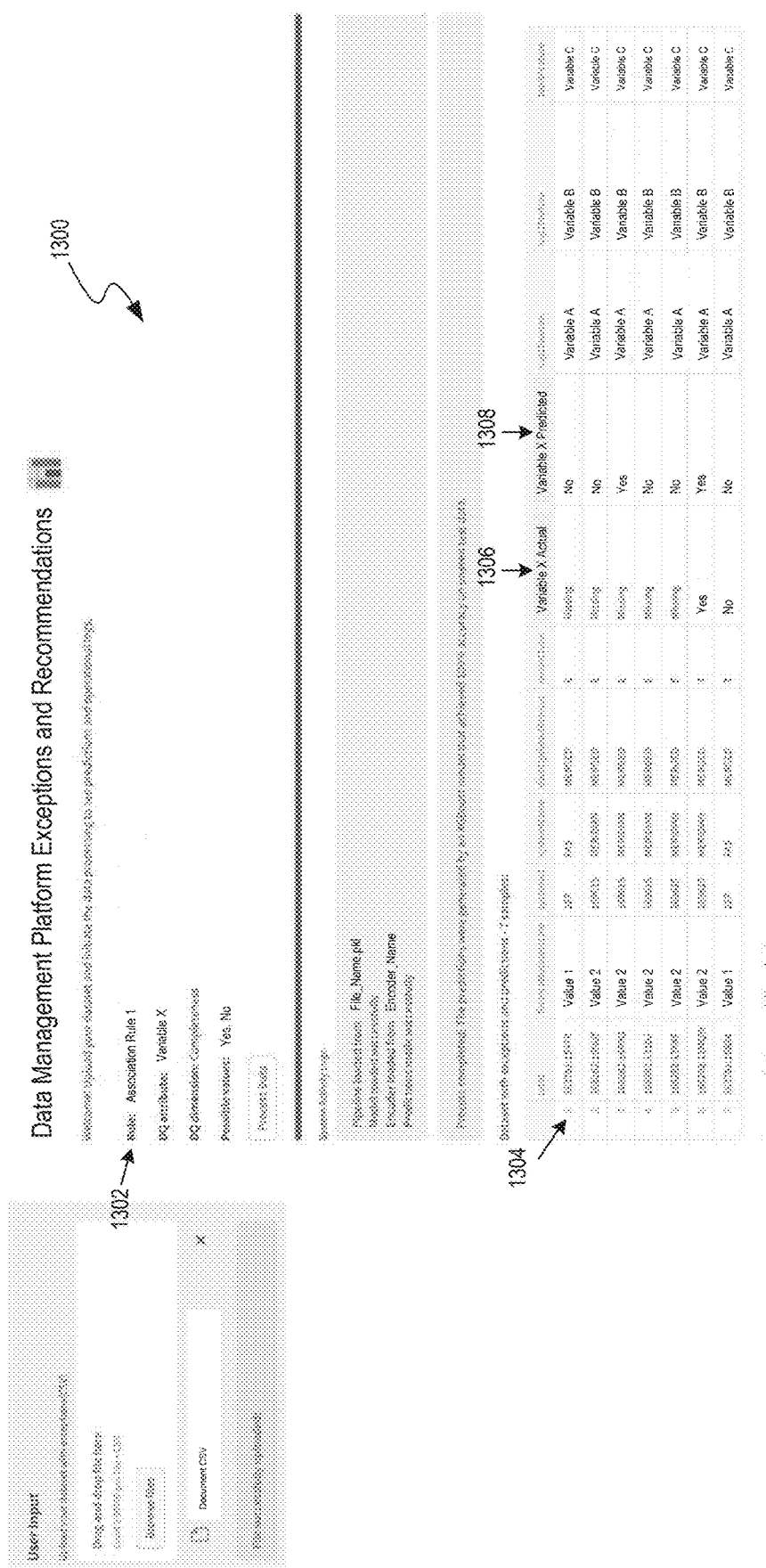
FIG. 13 illustrates an example environment of a remediation engine of the data management engine of FIG. 2 for remediating the anomalies of the dataset.

FIG. 13 illustrates an example environment 1300 of a remediation engine 516 of the data management engine 226 of FIG. 2 for remediating the anomalies of the dataset. Environment 1300 includes association rule 1302, observation 1304, observed variable values 1306, and recommended variable values 1308. Implementations of example environment 1300 can include different and/or additional components or can be connected in different ways.

The association rule 1302 refers to a rule derived from data mining techniques that identifies relationships between variables in the dataset. The association rule 1302 can include an antecedent (if portion) and a consequent (then portion), indicating that when certain conditions are met, a specific outcome is likely to occur. The observation 1304 can be the same as or similar to observations 904 and/or observation 1002. The observed variable values 1306 refer to the values of the variables in an observation 1304. The values are used to evaluate the observation against the association rules 1302 to determine if any anomalies are present (e.g., missing values). The recommended variable values 1308 are the suggested values for the variables in an observation 1304 that would align the observation with the expected patterns or rules. The recommendations can be generated by the remediation engine 516 based on the association rules 1302 and the identified anomalies. The remediation engine 516 compares the association rules 1302 against expected association rules and generates recommended variable values 1308 to address identified anomalies. For example, if a particular association rule indicates a particular bias not within the operative boundaries of the dataset's use case (e.g., a social bias in a financial risk assessment use case), the remediation engine 516 can identify the particular association rule as an anomaly.

Figure 14:
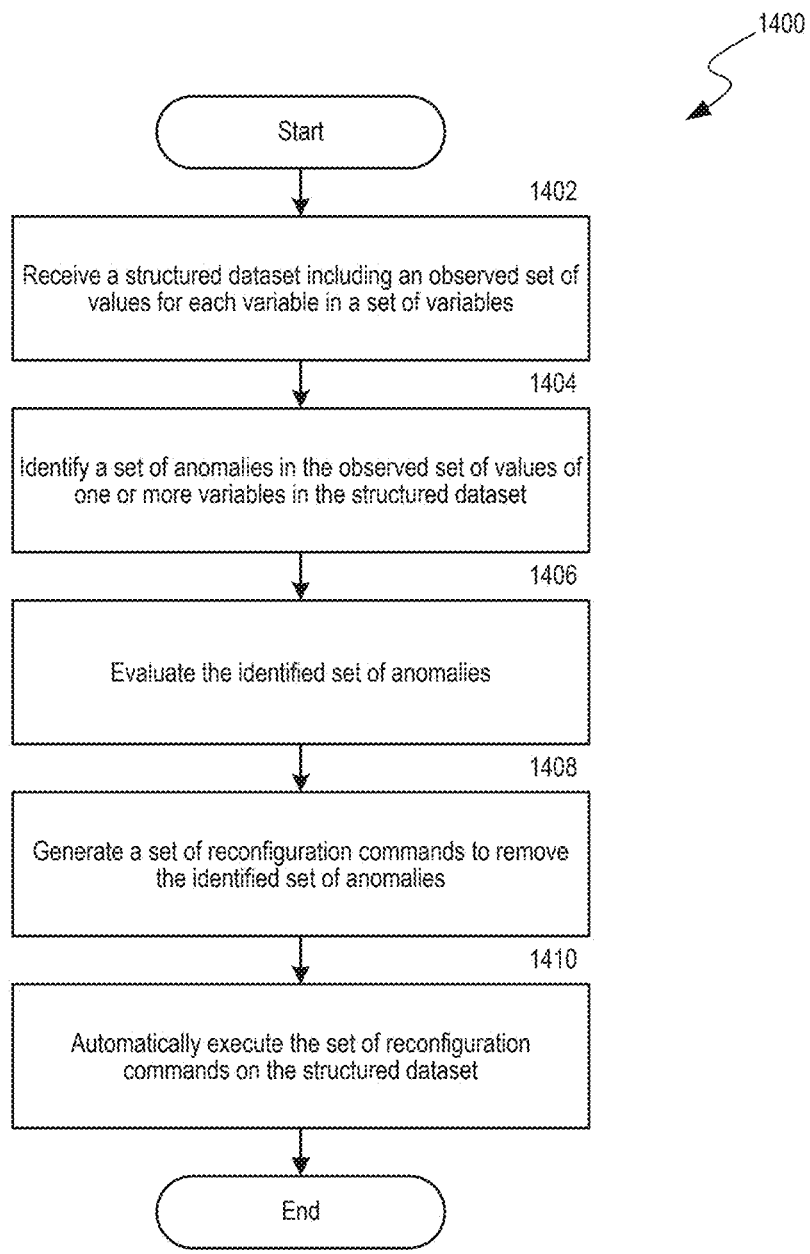
FIG. 14 is a flow diagram illustrating an example process of remediating anomalies using the data management engine of FIG. 2.

FIG. 14 is a flow diagram illustrating an example process 1400 of remediating anomalies using the data management engine 226 of FIG. 2. In some implementations, the process 1400 is performed by components of example devices 2300 illustrated and described in more detail with reference to FIG. 23. Particular entities, for example, the AI model(s), are illustrated and described in more detail with reference to AI system 2100 in FIG. 21. Implementations of process 1400 can include different and/or additional operations or can perform the operations in different orders.

In operation 1402, the data management engine 226 can receive a dataset (structured or non-structured) including an observed set of values for one or more variables in a set of variables. In some implementations, the data management engine 226 can receive the dataset through various data ingestion methods, such as integrating with one or more application programming interface(s) (API(s)). The dataset can be sourced from multiple origins, including databases, data lakes, cloud storage, or external APIs. For structured data, the dataset can be in formats such as CSV, JSON, XML, or SQL tables, while unstructured data can include text files, images, audio recordings, or video files.

In operation 1404, the data management engine 226 can identify, using a first set of AI models, a set of anomalies in the observed set of values of one or more variables in the structured dataset. The data management engine 226 can determine multiple reference patterns that correspond to an expected set of values for the set of variables and/or compare an observed set of patterns in the observed set of values against the multiple reference patterns.

In some implementations, the models can include supervised learning models, such as decision trees, support vector machines, and neural networks, which are trained on labeled datasets to recognize normal and anomalous patterns. The models can additionally or alternatively include unsupervised learning models, such as clustering algorithms (e.g., K-means, DBSCAN) to group similar observations together based on their features and anomaly detection models (e.g., isolation forests, one-class SVMs), which do not require labeled data and can detect anomalies based on deviations from the learned patterns of the dataset. For example, an isolation forest model (e.g., anomaly detection model 1102 in FIG. 11) can construct multiple binary trees to partition the data and isolate observations that deviate beyond a certain threshold from the norm. Observations that require fewer splits to isolate can be considered anomalies. In some implementations, the engine can use ensemble methods, combining the outputs of multiple models. For example, the engine can use a combination of statistical tests, machine learning models, and clustering algorithms and aggregate the results of the multiple models by using a weighted score or using a majority vote.

The data management engine 226 can determine multiple reference patterns that correspond to an expected set of values for the set of variables. The reference patterns can be derived from historical data, statistical analysis, and/or domain-specific knowledge. For example, the data management engine 226 can use time-series analysis to identify seasonal trends and patterns in the data, or the data management engine 226 can calculate expected ranges and distributions for the variables (e.g., using chi-square goodness of fit tests). In some implementations, the engine can use dynamic threshold models to adaptively set thresholds based on historical behavior. For example, the data management engine 226 can evaluate past data to determine the typical range of values for a variable during different times of the year and set dynamic thresholds that account for seasonal variations. Thus, the data management engine 226 can detect anomalies that deviate from the expected reference patterns while accounting for natural fluctuations in the data.

The data management engine 226 can compare the observed set of patterns in the observed set of values against the multiple reference patterns to identify anomalies. For example, the data management engine 226 can calculate the Z-score (e.g., how many standard deviations an element is from the mean of the dataset) for each observed value to determine whether the value significantly deviates from the mean. Values with a Z-score above a certain threshold (e.g., ±3) can be considered anomalies, indicating that they are rare and unusual compared to the rest of the data. In another example, the data management engine 226 can calculate the Mahalanobis distance, which measures the distance between a point and a distribution, to identify multivariate anomalies (i.e., data points that are beyond a certain threshold from the center of the distribution).

In operation 1406, using a second set of AI models, the data management engine 226 can evaluate the identified set of anomalies by dynamically generating an observed set of association rules configured to cause the second set of AI models to generate the observed set of values in the structured dataset and/or compare the observed set of association rules with an expected set of association rules to determine one or more observed association rules corresponding to the set of anomalies. The generated association rules can describe the relationships between different variables in the dataset. For example, an association rule can state that if variable A has a certain value, then variable B is likely to have a specific value. The data management engine 226 can identify frequent itemsets, which are combinations of variable values that occur frequently within the dataset, by counting the occurrences of different itemsets and determining which itemsets meet a predefined support threshold, indicating that they are frequent.

From these frequent itemsets, the data management engine 226 can generate association rules that describe the relationships between different variables. Each rule can have the form "If antecedent, then consequent," where the antecedent and consequent are subsets of the itemset. The data management engine 226 can calculate metrics such as confidence, which measures the proportion of records containing the antecedent that also contain the consequent, and/or lift, which quantifies how much more likely the consequent (the outcome) is to occur when the antecedent (the condition) is present compared to when the antecedent is not present (i.e., the degree to which the occurrence of the antecedent increases the likelihood of the consequent occurring).

The expected set of association rules can be derived from historical data, domain knowledge, or predefined guidelines. By comparing the observed rules with the expected rules, the engine can identify which rules deviate from the norm and are associated with the anomalies. For example, if an observed association rule is not found in the expected association rules, the observed association rule can be flagged as a potential anomaly. Additionally, or alternatively, if an observed association rule shows a significantly higher lift value than a corresponding expected association rule, it may indicate a stronger-than-expected association between the variables, potentially signaling an anomaly. Conversely, if an observed association rule has a much lower support or confidence value than the expected association rule, it may indicate that the expected pattern is not occurring as frequently as anticipated, which could also be a sign of an anomaly.

In operation 1408, using a third set of AI models, the data management engine 226 can generate a set of reconfiguration commands to remove the identified set of anomalies. For example, the data management engine 226 can identify a portion of the observed sets of values corresponding to the one or more observed association rules corresponding to the set of anomalies and map the portion of the observed sets of values to one or more expected association rules configured to adjust the portion of the observed set of values to a corresponding expected set of values. For example, if an observed association rule indicates that a certain combination of variable values is anomalous, the data management engine 226 can refer to the corresponding expected association rule to identify the expected values. The data management engine 226 can generate reconfiguration commands that specify the adjustments to transform the observed values to the expected values. In some implementations, the data management engine 226 can select the third set of AI models from multiple AI models using a respective set of performance metric values (e.g., accuracy, precision, recall, F1 score, mean squared error, and so forth) of each of the multiple AI models.

In operation 1410, the data management engine 226 can automatically execute the set of reconfiguration commands on the structured dataset to modify the one or more observed association rules corresponding to the set of anomalies to align with the one or more expected association rules. The data management engine 226 can use SQL queries to select the observations specified in the reconfiguration commands. The data management engine 226 can update the values of specific variables, recalculate derived fields, adjust the relationships between variables, and so forth. For example, if an observed association rule indicates that a certain combination of variable values is anomalous, the engine updates the values of the affected variables to match the expected combination specified by the corresponding expected association rule.

In some implementations, the data management engine 226 can receive an unstructured dataset from one or more of text documents, emails, chat logs, images, or voice recordings. Using a fourth set of AI models, the data management engine 226 can evaluate the unstructured dataset against a set of predefined criteria. For example, the data management engine 226 can extract a set of information from the unstructured dataset, which can include a set of entities. The data management engine 226 can evaluate the set of information against a set of threshold values of the set of predefined criteria by measuring, for example, a degree of completeness of the extracted information, a degree of accuracy of the extracted information, a degree of satisfaction of the extracted information with specific formats of the set of predefined criteria, and so forth.

Using the evaluation, the fourth set of AI models can identify a portion of the extracted information failing to satisfy the set of threshold values. The data management engine 226 can generate a set of actions (e.g., reconfiguration commands) to increase the degree of satisfaction of the extracted information against a set of predefined criteria. The reconfiguration commands can include, for example, instructions to automatically execute a set of workflows for a first type of anomaly, triggering one or more alerts for a second type of anomaly, and so forth.

The data management engine 226 can display an artifact such as a compliance report indicating one or more of (i) the identified set of anomalies, (ii) the set of actions, (iii) a degree of satisfaction of the unstructured dataset with the set of predefined criteria, and so forth. The reports can be presented in various formats, such as dashboards, charts, tables, chatbots, and so forth.

Example Out-Of-Distribution Prediction Engine of the Data Management Engine

Figure 15:
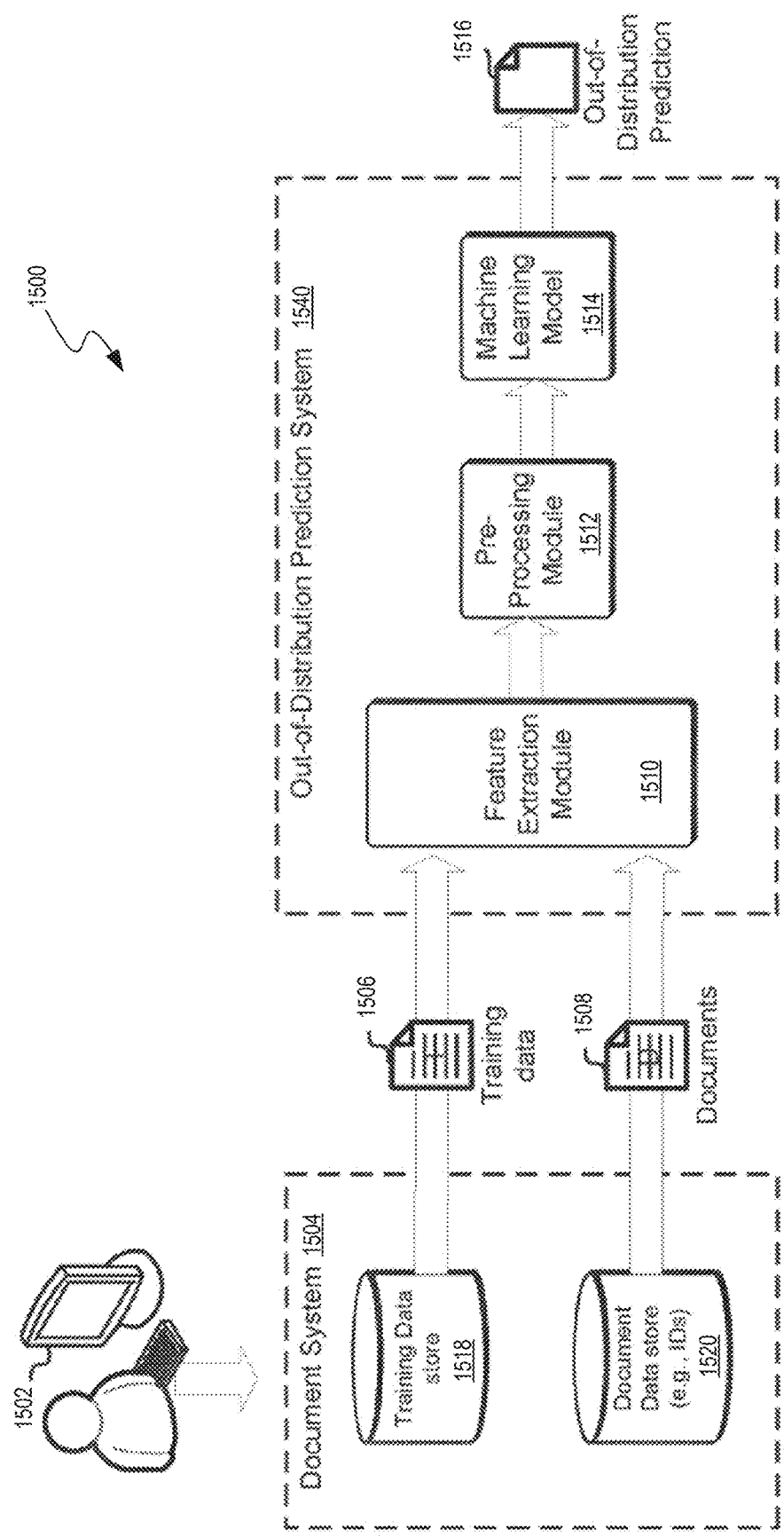
FIG. 15 illustrates an aspect of an environment for an out-of-distribution prediction engine of the data management engine in which an implementation may be practiced.

FIG. 15 illustrates an aspect of an environment 1500 for an out-of-distribution prediction engine 1540 of the data management engine 226 (e.g., within the service authorization system 200) in which an implementation may be practiced. In some implementations, users 1502 of this environment 1500 include but are not limited to client users of the out-of-distribution prediction engine 1540. In at least one implementation, as illustrated in FIG. 15, the environment 1500 includes an out-of-distribution prediction engine 1540, as described herein, that receives a training document of training data 1506 that may be used to train a machine learning model 1514. In at least one implementation, a feature extraction module 1510 identifies and extracts relevant features of the training data 1506 or input data, such as documents 1508, to be further processed (e.g., encoding, embedding, and/or masking) by a pre-processing module 1512 and then provided to the machine learning model 1514. In at least one implementation, the out-of-distribution prediction engine 1540 receives documents 1508 as input data to the machine learning model 1514 and generates, as an output of the machine learning model 1514, an out-of-distribution prediction 1516. The terms "documents" and "document" may be used interchangeably in the present disclosure, where the scope of the implementation can include "one or more documents."

In at least one implementation, the user 1502 of this environment 1500 includes but is not limited to client users of the out-of-distribution prediction engine 1540. In at least one implementation, the user 1502 may be an individual, a computing system, an executing software application, a computing service, a computing resource, or other entity capable of controlling input to and receiving output from the out-of-distribution prediction engine 1540. The user 1502 may have access to a set of user records and/or a profile with the out-of-distribution prediction engine 1540 and may have a set of credentials (e.g., username, password, etc.) registered with the out-of-distribution prediction engine 1540. In at least one implementation, user 1502 presents, or otherwise proves, the possession of security credentials, such as by inputting a password, access key, and/or digital signature, to gain access to out-of-distribution prediction. In at least one implementation, the user 1502 creates, using a user device or other computing device, an account with the out-of-distribution prediction engine 1540. In at least one implementation, user 1502 uploads documents 1508 to the out-of-distribution prediction engine 1540, causing the machine learning model 1514 to generate a prediction 1516 of whether the documents 1508 are in-distribution or out-of-distribution. For example, the machine learning model expects a specific type of data when it is being trained to perform operations. In at least one implementation, if a user 1502 uploads a document that is an "unexpected" document (e.g., a driver's license when the model is being trained to distinguish passports from national identity documents (IDs)), the machine learning model 1514 may generate an out-of-distribution prediction 1516 that the unexpected document is an outlier or an unknown document to in-distribution documents.

In at least one implementation, the document system 1504 includes a training data store 1518 and document data store 1520. In at least one implementation, the document system 1504 is a repository providing non-transitory and persistent (non-volatile) storage for data objects. Examples of data stores include file systems, relational databases, non-relational databases, object-oriented databases, comma-delimited files, and other files. In some implementations, the document system 1504 is a distributed data store. In at least one implementation, the training data store 1518 may store training data 1506 and information related to in-distribution data and out-of-distribution data. In at least one implementation, the document data store 1520 may store documents 1508 and information related to user documents (e.g., IDs, passports, or driver's licenses).

In at least one implementation, training data 1506 may be maintained in the training data store 1518 and located, processed, and provided for use in processing by the out-of-distribution prediction engine 1540 for training the machine learning model 1514. For example, training data 1506 may include, but is not limited to, document bundles, national identification, driver's license, or passports. In at least one implementation, each page of training data 1506 may be independently processed separately from other pages. In at least one implementation, each page of training data 1506 may be processed as a whole with all pages included.

In at least one implementation, documents 1508 may be maintained in the document data store 1520 and located, processed, and provided for use in processing by the out-of-distribution prediction engine 1540, as input, to the machine learning model 1514 to perform inferencing operations. For example, documents 1508 may include, but are not limited to, document bundles, national identification, driver's license, or passports. In at least one implementation, each page of a document, such as document 1508, may be independently processed separately from other pages. In at least one implementation, each document, such as document 1508, may be processed as a whole with all pages included.

In at least one implementation, a feature extraction module 1510 may include an encoder that encodes input data to a machine learning model 1514, such as training data 1506 or documents 1508, into one or more feature vectors. In at least one implementation, an encoder of the feature extraction module 1510 encodes training data 1506 and/or document 1508 into a sentence embedding vector. In at least one implementation, a processor uses this sentencing embedding vector to perform a nearest neighbor search to generate one or more neighbors. In at least one implementation, one or more neighbors is a value corresponding to a key comprising training data 1506 or documents 1508. In at least one implementation, one or more neighbors comprise plaintext data. In at least one implementation, an encoder of the feature extraction module 1510 encodes one or more neighbors into a text embedding vector. In at least one implementation, an encoder of the feature extraction module 1510 encodes one or more neighbors into a sentence embedding vector. In at least one implementation, machine learning model 1514 uses training data 1506 and/or documents 1508 to generate a prediction, such as out-of-distribution prediction 1516. In at least one implementation, a processor of a client device interfaces with an application of the out-of-distribution prediction engine 1540 using a machine learning (ML) model application programming interface(s) (API(s)). In at least one implementation, the processor accesses the machine learning model 1514 using the machine learning model application programming interface(s) (API(s)).

In at least one implementation, the pre-processing module 1512 may be a computing system, software, software program, hardware device, module, or component capable of performing the masking of training data 1506 and/or input data, such as documents 1508, to generate masked training data and/or masked input data, respectively. In at least one implementation, further in the implementation, the masked training data is provided to the machine learning model 1514 to perform training operations of the machine learning model 1514, and the masked input data is provided to the machine learning model 1514 to perform inferencing operations associated with classifications and predictions of whether documents 1508 are out-of-distribution prediction 1516.

In at least one implementation, parts, methods, and/or systems described in connection with FIG. 15 are as further illustrated nonexclusively in any of FIGS. 15-23.

Figure 16:
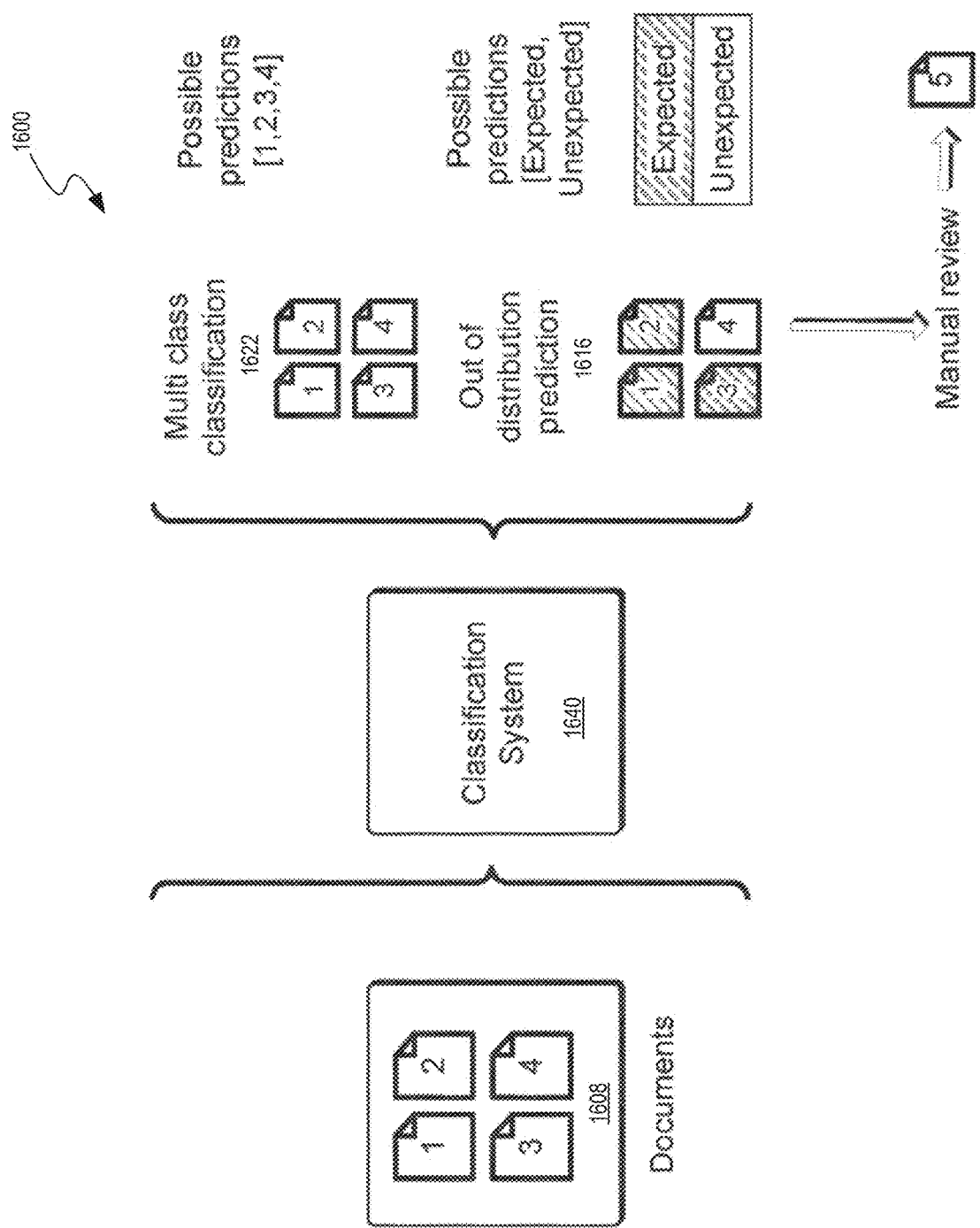
FIG. 16 illustrates an example of a classification system of an out-of-distribution prediction engine of the data management engine of FIG. 2.

FIG. 16 illustrates an example of a classification system of an out-of-distribution prediction engine of the data management engine of FIG. 2, in accordance with an implementation. As illustrated in FIG. 16, the example 1600 includes a classification system 1640, such as the out-of-distribution prediction engine 1540, that receives documents 1608 (including documents #1-4) and makes a prediction, such as an out-of-distribution prediction 1616, with a machine learning model, such as machine learning model 1514 in FIG. 15. In at least one implementation, if the out-of-distribution prediction 1616 of a document is an unexpected prediction, for example, document #4 of the documents 1608 is unknown in the in-distribution documents, this document may be sent for manual review.

In at least one implementation, the classification system 1640 generates a classification of a document. For example, the classification system may be used to distinguish between national identifications (IDs) and a passport. In at least one implementation, if the classification system 1640 receives documents 1608, from a user of the system, such as user 1502 in FIG. 15, the classification system 1640 may classify the documents as a passport or an ID and obtain an associated confidence score with that decision. In at least one implementation, a processor of the classification system 1640 performs operations to compare the confidence score to a threshold value. In at least one implementation, the threshold value is determined by using training data, such as training data 1506 in FIG. 15.

In at least one implementation, the classification system 1640 generates a prediction of the classification of the documents 1608. In at least one implementation, the classification system 1640 is an automated classification library that enables multi-class classification 1622. In at least one implementation, the automated classification library is data agnostic. In at least one implementation, the classification system 1640 classifies documents 1608 by simultaneously performing image patch and text token masking during the training of a machine learning model, such as machine learning model 1514 in FIG. 15. In at least one implementation, as a result of simultaneous image patch and text token masking during training, the machine learning model may learn the majority of important features for each class. In at least one implementation, the prediction may be expected or unexpected. In at least one implementation, if the prediction is expected, the document is consistent with the in-domain data. In at least one implementation, if the prediction is unexpected, the document is consistent with the out-of-domain data and may be sent out for manual review. In at least one implementation, the classification system 1640 may cause a user of the system, such as user 1502 in FIG. 15, to perform a manual review of the unexpected document or outlier.

In at least one implementation, parts, methods, and/or systems described in connection with FIG. 16 are as further illustrated nonexclusively in any of FIGS. 15-23.

Figure 17:
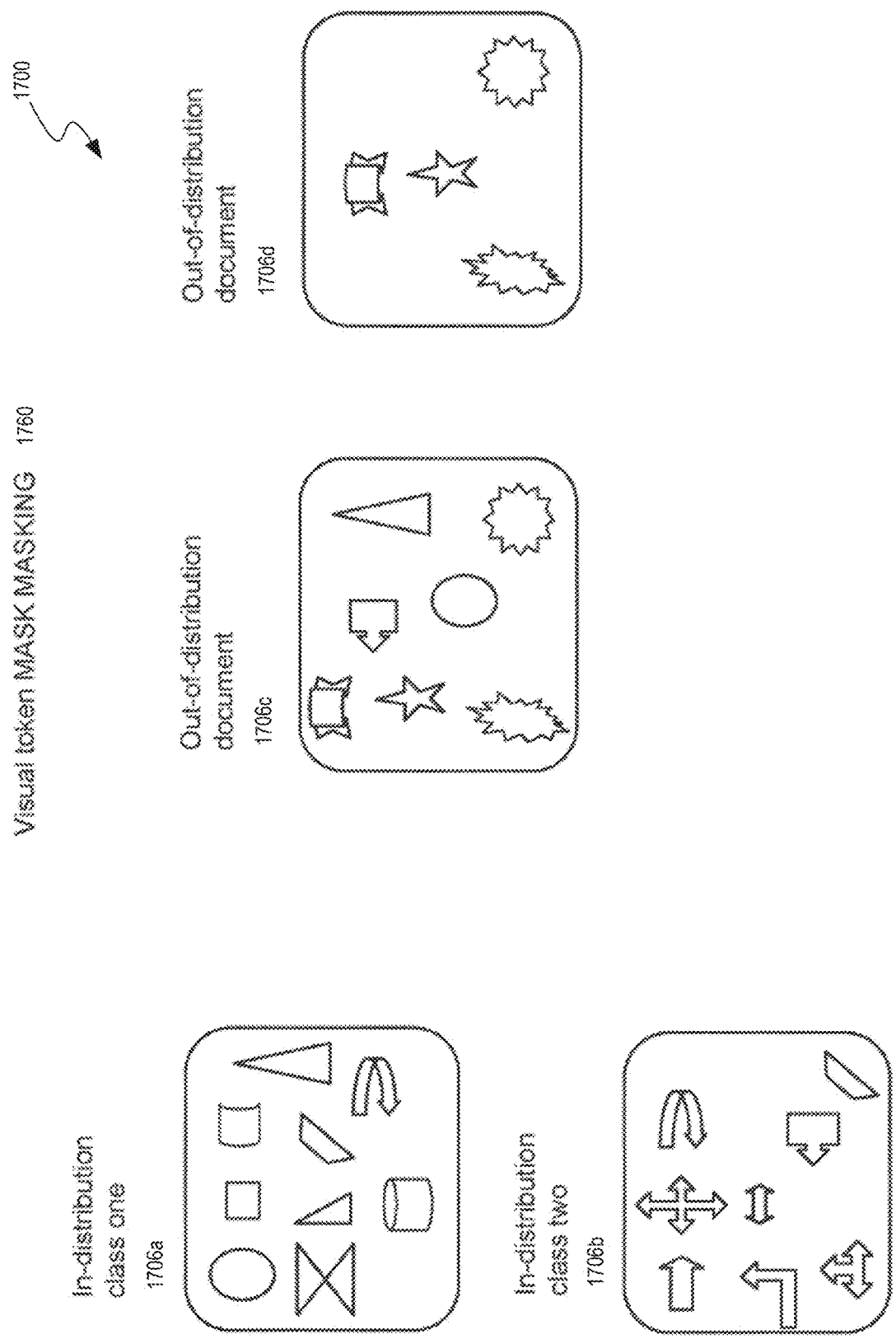
FIG. 17 illustrates an example of visual token mask masking, in accordance with an implementation.

FIG. 17 illustrates an example 1700 of visual token mask masking 1760, in accordance with an implementation. In at least one implementation, this visual token masking includes in-distribution class one 1706A, in-distribution class two 1706B, out-of-distribution document 1706C, and out of distribution document 1706D that are used to train a machine learning model to distinguish between an in-domain document and out-of-distribution document (or outlier document). Each of the in-distribution class one 1706A, the in-distribution class two 1706B, the out-of-distribution document 1706C, and the out-of-distribution document 1706D include various shapes (e.g., an oval, a square, and a triangle) that represent features (e.g., tokens) of documents, such as training data 1506 and/or documents 1508 in FIG. 15, that are to be translated into dense vector embeddings for training the machine learning model.

In at least one implementation, an out-of-distribution prediction engine may translate each of the features of the in-distribution class one 1706A and the features of the in-distribution class two 1706B into a dense vector that is used to train a machine learning model. In at least one implementation, in-distribution class one 1706A represents a document including features that correspond to a classification of a document that is in-domain or alternatively known as in-distribution. As an example, this classification may identify a document as a passport. In at least one implementation, in-distribution class two 1706B represents a document including features that correspond to a different classification of another document that is in-domain. In this example, this different classification may identify a document as a national identification.

In at least one implementation, the out-of-distribution prediction engine may translate each of the features of the out-of-distribution document 1706C and the features of the out-of-distribution document 1706D into a dense vector that is used to train a machine learning model. In at least one implementation, the out-of-distribution document 1706C represents a document including features that correspond to a document that is out-of-distribution. As an example, the out-of-distribution document 1706C may be used as input to a machine learning model that outputs a prediction that this out-of-distribution document 1706C is not in-domain. In at least one implementation, out-of-distribution document 1706D represents another document including a different set of features that correspond to a document that is out-of-distribution.

In at least one implementation, the in-distribution class one 1706A and the in-distribution class two 1706B represent documents of in-domain data. For example, in-domain data may be data that a machine learning model is being trained to classify (e.g., passports versus a national identity document). In at least one implementation, the out-of-distribution document 1706C and out-of-distribution document 1706D represent a "foreign" or unknown document relative to the in-domain documents that the machine learning model is being trained to classify. In at least one implementation, as a result of the masking, the machine learning model may be more robust at identifying in-domain documents (e.g., in-distribution class one 1706A and the in-distribution class two 1706B). For example, the machine learning model is able to classify documents as in-domain or in-distribution that have more similar features to the original in-distribution documents used to train the model than to the original out-of-distribution documents (used to train the model).

In at least one implementation, a processor of the out-of-distribution prediction engine masks image data during training to make the machine learning model more robust to a variety of features, such as described above. In at least one implementation, the processor masks image data of input data (e.g., a passport or national identity document) during inferencing.

In at least one implementation, parts, methods, and/or systems described in connection with FIG. 17 are as further illustrated nonexclusively in any of FIGS. 15-23.

Figure 18:
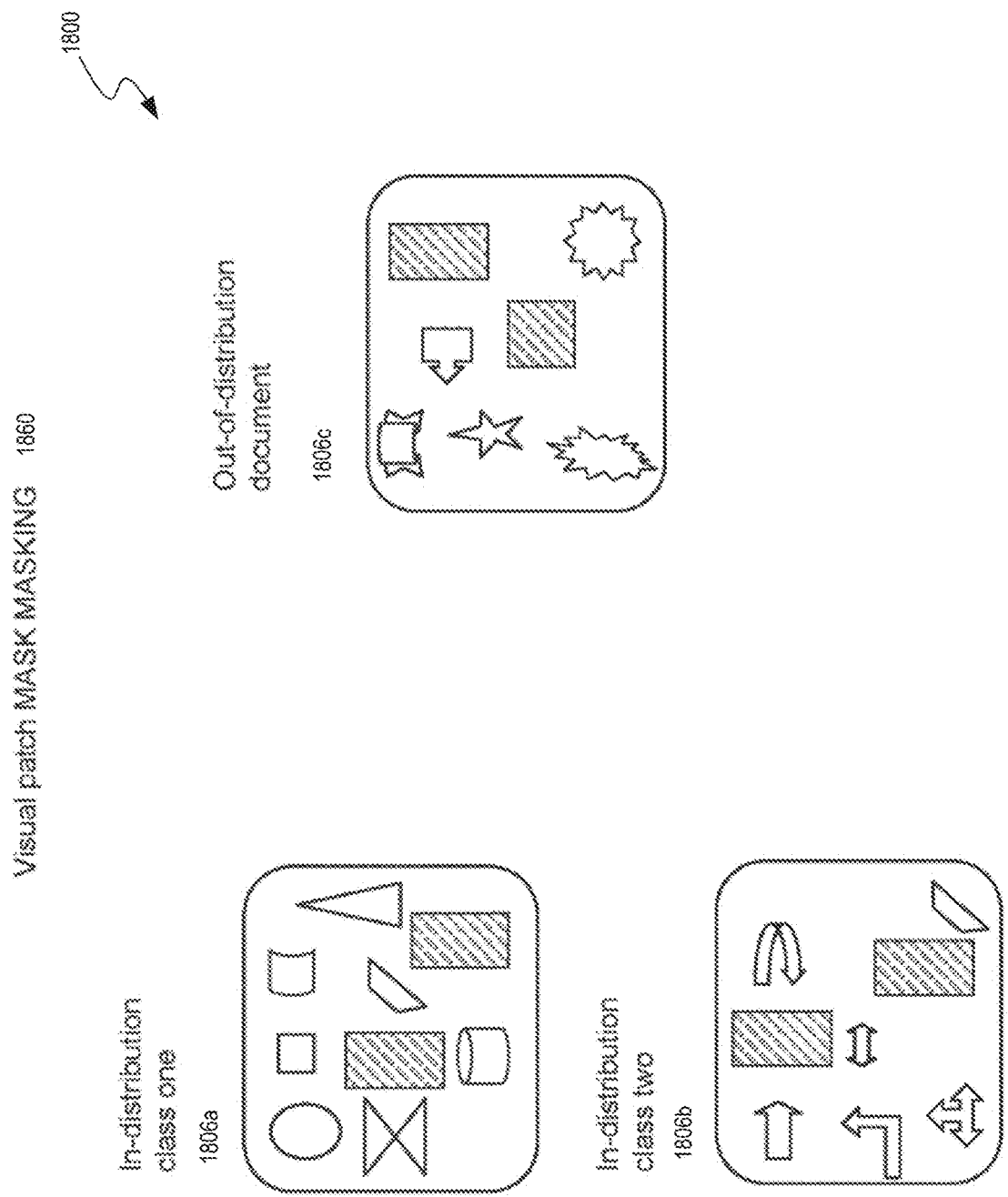
FIG. 18 illustrates an example of visual patch mask masking, in accordance with an implementation.

FIG. 18 illustrates an example 1800 of visual patch mask masking 1860, in accordance with an implementation. In at least one implementation, this visual patch mask masking includes in-distribution class one 1806A, in-distribution class two 1806B, and out-of-distribution document 1806C that are used to train a machine learning model to distinguish between an in-domain document and out-of-distribution document or outlier document. Each of the in-distribution class one 1806A, the in-distribution class two 1806B, and the out-of-distribution document 1806C includes various shapes that represent features (e.g., tokens) of documents, and some of the shapes are overlaid with a "patch" to mask or omit the corresponding features from those features to be used for training the machine learning model. In at least one implementation, each feature map pixel may be a token. In at least one implementation, the patch that overlays one or more features of a training document or document to be classified is a computer-generated geometric shape. In at least one implementation, the computer-generated shape obfuscates one or more features of a training document or document to be classified by the machine learning model. In at least one implementation, the system translates the features into dense vector embeddings for training the machine learning model, the features lacking those that were omitted by using the patch mask masking.

In at least one implementation, the out-of-distribution prediction engine may translate each of the features of the in-distribution class one 1806A and the features of the in-distribution class two 1806B into a dense vector that is used to train the machine learning model. In at least one implementation, the system used masking of features in training documents (and documents for inferencing, not shown in FIG. 18) to increase the distance between learned dense embeddings of out-of-distribution data from in-distribution data. In at least one implementation, masking the features that resemble an oval and an equilateral triangle in out-of-distribution document 1806C results in in-distribution classes and out-of-distribution documents that do not share any features in common. In at least one implementation, the system omits or masks features in documents for training machine learning models to create more robust trained machine learning models. In at least one implementation, in-distribution class one 1806A represents a document including features that correspond to a classification of a document that is in-domain. In at least one implementation, in-distribution class two 1806B represents a document including features that correspond to a different classification of another document that is in-domain.

Not shown in FIGS. 17 and 18 is token "text" masking. For example, the features (e.g., shapes) may represent tokens from a random sentence to be used in an array. In at least one implementation, token text matching may implement feature extraction and feature masking to train a machine learning model to distinguish in-domain documents from out-of-domain documents. In at least one implementation, the system performs image patch masking and text token matching simultaneously during training of the machine learning model. The simultaneous patch and text token masking allows for more separation in the extracted dense vectors between the in-domain and out-of-distribution data, as out-of-distribution data is dissimilar to the in-domain data and thus has less relevant features. In at least one implementation, token text masking comprises attention masking to inform the machine learning model which tokens are padding and which tokens are to be processed.

In at least one implementation, a processor of a computer system of the out-of-distribution prediction engine, such as out-of-distribution prediction engine 1540 in FIG. 15, may perform masking of image data or text image (not shown in FIG. 17 or 14). In at least one implementation, parts, methods, and/or systems described in connection with FIG. 18 are as further illustrated nonexclusively in any of FIGS. 15-23.

Figure 19:
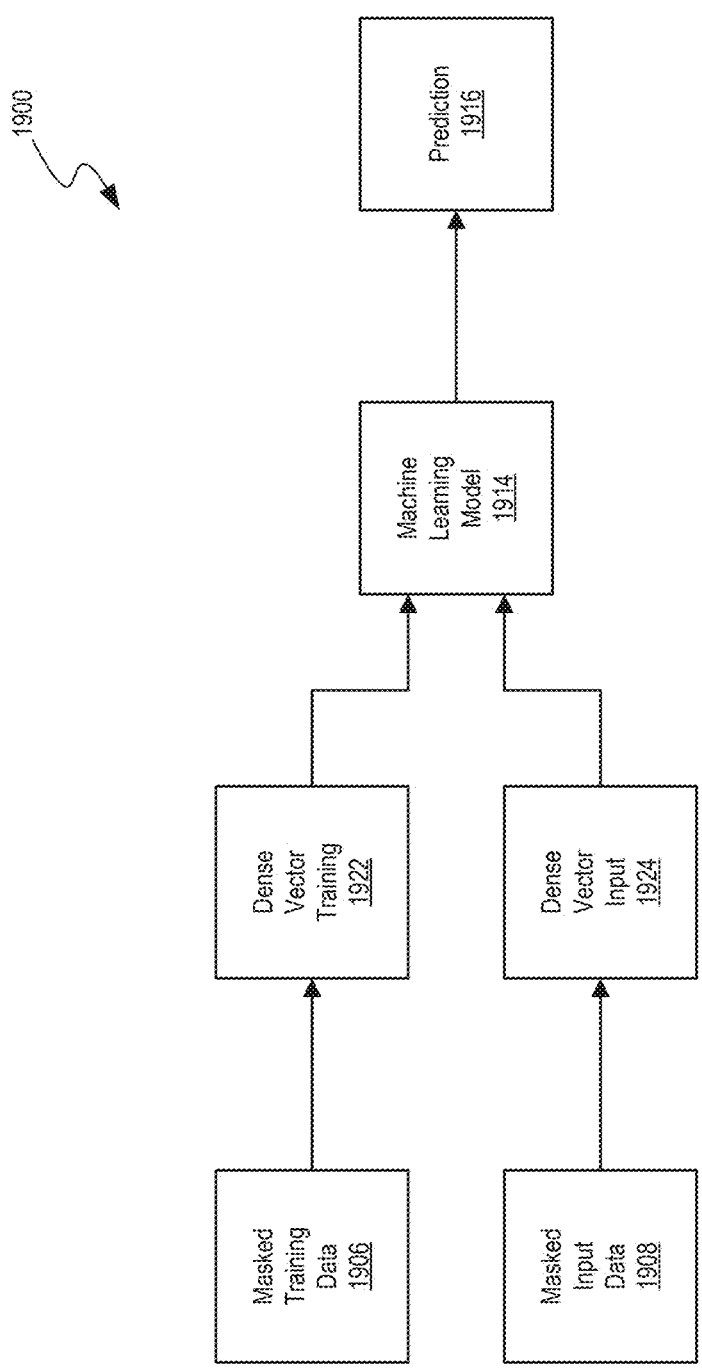
FIG. 19 illustrates an example environment of the out-of-distribution prediction engine of the data management engine of FIG. 2.

FIG. 19 illustrates an example 1900 of an out-of-distribution (and outlier) prediction system, in accordance with an implementation. In at least one implementation, this out-of-distribution prediction engine, which is similar to out-of-distribution prediction engine 1540 in FIG. 15, includes masked training data 1906 and masked input data 1908 that are translated into dense vector embeddings, such as dense vector training (data) 1922 and dense vector input (data) 1924, which are used to train a machine learning model 1914. In at least one implementation, the machine learning model generates a prediction 1916 of whether a document or input data is an in-domain document and out-of-distribution document or outlier document.

In at least one implementation, the system performs masked feature learning to train a machine learning model to detect out-of-distribution documents or outlier documents. In at least one implementation, the system extracts a set of features from a training document, such as training data 1506 in FIG. 15, to generate the masked training data 1906. As described above, the system may perform visual token masking, visual patch masking, and token text masking to perform contrastive learning techniques. For example, contrastive learning is a deep learning technique using contrasting data samples against each other to learn attributes that are common between data classifications and attributes that set apart a data classification from others (e.g., a representation of data with similar instances being close together in a distribution space and dissimilar instances are set far apart).

In at least one implementation, as a result of performing feature masking, the system generates the masked training data 1906. In at least one implementation, the masked training data 1906 may include features from pixel image data, plaintext data, or layout data or a combination of either image, plaintext, or layout data. In at least one implementation, these features include a set of features that result from omitting some features from both in-distribution training documents and out-of-distribution documents. In at least one implementation, some features that are omitted from training material to generate the masked training data 1906 may include features that are common to both in-distribution training documents and out-of-distribution documents. For example, if some of these features that are common, to both in-distribution and out-of-distribution documents, were left in the training material, it may serve little purpose in learning contrasting features of various classifications of training documents.

In at least one implementation, the system translates the masked training data 1906 into dense vector training data 1922 to train the machine learning model 1914. In at least one implementation, the dense vector training data 1922 may be an array of numbers with each element having a significant value. For example, in a random sentence, each word will have a significant value represented in a dense vector and may be used to learn other words in the sentence ("neighbors"). In at least one implementation, a training document (or input document) that may include plaintext data, image data, or layout data (or combination thereof) goes through an embedding layer and is converted into this dense vector training 1922, alternatively known as a dense embedding vector. In at least one implementation, the masked training data 1906 includes features of a training document that are concatenated together to generate the dense vector training data 1922. In at least one implementation, the dense (embedding) vector training data 1922 is encoded and processed in the machine learning model 1914.

In at least one implementation, the dense vector training data 1922 may be a training forward propagation used to train the machine learning model 1914. In at least one implementation, the training forward propagation may include a storage of variables for input to the machine learning model 1914. In at least one implementation, the training forward propagation may include output of the machine learning model 1914.

In at least one implementation, the system extracts a set of features from an input document to generate the masked training data 1906. The input document is similar to documents 1508 in FIG. 15 and documents 1608 in FIG. 16. In at least one implementation, the system receives the input document to be processed by the machine learning model 1914 to generate the prediction 1916. In at least one implementation, the system translates the masked input data 1908 into dense vector input data 1924 to be used by the machine learning model 1914 to generate an inference. Here, the machine learning model 1914 generates a prediction 1916 of whether the input document is an in-distribution or out-of-distribution document. In at least one implementation, the dense vector input data 1924 is similar to the dense vector training data 1922, described above.

In at least one implementation, the prediction 1916 is an output of the machine learning model 1914. In at least one implementation, the prediction 1916 may be a classification of an input document, such as documents 1508 in FIG. 15, that the machine learning model is trained to classify. In at least one implementation, the prediction 1916 may be generated by the machine learning model 1914 by using a threshold value on model confidence scores as a decision boundary to classify an unknown document into in-domain or out-of-distribution. The confidence scores may be generated during training of the machine learning model. In at least one implementation, the prediction 1916 may generated by calculating a distance score according to a Mahalanobis distance method, such as by calculating the distance between an extracted dense vector, such as dense vector input data 1924 of the document associated with the masked input data 1908 and classification conditional Gaussian distributions learned by the machine learning model 1914 during training. In at least one implementation, the prediction 1916 is generated by using a combination of the threshold value of the confidence scores and the distance score.

In at least one implementation, parts, methods, and/or systems described in connection with FIG. 19 are as further illustrated nonexclusively in any of FIGS. 15-23.

Figure 20:
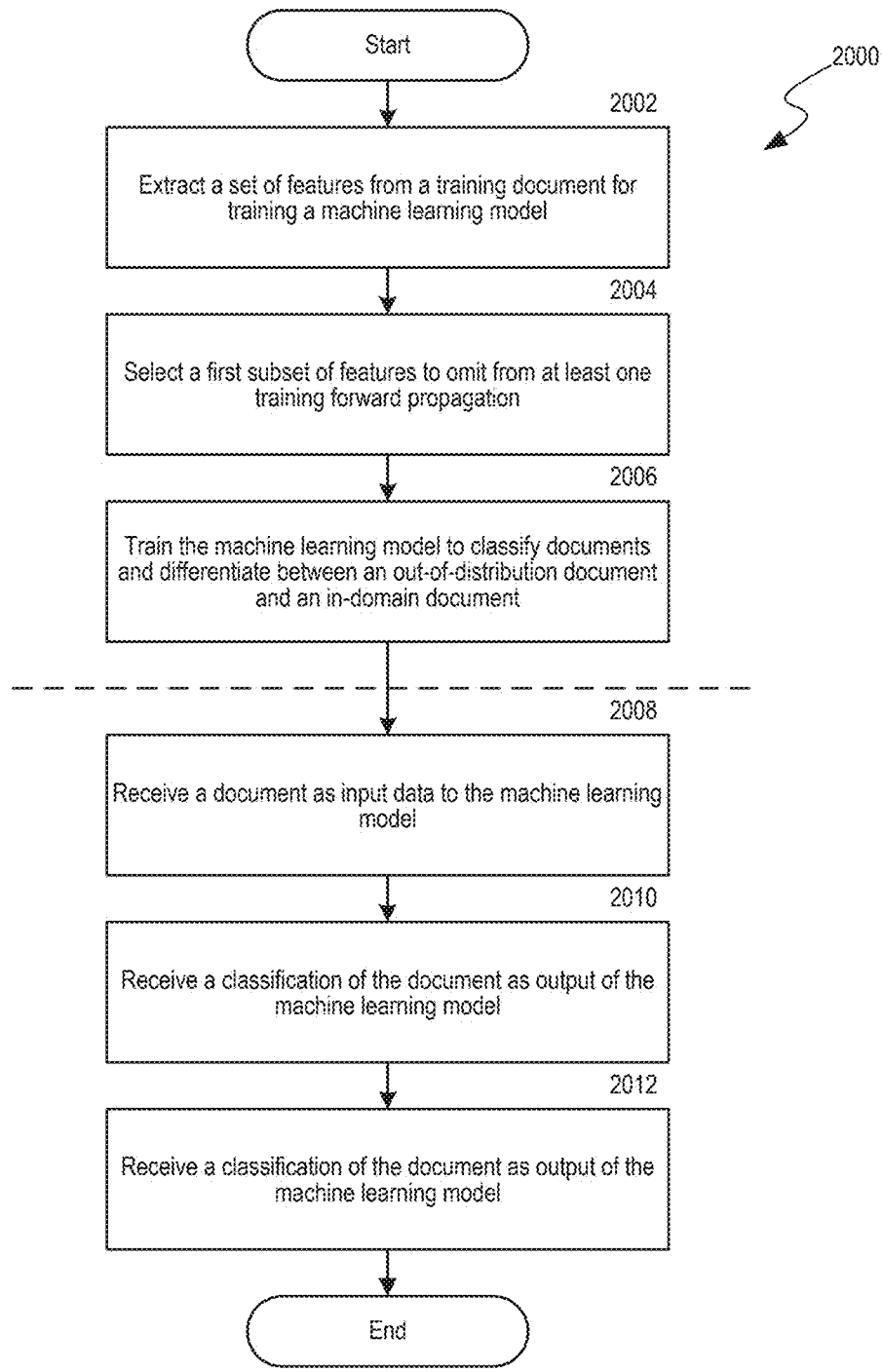
FIG. 20 is a flowchart that illustrates an example of the out-of-distribution prediction engine that trains a machine learning model to identify whether a data object is out-of-distribution.

FIG. 20 is flowchart illustrating an example of an out-of-distribution prediction engine that trains a machine learning model to identify whether a data object is out-of-distribution, in accordance with an implementation. Some or all of the process 2000 (or any other processes described or variations and/or combinations of those processes) may be performed by one or more computer systems configured with executable instructions and/or other data and may be implemented as executable instructions executing collectively on one or more processors. The executable instructions and/or other data may be stored on a non-transitory, computer-readable storage medium (e.g., a computer program persistently stored on magnetic, optical, or flash media). For example, some or all of process 2000 may be performed by any suitable system, such as the computing device 2300 of FIG. 23. The process 2000 includes a series of operations wherein the system is performing process 2000 to extract features from a training document, select features to mask from the training document to create masked training data, and train a machine learning model using the masked training data to detect an out-of-distribution document.

In 2002, in at least one implementation, one or more processors of the out-of-distribution prediction engine, or alternatively known as a computing system or system, extract features from a training document for training a machine learning model. In at least one implementation, the features are extracted from the training document using a feature extraction module such as the feature extraction module 1510 in FIG. 15. In at least one implementation, the features may include plaintext, image, and/or layout data.

In 2004, in at least one implementation, one or more processors of the out-of-distribution prediction engine select a subset of features to omit from a training forward propagation. In at least one implementation, the one or more processors select the subset of features from the set of features extracted from the training document. In at least one implementation, the subset of features to omit or mask may be determined based on a pseudorandom process. In at least one implementation, a pseudorandom process to omit features may include masking plaintext data, input data, layout data, or a combination thereof in a stochastically distributed manner. In at least one implementation, the pseudorandom process to omit features includes pseudorandomly determining data in a training document to mask for training the machine learning model. In at least one implementation, the pseudorandom process to omit features includes pseudorandomly determining data in a document to mask that is to be classified during inferencing operations. In at least one implementation, the pseudorandom process to omit features includes pseudorandomly determining data to mask in training operations of the machine learning model and in inferencing operations of the machine learning model. In this disclosure, for example, the system masks different parts of a document in a statistically random manner so that masking performed over time results in predictions of documents with features that are expected for a given in-domain classification and remaining features are unknown, creating greater separation between in-domain and out-of-distribution data.

In some implementations, the pseudorandom process to omit features results in more robust predictions of in-domain documents by training the machine learning model within domain documents that have much more relevant features (for what the model is trained to predict) than out-of-distribution documents. In some implementations, the pseudorandom process to omit features includes pseudorandomly selecting features to mask that are common to in-domain and out-of-distribution documents. For example, to train a model to predict whether a document is a passport or a national identification (both in-domain classifications), the system may mask features of name and date of birth, which are features also found in a driver's license that, in this example, is out-of-distribution. This masking of common features would result in a greater separation between features remaining in "in-domain" documents and features in out-of-distribution documents that are irrelevant for passports or national identifications (e.g., a license #, a medical condition, or if the person is registered as an organ donor.)

In at least one implementation, the subset of features to omit may be determined based on selecting features of a training document or new document (e.g., input data) at a consistent (e.g., approximately the same) location in the documents. In at least one implementation, the subset of features to omit may be determined by using a percentage or number (e.g., a parameter) specified by a user, client device, computer system, hardware, or software application of the system.

In 2006, in at least one implementation, one or more processors of the out-of-distribution prediction engine train the machine learning model to produce a trained machine learning model, by using another subset of the features, from the training document, in the training forward propagation. In at least one implementation, the other subset of the features is different from the subset of features that is omitted from the training forward propagation (e.g., the other subset of features is disjoint from the omitted subset of features). In some implementations, a subset of features is disjoint from another subset of features when neither of the subsets has any features in common. In some implementations, the subset of features is disjoint from another subset of features if there is no "intersection" or "overlap" between the two subsets of features. For example, a set of features {1, 3, 5, 7} is disjoint from another set of features {2, 4, 6, 8}, as none of the features or elements of the two sets of features are in common. In at least one implementation, a training forward propagation includes a process of passing ("propagating") input data through a network (e.g., neural network) and generating an output (e.g., prediction). In at least one implementation, the trained machine learning model outputs information usable to classify documents, such as documents 1508 in FIG. 15. In at least one implementation, the trained machine learning model outputs information usable to differentiate between an out-of-distribution document and an in-distribution document (alternatively known as an in-domain document). In at least one implementation, the system trains the machine learning model using a masked training document to produce a trained machine learning model.

The dashed line indicates a separation in the process 2000 between training the machine learning model and using the machine learning model.

In 2008, in at least one implementation, one or more processors of the out-of-distribution prediction engine receive a document as input data to the machine learning model. In at least one implementation, a processor of the out-of-distribution prediction engine performs operations to mask at least a portion of the input data to produce a masked input data. In at least one implementation, the processor performs operations to provide the masked input data to the trained machine learning model as input.

In 2010, in at least one implementation, one or more processors of the out-of-distribution prediction engine perform operations to receive a classification of the document as an output of the machine learning model. In at least one implementation, the classification is generated by the system extracting a dense vector embedding of the document, comparing it to an in-domain dense vector embedding to obtain a confidence score and then comparing that confidence score to a threshold value of confidence scores, obtained during the training of the machine learning model.

In 2012, in at least one implementation, one or more processors of the out-of-distribution prediction engine perform instructions to determine that the document is an out-of-distribution document. In at least one implementation, the processor may perform operations to cause the out-of-distribution document to be sent for manual review. In at least one implementation, the manual review may be performed by a user of the out-of-distribution prediction engine, such as user 1502 in FIG. 15, or by any entity designated as an in-domain data expert.

In at least one implementation, parts, methods, and/or systems described in connection with FIG. 20 are as further illustrated nonexclusively in any FIGS. 15-23. Note that one or more of the operations performed in 2002-14 may be performed in various orders and combinations, including in parallel.

Note that, in the context of describing disclosed implementations, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Example Machine Learning Architecture

Figure 21:
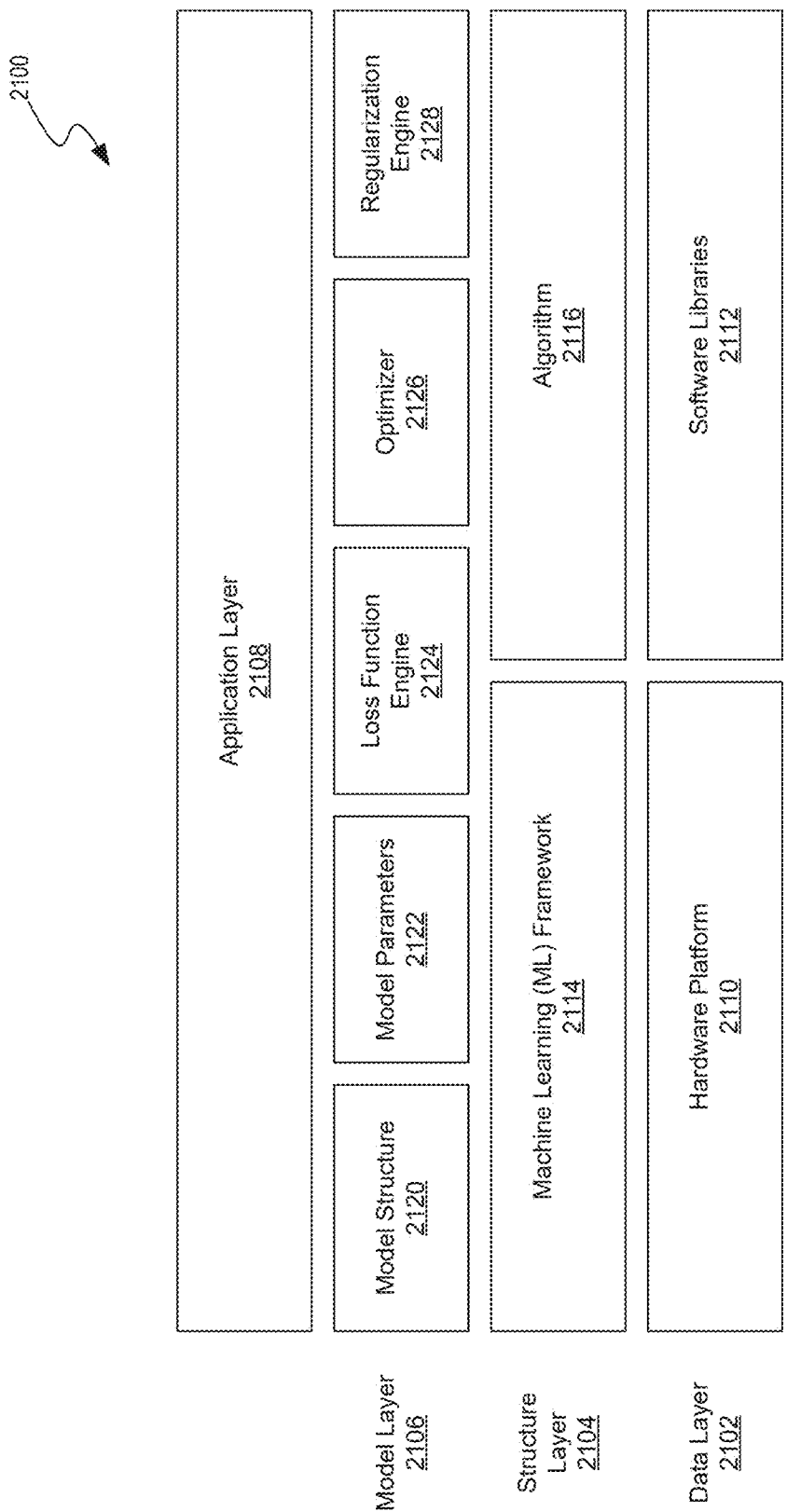
FIG. 21 illustrates a layered architecture of an artificial intelligence (AI) system that can implement the ML models of the service authorization system in accordance with some implementations of the present technology.

FIG. 21 illustrates a layered architecture of an AI system 2100 that can implement the ML models of the service authorization system 200 of FIG. 2, in accordance with some implementations of the present technology. Example ML models can include the models executed by the service authorization system 200, such as remediation models, anomaly detection models, and so forth. Accordingly, the AI models of the service authorization system 200 can include one or more components of the AI system 2100.

As shown, the AI system 2100 can include a set of layers, which conceptually organize elements within an example network topology for the AI system's architecture to implement a particular AI model. Generally, an AI model is a computer-executable program implemented by the AI system 2100 that analyzes data to make predictions. Information can pass through each layer of the AI system 2100 to generate outputs for the AI model. The layers can include a data layer 2102, a structure layer 2104, a model layer 2106, and an application layer 2108. The algorithm 2116 of the structure layer 2104 and the model structure 2120 and model parameters 2122 of the model layer 2106 together form an example AI model. The optimizer 2126, loss function engine 2124, and regularization engine 2128 work to refine and optimize the AI model, and the data layer 2102 provides resources and support for application of the AI model by the application layer 2108.

The data layer 2102 acts as the foundation of the AI system 2100 by preparing data for the AI model. As shown, the data layer 2102 can include two sub-layers: a hardware platform 2110 and one or more software libraries 2112. The hardware platform 2110 can be designed to perform operations for the AI model and include computing resources for storage, memory, logic and networking, such as the resources described in relation to FIGS. 1 and 23. The hardware platform 2110 can process amounts of data using one or more servers. The servers can perform backend operations such as matrix calculations, parallel calculations, machine learning (ML) training, and the like. Examples of servers used by the hardware platform 2110 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 2110 can include computing resources (e.g., servers, memory, etc.) offered by a cloud services provider. The hardware platform 2110 can also include computer memory for storing data about the AI model, application of the AI model, and training data for the AI model. The computer memory can be a form of random-access memory (RAM), such as dynamic RAM, static RAM, and non-volatile RAM.

The software libraries 2112 can be thought of as suites of data and programming code, including executables, used to control the computing resources of the hardware platform 2110. The programming code can include low-level primitives (e.g., fundamental language elements) that form the foundation of one or more low-level programming languages, such that servers of the hardware platform 2110 can use the low-level primitives to carry out specific operations. The low-level programming languages do not require much, if any, abstraction from a computing resource's instruction set architecture, enabling them to run quickly with a small memory footprint. Examples of software libraries 2112 that can be included in the AI system 2100 include INTEL Math Kernel Library, NVIDIA cuDNN, EIGEN, and OpenBLAS.

The structure layer 2104 can include an ML framework 2114 and an algorithm 2116. The ML framework 2114 can be thought of as an interface, library, or tool that enables users to build and deploy the AI model. The ML framework 2114 can include an open-source library, an application programming interface (API), a gradient-boosting library, an ensemble method, and/or a deep learning toolkit that work with the layers of the AI system facilitate development of the AI model. For example, the ML framework 2114 can distribute processes for application or training of the AI model across multiple resources in the hardware platform 2110. The ML framework 2114 can also include a set of pre-built components that have the functionality to implement and train the AI model and enable users to use pre-built functions and classes to construct and train the AI model. Thus, the ML framework 2114 can be used to facilitate data engineering, development, hyperparameter tuning, testing, and training for the AI model. Examples of ML frameworks 2114 that can be used in the AI system 2100 include TENSORFLOW, PYTORCH, SCIKIT-LEARN, KERAS, LightGBM, RANDOM FOREST, and AMAZON WEB SERVICES.

The algorithm 2116 can be an organized set of computer-executable operations used to generate output data from a set of input data and can be described using pseudocode. The algorithm 2116 can include complex code that enables the computing resources to learn from new input data and create new/modified outputs based on what was learned. In some implementations, the algorithm 2116 can build the AI model through being trained while running computing resources of the hardware platform 2110. This training enables the algorithm 2116 to make predictions or decisions without being explicitly programmed to do so. Once trained, the algorithm 2116 can run at the computing resources as part of the AI model to make predictions or decisions, improve computing resource performance, or perform tasks. The algorithm 2116 can be trained using supervised learning, unsupervised learning, semi-supervised learning, and/or reinforcement learning.

Using supervised learning, the algorithm 2116 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, the training data can include native-format data collected (e.g., in the form of dataset 502 of FIG. 5) from various source computing systems described in relation to FIG. 5. Furthermore, training data can include pre-processed data generated by various engines of the service authorization system 200 described in relation to FIG. 2. The user may label the training data based on one or more classes and trains the AI model by inputting the training data to the algorithm 2116. The algorithm determines how to label the new data based on the labeled training data. The user can facilitate collection, labeling, and/or input via the ML framework 2114. In some instances, the user may convert the training data to a set of feature vectors for input to the algorithm 2116. Once trained, the user can test the algorithm 2116 on new data to determine if the algorithm 2116 is predicting accurate labels for the new data. For example, the user can use cross-validation methods to test the accuracy of the algorithm 2116 and retrain the algorithm 2116 on new training data if the results of the cross-validation are below an accuracy threshold.

Supervised learning can include classification and/or regression. Classification techniques involve teaching the algorithm 2116 to identify a category of new observations based on training data and are used when input data for the algorithm 2116 is discrete. Said differently, when learning through classification techniques, the algorithm 2116 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 2116 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 2116 is continuous. Regression techniques can be used to train the algorithm 2116 to predict or forecast relationships between variables. To train the algorithm 2116 using regression techniques, a user can select a regression method for estimating the parameters of the model. The user collects and labels training data that is input to the algorithm 2116 such that the algorithm 2116 is trained to understand the relationship between data features and the dependent variable(s). Once trained, the algorithm 2116 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 2116 learns patterns from unlabeled training data. In particular, the algorithm 2116 is trained to learn hidden patterns and insights of input data, which can be used for data exploration or for generating new data. Here, the algorithm 2116 does not have a predefined output, unlike the labels output when the algorithm 2116 is trained using supervised learning. Said another way, unsupervised learning is used to train the algorithm 2116 to find an underlying structure of a set of data, group the data according to similarities, and represent that set of data in a compressed format. The service authorization system 200 (e.g., data management engine 226) can use unsupervised learning to identify patterns in claim history (e.g., to identify particular event sequences) and so forth. In some implementations, performance of the AI models of the data management engine 226 that can use unsupervised learning is improved because the incoming dataset 502 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 2116 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 2116 may be trained to be an Isolation Forest, local outlier factor (LOF) algorithm, or k-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 2116 include factor analysis, item response theory, latent profile analysis, and latent class analysis.

The model layer 2106 implements the AI model using data from the data layer and the algorithm 2116 and ML framework 2114 from the structure layer 2104, thus enabling decision-making capabilities of the AI system 2100. The model layer 2106 includes a model structure 2120, model parameters 2122, a loss function engine 2124, an optimizer 2126, and a regularization engine 2128.

The model structure 2120 describes the architecture of the AI model of the AI system 2100. The model structure 2120 defines the complexity of the pattern/relationship that the AI model expresses. Examples of structures that can be used as the model structure 2120 include decision trees, support vector machines, regression analyses, Bayesian networks, Gaussian processes, genetic algorithms, and artificial neural networks (or, simply, neural networks). The model structure 2120 can include a number of structure layers, a number of nodes (or neurons) at each structure layer, and activation functions of each node. Each node's activation function defines how to node converts data received to data output. The structure layers may include an input layer of nodes that receive input data and an output layer of nodes that produce output data. The model structure 2120 may include one or more hidden layers of nodes between the input and output layers. The model structure 2120 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 2122 represent the relationships learned during training and can be used to make predictions and decisions based on input data. The model parameters 2122 can weight and bias the nodes and connections of the model structure 2120. For instance, when the model structure 2120 is a neural network, the model parameters 2122 can weight and bias the nodes in each layer of the neural networks, such that the weights determine the strength of the nodes and the biases determine the thresholds for the activation functions of each node. The model parameters 2122, in conjunction with the activation functions of the nodes, determine how input data is transformed into desired outputs. The model parameters 2122 can be determined and/or altered during training of the algorithm 2116.

The loss function engine 2124 can determine a loss function, which is a metric used to evaluate the AI model's performance during training. For instance, the loss function engine 2124 can measure the difference between a predicted output of the AI model and the actual output of the AI model and is used to guide optimization of the AI model during training to minimize the loss function. The loss function may be presented via the ML framework 2114, such that a user can determine whether to retrain or otherwise alter the algorithm 2116 if the loss function is over a threshold. In some instances, the algorithm 2116 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 2126 adjusts the model parameters 2122 to minimize the loss function during training of the algorithm 2116. In other words, the optimizer 2126 uses the loss function generated by the loss function engine 2124 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMS prop), Radial Base Function (RBF), and Limited-memory BFGS (L-BFGS). The type of optimizer 2126 used may be determined based on the type of model structure 2120 and the size of data and the computing resources available in the data layer 2102.

The regularization engine 2128 executes regularization operations. Regularization is a technique that prevents over- and under-fitting of the AI model. Overfitting occurs when the algorithm 2116 is overly complex and too adapted to the training data, which can result in poor performance of the AI model. Under-fitting occurs when the algorithm 2116 is unable to recognize even basic patterns from the training data such that it cannot perform well on training data or on validation data. The optimizer 2126 can apply one or more regularization techniques to fit the algorithm 2116 to the training data properly, which helps constrain the resulting AI model and improves its ability for generalized application. Examples of regularization techniques include lasso (L1) regularization, ridge (L2) regularization, and elastic (L1 and L2) regularization.

The application layer 2108 describes how the AI system 2100 is used to solve problems or perform tasks. In an example implementation, the application layer 2108 can be communicatively coupled (e.g., display application data, receive user input, and/or the like) to an interactable user interface of the service authorization system 200 of FIG. 2.

Example Transformer for Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 22:
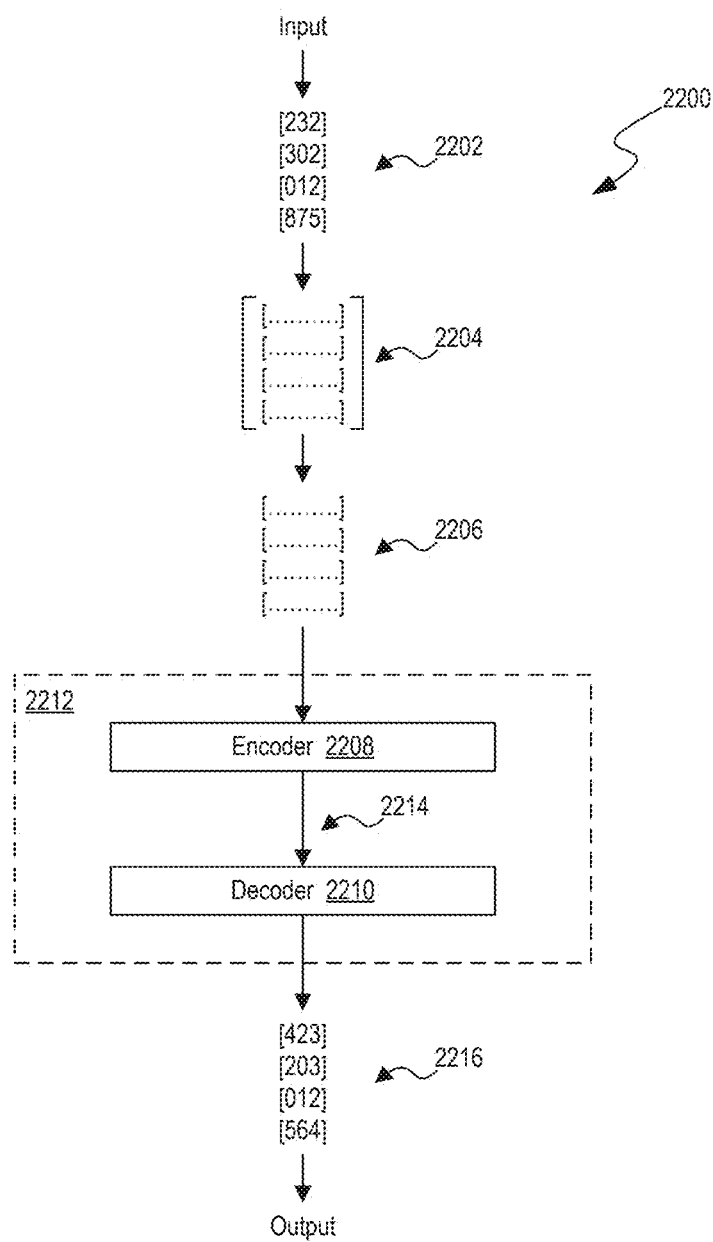
FIG. 22 is a block diagram of an example transformer that can implement aspects of the present technology.

FIG. 22 is a block diagram of an example transformer 2212 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 2212 includes an encoder 2208 (which can comprise one or more encoder layers/blocks connected in series) and a decoder 2210 (which can comprise one or more decoder layers/blocks connected in series). Generally, the encoder 2208 and the decoder 2210 each include a plurality of neural network layers, at least one of which can be a self-attention layer. The parameters of the neural network layers can be referred to as the parameters of the language model.

The transformer 2212 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 2212 is trained to perform certain functions on other input formats than natural language input. For example, the input can include objects, images, audio content, or video content, or a combination thereof.

The transformer 2212 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 22 illustrates an example of how the transformer 2212 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], 2, and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 22, a short sequence of tokens 2202 corresponding to the input text is illustrated as input to the transformer 2212. Tokenization of the text sequence into the tokens 2202 can be performed by some pre-processing tokenization module such as, for example, a byte-pair encoding tokenizer (the "pre" referring to the tokenization occurring prior to the processing of the tokenized input by the LLM), which is not shown in FIG. 22 for simplicity. In general, the token sequence that is inputted to the transformer 2212 can be of any length up to a maximum length defined based on the dimensions of the transformer 2212. Each token 2202 in the token sequence is converted into an embedding vector 2206 (also referred to simply as an embedding 2206). An embedding 2206 is a learned numerical representation (such as, for example, a vector) of a token that captures some semantic meaning of the text segment represented by the token 2202. The embedding 2206 represents the text segment corresponding to the token 2202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 2206 corresponding to the "write" token will be closer to another embedding corresponding to the "jot down" token in the vector space as compared to the distance between the embedding 2206 corresponding to the "write" token and another embedding corresponding to the "summary" token.

The vector space can be defined by the dimensions and values of the embedding vectors. Various techniques can be used to convert a token 2202 to an embedding 2206. For example, another trained ML model can be used to convert the token 2202 into an embedding 2206. In particular, another trained ML model can be used to convert the token 2202 into an embedding 2206 in a way that encodes additional information into the embedding 2206 (e.g., a trained ML model can encode positional information about the position of the token 2202 in the text sequence into the embedding 2206). In some examples, the numerical value of the token 2202 can be used to look up the corresponding embedding in an embedding matrix 2204 (which can be learned during training of the transformer 2212).

The generated embeddings 2206 are input into the encoder 2208. The encoder 2208 serves to encode the embeddings 2206 into feature vectors 2214 that represent the latent features of the embeddings 2206. The encoder 2208 can encode positional information (i.e., information about the sequence of the input) in the feature vectors 2214. The feature vectors 2214 can have very high dimensionality (e.g., on the order of thousands or tens of thousands), with each element in a feature vector 2214 corresponding to a respective feature. The numerical weight of each element in a feature vector 2214 represents the importance of the corresponding feature. The space of all possible feature vectors 2214 that can be generated by the encoder 2208 can be referred to as the latent space or feature space.

Conceptually, the decoder 2210 is designed to map the features represented by the feature vectors 2214 into meaningful output, which can depend on the task that was assigned to the transformer 2212. For example, if the transformer 2212 is used for a translation task, the decoder 2210 can map the feature vectors 2214 into text output in a target language different from the language of the original tokens 2202. Generally, in a generative language model, the decoder 2210 serves to decode the feature vectors 2214 into a sequence of tokens. The decoder 2210 can generate output tokens 2216 one by one. Each output token 2216 can be fed back as input to the decoder 2210 in order to generate the next output token 2216. By feeding back the generated output and applying self-attention, the decoder 2210 is able to generate a sequence of output tokens 2216 that has sequential meaning (e.g., the resulting output text sequence is understandable as a sentence and obeys grammatical rules). The decoder 2210 can generate output tokens 2216 until a special [EOT] token (indicating the end of the text) is generated. The resulting sequence of output tokens 2216 can then be converted to a text sequence in post-processing. For example, each output token 2216 can be an integer number that corresponds to a vocabulary index. By looking up the text segment using the vocabulary index, the text segment corresponding to each output token 2216 can be retrieved, the text segments can be concatenated together, and the final output text sequence can be obtained.

In some examples, the input provided to the transformer 2212 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 23:
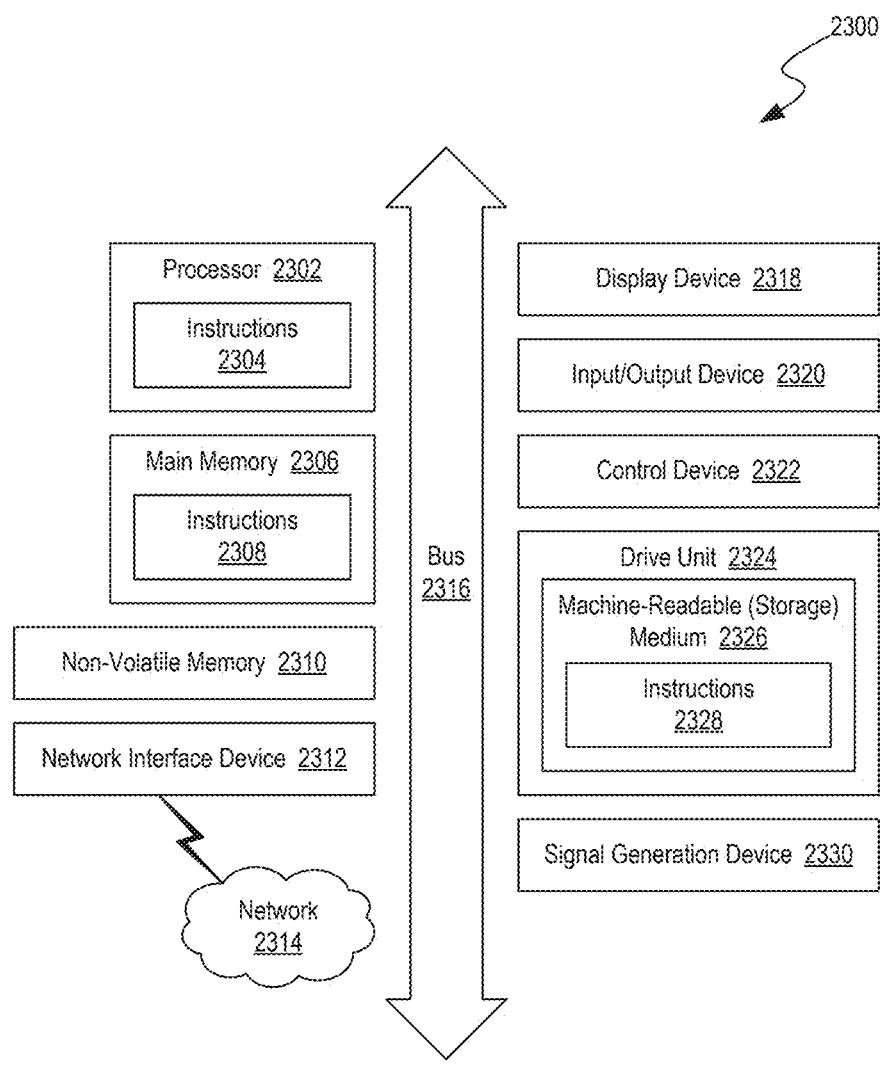
FIG. 23 is a block diagram that illustrates an example of a computer system in which at least some operations described herein can be implemented.

FIG. 23 is a block diagram that illustrates an example of a computer system 2300 in which at least some operations described herein can be implemented. As shown, the computer system 2300 can include: one or more processors 2302, main memory 2306, non-volatile memory 2310, a network interface device 2312, a video display device 2318, an input/output device 2320, a control device 2322 (e.g., keyboard and pointing device), a drive unit 2324 that includes a machine-readable (storage) medium 2326, and a signal generation device 2330 that are communicatively connected to a bus 2316. The bus 2316 represents one or more physical buses and/or point-to-point connections that are connected by appropriate bridges, adapters, or controllers. Various common components (e.g., cache memory) are omitted from FIG. 23 for brevity. Instead, the computer system 2300 is intended to illustrate a hardware device on which components illustrated or described relative to the examples of the figures and any other components described in this specification can be implemented.

The computer system 2300 can take any suitable physical form. For example, the computing system 2300 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 2300. In some implementations, the computer system 2300 can be an embedded computer system, a system-on-chip (SOC), a single-board computer system (SBC), or a distributed system such as a mesh of computer systems, or it can include one or more cloud components in one or more networks. Where appropriate, one or more computer systems 2300 can perform operations in real time, in near real time, or in batch mode.

The network interface device 2312 enables the computing system 2300 to mediate data in a network 2314 with an entity that is external to the computing system 2300 through any communication protocol supported by the computing system 2300 and the external entity. Examples of the network interface device 2312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2306, non-volatile memory 2310, machine-readable medium 2326) can be local, remote, or distributed. Although shown as a single medium, the machine-readable medium 2326 can include multiple media (e.g., a centralized/distributed database and/or associated caches and servers) that store one or more sets of instructions 2328. The machine-readable medium 2326 can include any medium that is capable of storing, encoding, or carrying a set of instructions for execution by the computing system 2300. The machine-readable medium 2326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 2310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2304, 2308, 2328) set at various times in various memory and storage devices in computing device(s). When read and executed by the processor 2302, the instruction(s) cause the computing system 2300 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method for dynamically generating formatted export artifacts for validating authorization schemas based on select attributes extracted from applicable digital artifacts using a plurality of coordinated machine learning models, the method comprising:
   generating for display, at a user interface, a plurality of interactive visual representations configured to execute an interactive review service via dynamically generating a formatted export artifact during the interactive review service based, in part, on generative model outputs returned during the interactive review service;
   receiving, via a first interactive visual representation at the user interface, a request to evaluate authorization of at least one development service that comprises a digital artifact set, each digital artifact in the digital artifact set comprising:
      a content embedding for an artifact attribute set representing tracked development actions of the at least one development service;

accessing an authorization schema set available for the at least one development service, each authorization schema in the authorization schema set comprising a reference embedding for artifact attribute thresholds required to authorize the at least one development service;

invoking a first machine learning model trained on input content embeddings of sample digital artifacts and corresponding input reference embeddings of sample authorization schemas to output reference identifiers of applicable authorization schemas for the sample digital artifacts, the invocation causing the first machine learning model to generate output reference identifiers of an applicable authorization schema subset from the authorization schema set based on input comprising the content embeddings of the digital artifact set and the reference embeddings of the authorization schema set,
- wherein each applicable authorization schema in the subset is associated with the output reference identifiers generated by the first machine learning model and mapped to at least one digital artifact of the at least one development service, and
- wherein the reference embedding of the applicable authorization schema and the content embedding of the at least one digital artifact satisfy a similarity threshold;

for each applicable authorization schema in the applicable authorization schema subset that is associated with the output reference identifiers generated by the first machine learning model and mapped to the at least one digital artifact:
- retrieving, from a remote database, a historical artifact attribute set representing tracked development actions for prior development services authorized via the applicable authorization schema that is associated with the output reference identifiers generated by the first machine learning model and mapped to the at least one digital artifact;
- invoking a second machine learning model trained on input artifact attributes for sample digital artifacts and corresponding input artifact attribute thresholds of sample applicable authorization schemas to output authorization status of development services associated with the sample digital artifacts, the invocation causing the second machine learning model to generate an authorization status for the at least one development service based on input comprising the historical artifact attribute set and the artifact attribute set of the applicable authorization schema associated with the output reference identifiers generated by the first machine learning model and mapped to the at least one digital artifact,
  - wherein the authorization status indicates whether the required artifact attribute thresholds of the applicable authorization schema are satisfied;

automatically generating for display, at the user interface, a second interactive visual representation that visualizes at least one applicable authorization schema and the mapped at least one digital artifact of the at least one development service,
- wherein the authorization status of the at least one applicable authorization schema indicates satisfaction of the required artifact attribute thresholds;

automatically generating for display, at the user interface, a third visual representation of the formatted export digital artifact based, in part, on an artifact template comprising a required field query set, each field query within the required field query set corresponding to an empty input field; and responsive to receiving a positive user indication for the at least one applicable authorization schema via the second interactive visual representation of the user interface, updating the third visual representation for each required field query of the formatted export digital artifact by:
- invoking a third machine learning model trained on input sample field queries and corresponding input artifact attributes of sample digital artifacts to output human-readable narrative entries for the sample field queries, the invocation causing the third machine learning model to generate a human-readable narrative for the required field query based on input comprising the artifact attribute set and the historical artifact attribute set associated for the at least one digital artifact mapped to the at least one applicable authorization schema associated with the output reference identifiers generated by the first machine learning model and mapped to the at least one digital artifact; and
- automatically updating, at the user interface, the third visual representation of the formatted export digital artifact to populate the empty input field of the required field query with the generated human-readable narrative.

2. The computer-implemented method of claim 1, further comprising:
responsive to receiving a negative user indication for the at least one applicable authorization schema via the user interface:
- automatically generating a model prediction training sample comprising an input data based on the historical artifact attribute set and the artifact attribute set of the at least one digital artifact and an output label based on the authorization status of the at least one applicable authorization schema;
- accessing, from the remote database, a stored model prediction training sample set, each model prediction training sample corresponding to predicted authorization statuses of prior applicable authorization schemas; and
- retraining, using the stored model prediction training sample set and the generated model prediction training sample, the first machine learning model, the second machine learning model, the generative machine learning model, or a combination thereof.

3. The computer-implemented method of claim 1, wherein the user interface is a first user interface, and wherein the method further comprises:
responsive to receiving, via the first user interface, a negative user indication for the at least one applicable authorization schema, the indication identifying a required artifact attribute threshold subset not satisfied by the artifact attribute set:
- inputting into a third machine learning model, the historical artifact attribute set, the artifact attribute set, and the required artifact attribute threshold subset to generate an adjusted artifact attribute set for the at least one digital artifact that satisfy the required artifact attribute threshold subset; and
- configuring for display, at a second user interface, the identified required artifact attribute threshold subset and the adjusted artifact attribute set, the second user interface corresponding to an authorized editor of the at least one digital artifact.

4. The computer-implemented method of claim 1, wherein the visual representation is configured to display the artifact attribute set of the at least one digital artifact that represent the tracked development actions of the at least one development service.

5. The computer-implemented method of claim 4, wherein the method further comprises:
configuring for display, at the user interface, a distinct visual marking over an artifact attribute subset that corresponds to artifact attributes satisfying the required artifact attribute thresholds of the applicable authorization schema.

6. The computer-implemented method of claim 4, wherein the authorization status further indicates whether the required artifact attribute thresholds of the applicable authorization schema are partially satisfied.

7. The computer-implemented method of claim 6, further comprising:
configuring for display, at the user interface, a distinct visual marking over an artifact attribute subset that corresponds to artifact attributes partially satisfying the required artifact attribute thresholds of the applicable authorization schema.

8. The computer-implemented method of claim 7, further comprising:
causing the generative machine learning model to generate a human-readable recommendation for adjusting at least one artifact attribute from the displayed artifact attribute subset to satisfy the required artifact attribute thresholds of the applicable authorization schema; and
configuring for display, at the user interface, the generated human-readable recommendation.

9. The computer-implemented method of claim 1, wherein each authorization schema in the authorization schema set for the at least one development service comprises regulatory policies, predetermined evaluation rulesets, narrative guidelines, fiscal procedures, or any combination thereof.

10. The computer-implemented method of claim 1, wherein the visual representation of the at least one applicable authorization schema is further configured to display a comparative diagram that maps a first mapping of content similarities between the historical artifact attribute set and the artifact attribute set and a second mapping of content differences between the historical attribute set and the artifact attribute set.

11. The computer-implemented method of claim 1, further comprising:
obtaining a first sequence of intermediary logic operations executed during operation of the first machine learning model and a second sequence of intermediary logic operations executed during operation of the second machine learning model;
causing the generative machine learning model to generate, using the first and the second sequence of intermediary logic operations, a human-readable narrative explaining a logical sequence resulting in the authorization status of the displayed at least one applicable authorization schema; and
configuring for display, at the user interface, the generated human-readable narrative alongside the visual representation of the at least one applicable authorization schema and the mapped at least one digital artifact.

12. A system for dynamic generation of formatted export artifacts for validating authorization schemas based on select attributes extracted from applicable digital artifacts using a plurality of coordinated machine learning models, the system comprising:
at least one hardware processor; and
at least one non-transitory memory storing instructions, which, when executed by the at least one hardware processor, causes the system to:
generate for display, at a user interface, a plurality of interactive visual representations configured to execute an interactive review service via dynamically generating a formatted export artifact during the interactive review service based, in part, on generative model outputs returned during the interactive review service;
receive, via a first interactive visual representation, a request to evaluate authorization of a development service that comprises a digital artifact set, each digital artifact in the digital artifact set comprising:
a content embedding for an artifact attribute set representing tracked development actions of the at least one development service;
access an authorization schema set available for the development service, each authorization schema in the authorization schema set comprising a reference embedding for artifact attribute thresholds required to authorize the development service;
invoke a first machine learning model trained on input content embeddings of sample digital artifacts and corresponding input reference embeddings of sample authorization schemas to output reference identifiers of applicable authorization schemas for the sample digital artifacts, the invocation causing the first machine learning model to generate output reference identifiers of an applicable authorization schema from the authorization schema set based on input comprising the content embeddings of the digital artifact set and the reference embeddings of the authorization schema set,
wherein the applicable authorization schema is associated with the output reference identifiers generated by the first machine learning model and mapped to at least one digital artifact of the development service, and
wherein the reference embedding of the applicable authorization schema and the content embedding of the at least one digital artifact satisfy a similarity threshold;
retrieve a historical artifact attribute set representing tracked development actions for prior development services authorized via the applicable authorization schema that is associated with the output reference identifiers generated by the first machine learning model and mapped to the at least one digital artifact;
invoke a second machine learning model trained on input artifact attributes for sample digital artifacts and corresponding input artifact attribute thresholds of sample applicable authorization schemas to output authorization status of development services associated with the sample digital artifacts, the invocation causing the second machine learning model to generate an authorization status for the development service based on input comprising the historical artifact attribute set and the artifact attribute set of the applicable authorization schema associated with the output reference identifiers generated by the first machine learning model and mapped to the at least one digital artifact, wherein the authorization status indicates whether the required artifact attribute thresholds of the applicable authorization schema are satisfied;

automatically generate for display a second interactive visual representation that visualizes the applicable authorization schema and the mapped at least one digital artifact of the development service, wherein the authorization status of the applicable authorization schema indicates satisfaction of the required artifact attribute thresholds;

automatically generate for display a third visual representation of the formatted export digital artifact based, in part, on an artifact template comprising a required field query set, each field query within the required field query set corresponding to an empty input field; and responsive to receiving a positive user indication for the applicable authorization schema via the second interactive visual representation, update the third visual representation for each required field query of the formatted export digital artifact by:

invoke a third machine learning model trained on input sample field queries and corresponding input artifact attributes of sample digital artifacts to output human-readable narrative entries for the sample field queries, the invocation causing the third machine learning model to generate a human-readable narrative for the required field query based on input comprising the artifact attribute set and the historical artifact attribute set associated for the at least one digital artifact mapped to the applicable authorization schema associated with the output reference identifiers generated by the first machine learning model and mapped to the at least one digital artifact; and automatically update the third visual representation of the formatted export digital artifact to populate the empty input field of the required field query with the generated human-readable narrative.

13. The system of claim 12 further caused to:

responsive to receiving a negative user indication for the applicable authorization schema:

automatically generate a model prediction training sample comprising an input data based on the historical artifact attribute set and the artifact attribute set of the at least one digital artifact and an output label based on the authorization status of the applicable authorization schema;

access a stored model prediction training sample set, each model prediction training sample corresponding to predicted authorization statuses of prior applicable authorization schemas; and retraining, using the stored model prediction training sample set and the generated model prediction training sample, the first machine learning model, the second machine learning model, the generative machine learning model, or a combination thereof.

14. The system of claim 12 further caused to:

responsive to receiving, via a first user interface, a negative user indication for the applicable authorization schema, the indication identifying a required artifact attribute threshold subset not satisfied by the artifact attribute set:

input into a third machine learning model, the historical artifact attribute set, the artifact attribute set, and the required artifact attribute threshold subset to generate an adjusted artifact attribute set for the at least one digital artifact that satisfy the required artifact attribute threshold subset; and configure for display, at a second user interface, the identified required artifact attribute threshold subset and the adjusted artifact attribute set, the second user interface corresponding to an authorized editor of the at least one digital artifact.

15. The system of claim 14 further caused to:

obtain a first sequence of intermediary logic operations executed during operation of the first machine learning model and a second sequence of intermediary logic operations executed during operation of the second machine learning model;

cause the generative machine learning model to generate, using the first and the second sequence of intermediary logic operations, a human-readable narrative explaining a logical sequence resulting in the authorization status of the displayed applicable authorization schema; and configure for display the generated human-readable narrative alongside the visual representation of the applicable authorization schema and the mapped at least one digital artifact.

16. One or more non-transitory, computer-readable storage media comprising instructions recorded thereon, wherein the instructions when executed by at least one data processor of a system for dynamic generation of formatted export artifacts for validating authorization schemas based on select attributes extracted from applicable digital artifacts using a plurality of coordinated machine learning models, the system, cause the system to:

generate for display, at a user interface, a plurality of interactive visual representations configured to execute an interactive review service via dynamically generating a formatted export artifact during the interactive review service based, in part, on generative model outputs returned during the interactive review service;

receive, via a first interactive visual representation, a request to evaluate authorization of a development service that comprises a digital artifact set, each digital artifact in the digital artifact set comprising:

a content embedding for an artifact attribute set representing tracked development actions of the at least one development service;

access an authorization schema set available for the development service, each authorization schema in the authorization schema set comprising a reference embedding for artifact attribute thresholds required to authorize the development service;

invoke a first machine learning model trained on input content embeddings of sample digital artifacts and corresponding input reference embeddings of sample authorization schemas to output reference identifiers of applicable authorization schemas for the sample digital artifacts, the invocation causing the first machine learning model to generate output reference identifiers of identify an applicable authorization schema from the authorization schema set based on input comprising the content embeddings of the digital artifact set and the reference embeddings of the authorization schema set, wherein the applicable authorization schema is associated with the output reference identifiers generated by the first machine learning model and mapped to at least one digital artifact of the development service, and wherein the reference embedding of the applicable authorization schema and the content embedding of the at least one digital artifact satisfy a similarity threshold;

retrieve a historical artifact attribute set representing tracked development actions for prior development services authorized via the applicable authorization schema that is associated with the output reference identifiers generated by the first machine learning model and mapped to the at least one digital artifact; and invoke a second machine learning model trained on input artifact attributes for sample digital artifacts and corresponding input artifact attribute thresholds of sample applicable authorization schemas to output authorization status of development services associated with the sample digital artifacts, the invocation causing the second machine learning model to generate an authorization status for the development service based on input comprising the historical artifact attribute set and the artifact attribute set of the applicable authorization schema associated with the output reference identifiers generated by the first machine learning model and mapped to the at least one digital artifact,
wherein the authorization status indicates whether the required artifact attribute thresholds of the applicable authorization schema are satisfied.

17. The one or more non-transitory, computer-readable storage media of claim 16, wherein the instructions further cause the system to:

configure for display a visual representation of the applicable authorization schema and the mapped at least one digital artifact of the development service, wherein the authorization status of the applicable authorization schema indicates satisfaction of the required artifact attribute thresholds.

18. The one or more non-transitory, computer-readable storage media of claim 16, wherein the instructions further cause the system to:

responsive to receiving a positive user indication for the applicable authorization schema:

automatically generate an export digital artifact based on an artifact template, the artifact template comprising a required field query set; and cause a generative machine learning model to generate human-readable narratives for each required field query of the required field query set using the artifact attribute set and the historical artifact attribute set associated for the at least one digital artifact mapped to the applicable authorization schema.

19. The one or more non-transitory, computer-readable storage media of claim 17, wherein the visual representation is configured to display the artifact attribute set of the at least one digital artifact that represent the tracked development actions of the development service, and wherein the instructions further cause the system to:

configure for display a distinct visual marking over an artifact attribute subset that corresponds to artifact attributes satisfying the required artifact attribute thresholds of the applicable authorization schema.

20. The computer-implemented method of claim 1, further comprising:

monitoring one or more intermediary logic operations from the invocation of the first machine learning model to generate output reference identifiers of the applicable authorization schema subset from the authorization schema set;

invoking, during invocation of the first machine learning model, a generative machine learning model to output at least one human-readable explanation based on input comprising the one or more intermediary logic operations, the at least one human-readable explanation indicating incremental logic for the intermediary logic operations.

* * * * *